United States Patent
Oh et al.

(10) Patent No.: US 10,771,764 B2
(45) Date of Patent: Sep. 8, 2020

(54) METHOD FOR TRANSMITTING 360-DEGREE VIDEO, METHOD FOR RECEIVING 360-DEGREE VIDEO, APPARATUS FOR TRANSMITTING 360-DEGREE VIDEO, AND APPARATUS FOR RECEIVING 360-DEGREE VIDEO

(71) Applicant: LG ELECTRONICS INC., Seoul (KR)

(72) Inventors: Hyunmook Oh, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/447,326

(22) Filed: Jun. 20, 2019

(65) Prior Publication Data
US 2019/0394444 A1 Dec. 26, 2019

(30) Foreign Application Priority Data

Jun. 22, 2018 (KR) .................. 10-2018-0072368

(51) Int. Cl.
*H04N 13/178* (2018.01)
*H04N 13/194* (2018.01)
*H04L 29/06* (2006.01)
*H04N 13/111* (2018.01)

(52) U.S. Cl.
CPC ....... *H04N 13/178* (2018.05); *H04L 65/4069* (2013.01); *H04L 65/608* (2013.01); *H04N 13/111* (2018.05); *H04N 13/194* (2018.05)

(58) Field of Classification Search
None
See application file for complete search history.

(56) References Cited

U.S. PATENT DOCUMENTS

| | | | |
|---|---|---|---|
| 2018/0063505 A1 | 3/2018 | Lee et al. | |
| 2018/0077451 A1 | 3/2018 | Yip et al. | |
| 2018/0091735 A1* | 3/2018 | Wang | H04N 19/597 |
| 2018/0103199 A1 | 4/2018 | Hendry et al. | |
| 2018/0199042 A1* | 7/2018 | Wang | H04N 19/597 |
| 2019/0045222 A1* | 2/2019 | Yip | H04N 19/174 |
| 2019/0313074 A1* | 10/2019 | Oh | H04N 13/156 |

FOREIGN PATENT DOCUMENTS

| | | | | |
|---|---|---|---|---|
| KR | 10-2017-0096975 A | | 8/2017 | |
| KR | 20180013391 A | * | 2/2018 | .............. G06T 3/00 |
| KR | 10-2018-0029344 A | | 3/2018 | |
| KR | 20180028299 A | * | 3/2018 | .......... H04N 19/597 |
| KR | 20180040507 A | * | 4/2018 | .............. G06T 3/00 |
| WO | 2017204491 A1 | | 11/2017 | |

* cited by examiner

*Primary Examiner* — Lindsay J Uhl
(74) *Attorney, Agent, or Firm* — Dentons US LLP

(57) ABSTRACT

A 360-degree video data processing method performed by a 360-degree video reception apparatus, according to the present invention, comprises the steps of: receiving 360-degree video data; deriving metadata and information on an encoded picture for a specific viewing position in specific viewing space based on the 360-degree video data; decoding the encoded picture based on the information on the encoded picture; and rendering the decoded picture based on the metadata, wherein the metadata includes viewing space information, and wherein the viewing space information includes information indicating a shape type of the specific viewing space.

16 Claims, 26 Drawing Sheets

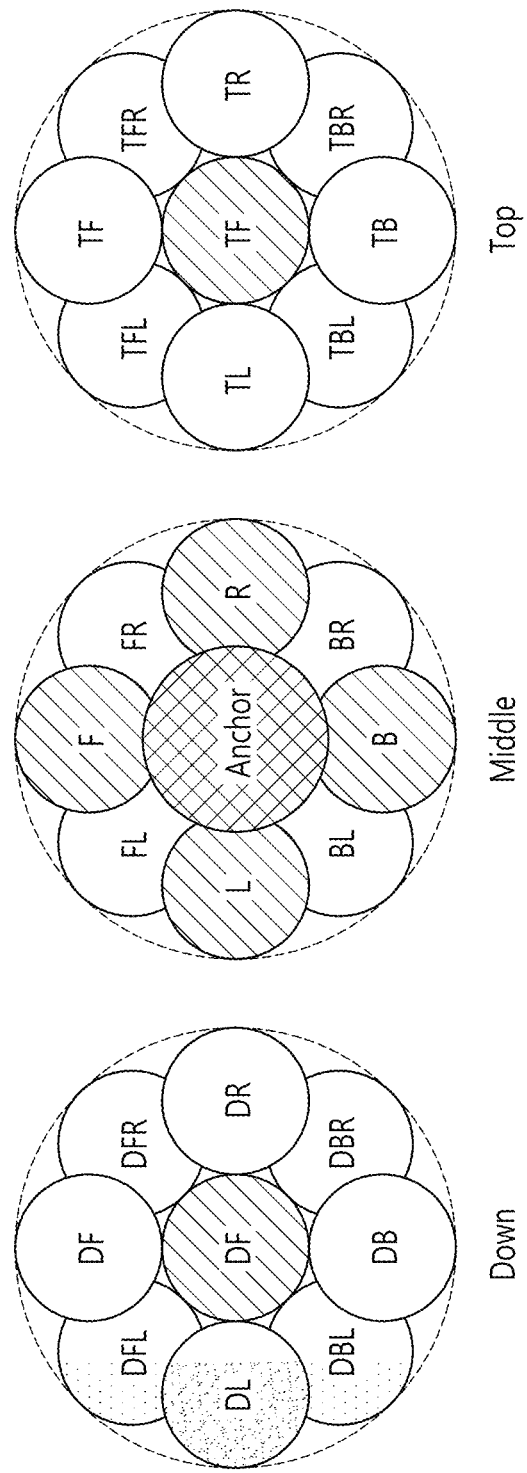

Middle

METHOD FOR TRANSMITTING 360-DEGREE VIDEO, METHOD FOR RECEIVING 360-DEGREE VIDEO, APPARATUS FOR TRANSMITTING 360-DEGREE VIDEO, AND APPARATUS FOR RECEIVING 360-DEGREE VIDEO

CROSS-REFERENCE TO RELATED APPLICATIONS

Pursuant to 35 U.S.C. § 119 (e), this application claims the benefit of Korean Patent Application No. 10-2018-0072368 filed on Jun. 22, 2018, the contents of which are all hereby incorporated by reference herein in their entirety.

BACKGROUND OF THE INVENTION

Field of the Invention

The present invention relates to a 360-degree video and, more specifically, to methods and apparatus for transmitting and receiving a 360-degree video for a 3DoF+ content including viewing space information.

Related Art

Virtual reality (VR) systems allow users to feel as if they are in electronically projected environments. Systems for providing VR can be improved in order to provide images with higher picture quality and spatial sounds. VR systems allow users to interactively consume VR content.

The 3DoF+ (three Degrees of Freedom plus) content provides 3DoF or 360-degree video that is newly constructed according to the user's position movement through 360-degree video for a plurality of viewing positions/viewpoints. The 3DoF+ content allows user to consume various sensory experience.

SUMMARY OF THE INVENTION

Technical Objects

An object of the present invention is to provide a method and apparatus for improving VR video data transmission efficiency for providing a VR system.

Another object of the present invention is to provide a method and apparatus for transmitting VR video data and metadata with respect to VR video data.

Another object of the present invention is to provide a method and apparatus for improving 360-degree video data transmission efficiency for providing a 3DoF+ system.

Another object of the present invention is to provide a method and apparatus for transmitting metadata with respect to viewing position information and viewing space information.

Technical Solutions

According to an embodiment of the present invention, a 360-degree video data processing method performed by a 360-degree video transmission apparatus is provided. The method includes: acquiring 360-degree video for a plurality of viewing positions in specific viewing space; generating pictures for the viewing positions by processing the 360-degree video; encoding the pictures; generating metadata about the 360-degree video; and performing processing for storage or transmission of the encoded picture and the metadata, wherein the metadata includes viewing space information, and wherein the viewing space information includes information indicating a shape type of the specific viewing space.

According to another embodiment of the present invention, a 360-degree video transmission apparatus for processing 360-degree video data is provided. The 360-degree video transmission apparatus includes: a data input unit configured to acquire 360-degree video for a plurality of viewing positions in specific viewing space; a projection processor configured to generate pictures for the viewing positions by processing the 360-degree video; an encoder configured to encode the pictures; a metadata processor configured to generate metadata about the 360-degree video; and a transmission processor configured to perform processing for storage or transmission of the encoded picture and the metadata, wherein the metadata includes viewing space information, and wherein the viewing space information includes information indicating a shape type of the specific viewing space.

According to another embodiment of the present invention, a 360-degree video data processing method performed by a 360-degree video reception apparatus is provided. The method includes: receiving 360-degree video data; deriving metadata and information on an encoded picture for a specific viewing position in specific viewing space based on the 360-degree video data; decoding the encoded picture based on the information on the encoded picture; and rendering the decoded picture based on the metadata, wherein the metadata includes viewing space information, and wherein the viewing space information includes information indicating a shape type of the specific viewing space.

According to another embodiment of the present invention, a 360-degree video reception apparatus for processing 360-degree video data is provided. The 360-degree video reception apparatus includes: a receiver configured to 360-degree video data; a reception processor/a file extraction unit configured to derive metadata and information on an encoded picture for a specific viewing position in specific viewing space based on the 360-degree video data; a data decoder configured to decode the encoded picture based on the information on the encoded picture; and a renderer configured to render the decoded picture based on the metadata, wherein the metadata includes viewing space information, and wherein the viewing space information includes information indicating a shape type of the specific viewing space.

Effects of the Invention

According to the present invention, it is possible to efficiently transmit 3DoF+ content in an environment supporting next-generation hybrid broadcast using terrestrial broadcast networks and the Internet.

According to the present invention, it is possible to propose a method for providing interactive experience in 3DoF+ content consumption of users.

According to the present invention, it is possible to propose a signaling method for correctly reflecting the intention of a 3DoF+ content provider in 360-degree content consumption of users.

According to the present invention, it is possible to propose a method for efficiently increasing transmission capacity and forwarding necessary information in 3DoF+ content transmission.

According to the present invention, it is possible to propose a method for providing interactive experience in 3DoF+ content consumption of users by supporting head motion parallax.

According to the present invention, it is possible to support bounded head motion indication for 3DoF+ applications. Accordingly, it is possible to propose a method for providing interactive experience in 3DoF+ content consumption of users.

BRIEF DESCRIPTION OF DRAWINGS

FIGS. 16a and 16b illustrate multiple viewing positions and the boundary of the viewing positions.

DESCRIPTION OF EXEMPLARY EMBODIMENTS

Figure 1:
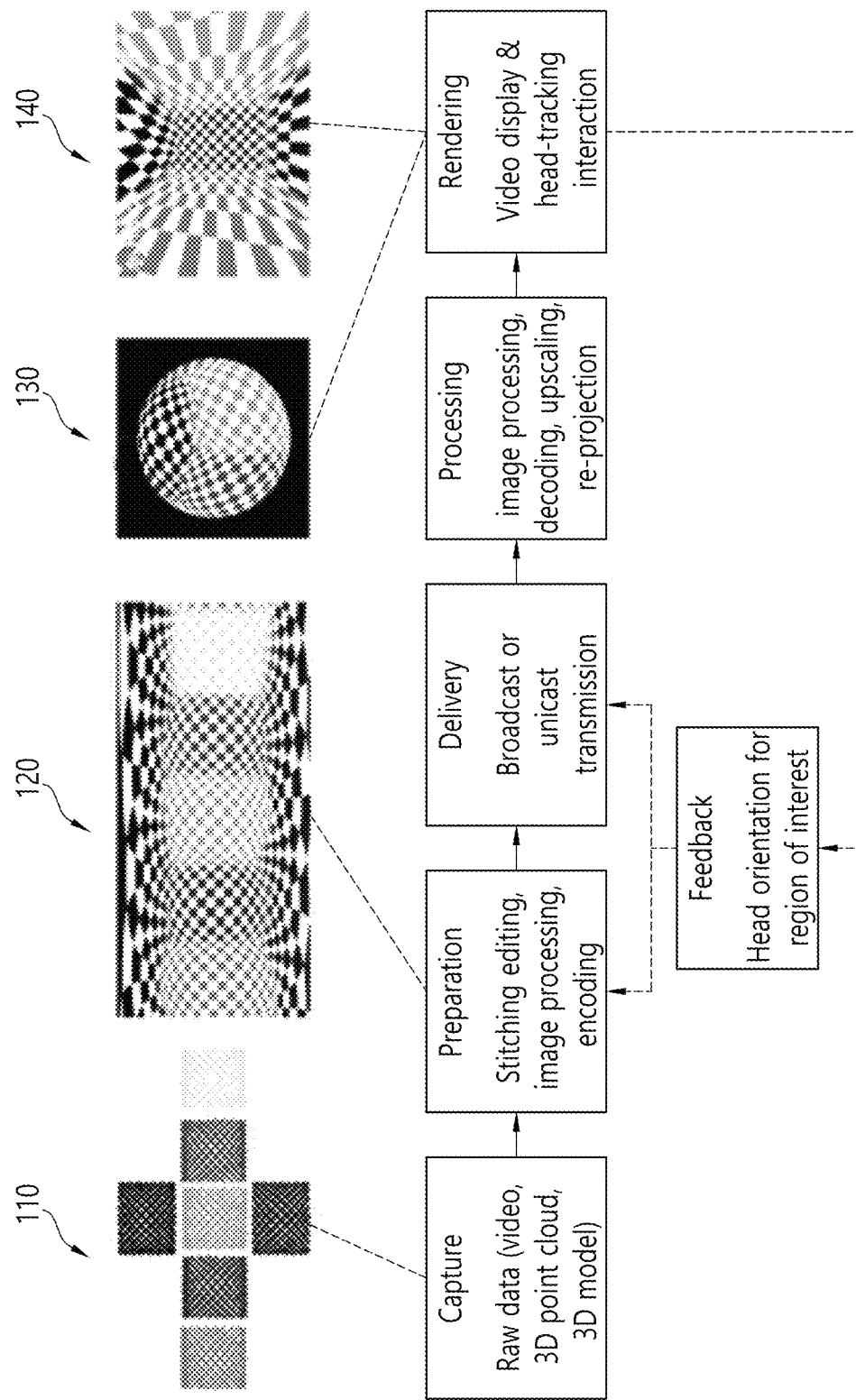
FIG. 1 is a view illustrating overall architecture for providing a 360-degree video according to the present invention.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, preferred embodiments of the present invention will be described in more detail with reference to the attached drawings. Hereinafter, the same reference numbers will be used throughout this specification to refer to the same components and redundant description of the same component will be omitted.

FIG. 1 is a view illustrating overall architecture for providing a 360-degree video according to the present invention.

The present invention proposes a method of providing 360-degree content in order to provide virtual reality (VR) to users. VR may refer to technology for replicating actual or virtual environments or those environments. VR artificially provides sensory experience to users and thus users can experience electronically projected environments.

360 content refers to content for realizing and providing VR and may include a 360 video and/or 360 audio. The 360 video may refer to video or image content which is necessary to provide VR and is captured or reproduced omnidirectionally (360 degrees). Hereinafter, the 360 video may refer to 360-degree video. A 360 video may refer to a video or an image represented on 3D spaces in various forms according to 3D models. For example, a 360 video can be represented on a spherical surface. The 360 audio is audio content for providing VR and may refer to spatial audio content whose audio generation source can be recognized to be located in a specific 3D space. 360 content may be generated, processed and transmitted to users and users can consume VR experiences using the 360 content.

Particularly, the present invention proposes a method for effectively providing a 360 video. To provide a 360 video, a 360 video may be captured through one or more cameras. The captured 360 video may be transmitted through series of processes and a reception side may process the transmitted 360 video into the original 360 video and render the 360 video. In this manner the 360 video can be provided to a user.

Specifically, processes for providing a 360 video may include a capture process, a preparation process, a transmission process, a processing process, a rendering process and/or a feedback process.

The capture process may refer to a process of capturing images or videos for a plurality of viewpoints through one or more cameras. Image/video data 110 shown in FIG. 1 may be generated through the capture process. Each plane of 110 in FIG. 1 may represent an image/video for each viewpoint. A plurality of captured images/videos may be referred to as raw data. Metadata related to capture can be generated during the capture process.

For capture, a special camera for VR may be used. When a 360 video with respect to a virtual space generated by a computer is provided according to an embodiment, capture through an actual camera may not be performed. In this case, a process of simply generating related data can substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image 120 in FIG. 1.

Video data projected on the 2D image may be subjected to the region-wise packing process in order to improve video coding efficiency. Region-wise packing may refer to a process of processing video data projected on a 2D image for each region. Here, regions may refer to divided areas of a 2D image. Regions can be obtained by dividing a 2D image equally or arbitrarily according to an embodiment. Further, regions may be divided according to a projection scheme in an embodiment. The region-wise packing process is an optional process and may be omitted in the preparation process.

The processing process may include a process of rotating regions or rearranging the regions on a 2D image in order to improve video coding efficiency according to an embodiment. For example, it is possible to rotate regions such that specific sides of regions are positioned in proximity to each other to improve coding efficiency.

The processing process may include a process of increasing or decreasing resolution for a specific region in order to differentiate resolutions for regions of a 360 video according to an embodiment. For example, it is possible to increase the resolution of regions corresponding to relatively more important regions in a 360 video to be higher than the resolution of other regions. Video data projected on the 2D image or region-wise packed video data may be subjected to the encoding process through a video codec.

According to an embodiment, the preparation process may further include an additional editing process. In this editing process, editing of image/video data before and after projection may be performed. In the preparation process, metadata regarding stitching/projection/encoding/editing may also be generated. Further, metadata regarding an initial viewpoint or a region of interest (ROI) of video data projected on the 2D image may be generated.

The transmission process may be a process of processing and transmitting image/video data and metadata which have passed through the preparation process. Processing according to an arbitrary transmission protocol may be performed for transmission. Data which has been processed for transmission may be delivered through a broadcast network and/or a broadband. Such data may be delivered to a reception side in an on-demand manner. The reception side may receive the data through various paths.

The processing process may refer to a process of decoding received data and re-projecting projected image/video data on a 3D model. In this process, image/video data projected on the 2D image may be re-projected on a 3D space. This process may be called mapping or projection according to context. Here, 3D model to which image/video data is mapped may have different forms according to 3D models. For example, 3D models may include a sphere, a cube, a cylinder and a pyramid.

According to an embodiment, the processing process may additionally include an editing process and an up-scaling process. In the editing process, editing of image/video data before and after re-projection may be further performed. When the image/video data has been reduced, the size of the image/video data can be increased by up-scaling samples in the up-scaling process. An operation of decreasing the size through down-scaling may be performed as necessary.

The rendering process may refer to a process of rendering and displaying the image/video data re-projected on the 3D space. Re-projection and rendering may be combined and represented as rendering on a 3D model. An image/video re-projected on a 3D model (or rendered on a 3D model) may have a form 130 shown in FIG. 1. The form 130 shown in FIG. 1 corresponds to a case in which the image/video is re-projected on a 3D spherical model. A user can view a region of the rendered image/video through a VR display. Here, the region viewed by the user may have a form 140 shown in FIG. 1.

The feedback process may refer to a process of delivering various types of feedback information which can be acquired in a display process to a transmission side. Interactivity in consumption of a 360 video can be provided through the feedback process. According to an embodiment, head orientation information, viewport information representing a region currently viewed by a user, and the like can be delivered to a transmission side in the feedback process. According to an embodiment, a user may interact with an object realized in a VR environment. In this case, information about the interaction may be delivered to a transmission side or a service provider in the feedback process. According to an embodiment, the feedback process may not be performed.

The head orientation information may refer to information about the position, angle, motion and the like of the head of a user. Based on this information, information about a region in a 360 video which is currently viewed by the user, that is, viewport information, can be calculated.

The viewport information may be information about a region in a 360 video which is currently viewed by a user. Gaze analysis may be performed through the viewpoint information to check how the user consumes the 360 video, which region of the 360 video is gazed by the user, how long the region is gazed, and the like. Gaze analysis may be performed at a reception side and a result thereof may be delivered to a transmission side through a feedback channel. A device such as a VR display may extract a viewport region based on the position/direction of the head of a user, information on a vertical or horizontal field of view (FOV) supported by the device, and the like.

According to an embodiment, the aforementioned feedback information may be consumed at a reception side as well as being transmitted to a transmission side. That is, decoding, re-projection and rendering at the reception side may be performed using the aforementioned feedback information. For example, only a 360 video with respect to a region currently viewed by the user may be preferentially decoded and rendered using the head orientation information and/or the viewport information.

Here, a viewport or a viewport region may refer to a region in a 360 video being viewed by a user. A viewpoint is a point in a 360 video being viewed by a user and may refer to a center point of a viewport region. That is, a viewport is a region having a viewpoint at the center thereof, and the size and the shape of the region can be determined by an FOV which will be described later.

In the above-described overall architecture for providing a 360 video, image/video data which is subjected to the capture/projection/encoding/transmission/decoding/re-projection/rendering processes may be referred to as 360 video data. The term "360 video data" may be used as the concept including metadata and signaling information related to such image/video data.

To store and transmit media data such as the aforementioned audio and video data, a standardized media file format may be defined. According to an embodiment, a media file may have a file format based on ISO BMFF (ISO base media file format).

Figure 2:
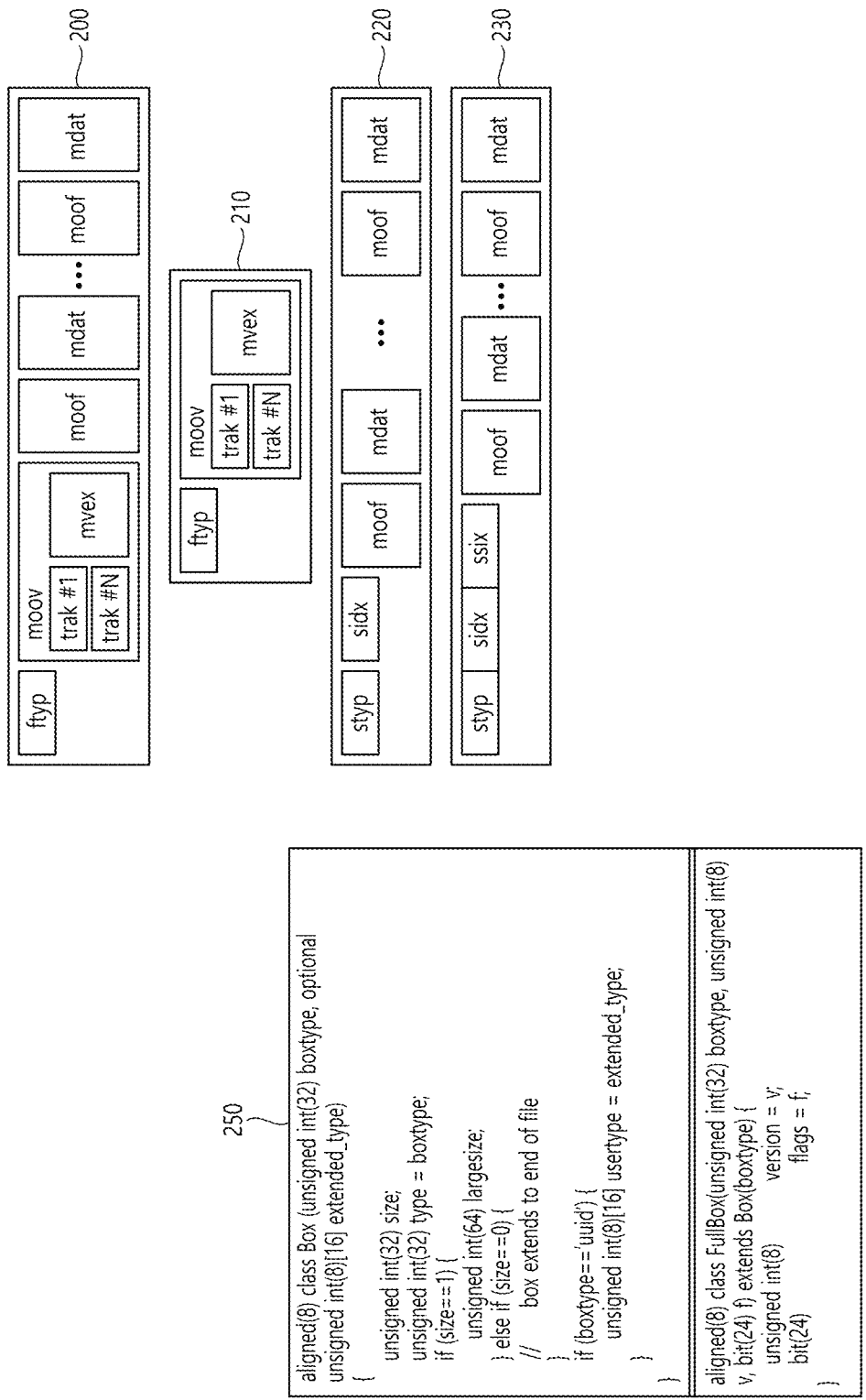
FIGS. 2 and 3 are views illustrating a structure of a media file according to an embodiment of the present invention.
Figure 3:
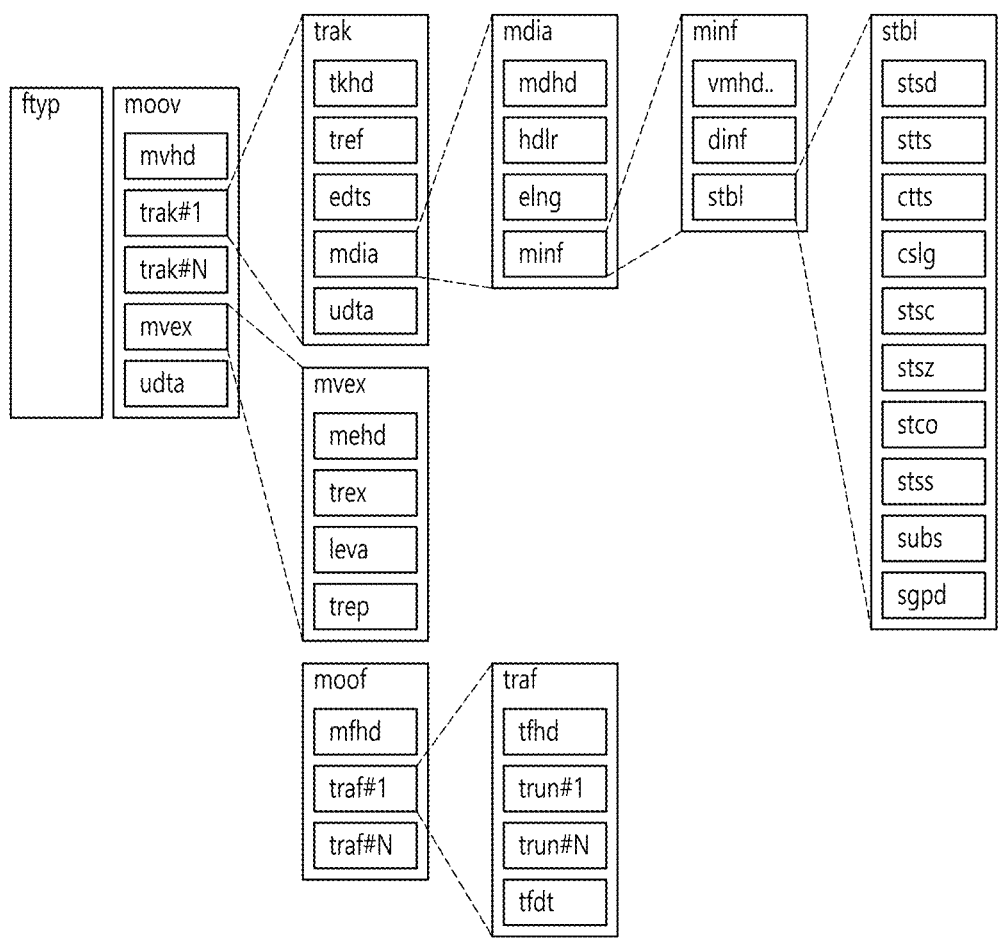

FIGS. 2 and 3 are views illustrating a structure of a media file according to an embodiment of the present invention.

The media file according to the present invention may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file according to the present invention may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

According to an embodiment, the media file according to the present invention may be divided into a plurality of fragments (200). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment 210 may include information related to media decoder initialization except media data. This file may correspond to the aforementioned initialization segment, for example. The initialization segment can include the aforementioned ftyp box and/or moov box.

A file of the illustrated embodiment 220 may include the aforementioned fragment. This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

According to an embodiment 230, an ssix box may be further included. The ssix box (sub-segment index box) can provide information indicating an index of a sub-segment when a segment is divided into sub-segments.

Boxes in a media file can include more extended information based on a box or a FullBox as shown in the illustrated embodiment 250. In the present embodiment, a size field and a largesize field can represent the length of the corresponding box in bytes. A version field can indicate the version of the corresponding box format. A type field can indicate the type or identifier of the corresponding box. A flags field can indicate a flag associated with the corresponding box.

Meanwhile, the fields (attributes) for 360 video of the present invention can be included and delivered in a DASH based adaptive streaming model.

Figure 4:
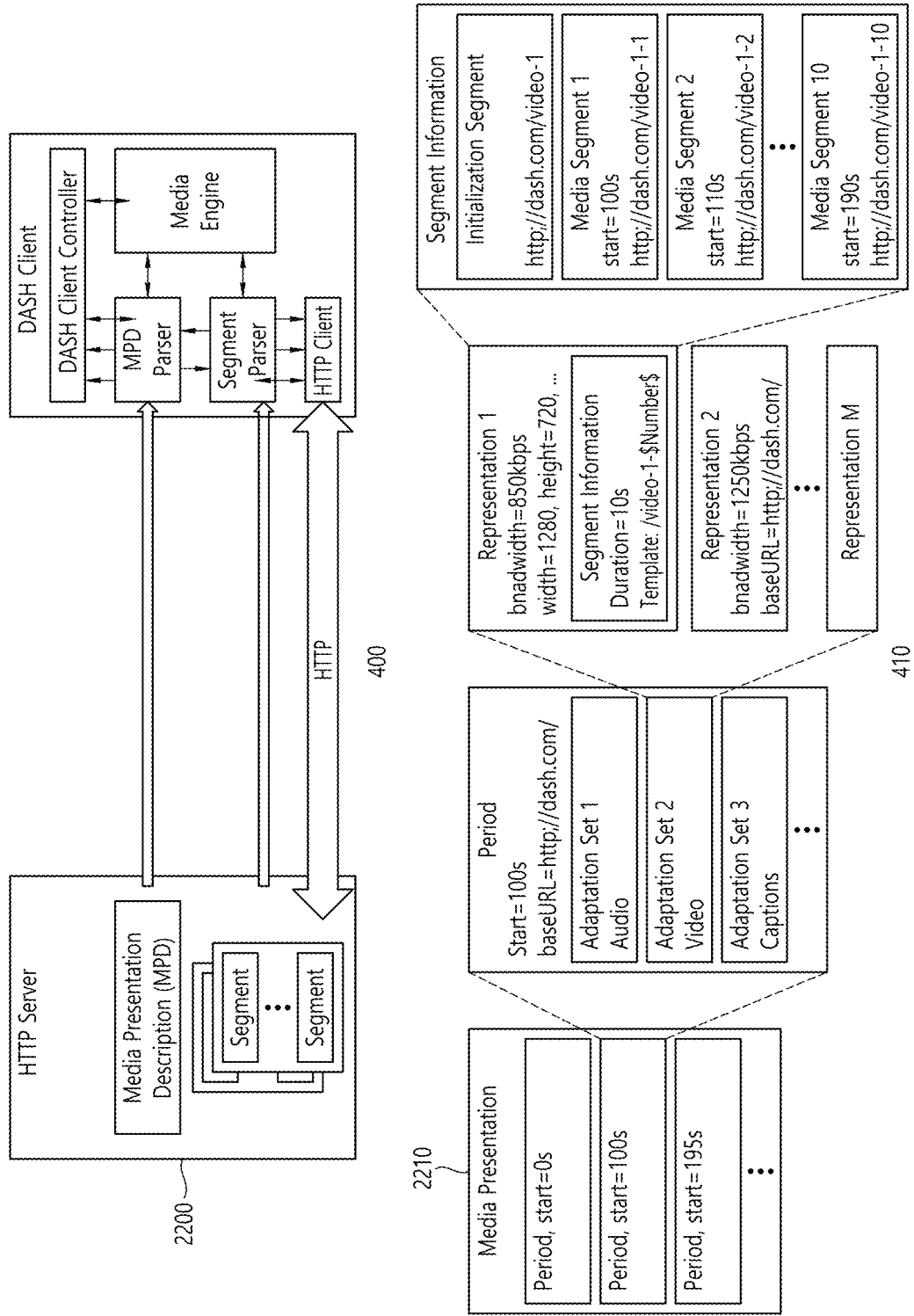
FIG. 4 illustrates an example of the overall operation of a DASH based adaptive streaming model.

FIG. 4 illustrates an example of the overall operation of a DASH based adaptive streaming model. The DASH based adaptive streaming model according to the illustrated embodiment 400 describes operations between an HTTP server and a DASH client. Here, DASH (Dynamic Adaptive Streaming over HTTP) is a protocol for supporting adaptive streaming based on HTTP and can dynamically support streaming according to network state. Accordingly, seamless AV content reproduction can be provided.

First, a DASH client can acquire an MPD. The MPD can be delivered from a service provider such as an HTTP server. The DASH client can send a request for corresponding segments to the server using information on access to the segments which is described in the MPD. Here, the request can be performed based on a network state.

Upon acquisition of the segments, the DASH client can process the segments in a media engine and display the processed segments on a screen. The DASH client can request and acquire necessary segments by reflecting a reproduction time and/or a network state therein in real time (adaptive streaming). Accordingly, content can be seamlessly reproduced.

The MPD (Media Presentation Description) is a file including detailed information for a DASH client to dynamically acquire segments and can be represented in the XML format.

A DASH client controller can generate a command for requesting the MPD and/or segments based on a network state. Further, this controller can control an internal block such as the media engine to be able to use acquired information.

An MPD parser can parse the acquired MPD in real time. Accordingly, the DASH client controller can generate the command for acquiring necessary segments.

The segment parser can parse acquired segments in real time. Internal blocks such as the media block can perform specific operations according to information included in the segments.

An HTTP client can send a request for a necessary MPD and/or segments to the HTTP server. In addition, the HTTP client can transfer the MPD and/or segments acquired from the server to the MPD parser or a segment parser.

The media engine can display content on a screen using media data included in segments. Here, information of the MPD can be used.

A DASH data model may have a hierarchical structure 410. Media presentation can be described by the MPD. The MPD can describe a temporal sequence of a plurality of periods which forms the media presentation. A period can represent one period of media content.

In one period, data can be included in adaptation sets. An adaptation set may be a set of a plurality of exchangeable media content components. Adaptation can include a set of representations. A representation can correspond to a media content component. Content can be temporally divided into a plurality of segments within one representation. This may be for accessibility and delivery. To access each segment, the URL of each segment may be provided.

The MPD can provide information related to media presentation, and a period element, an adaptation set element and a representation element can respectively describe the corresponding period, adaptation set and representation. A representation can be divided into sub-representations, and a sub-representation element can describe the corresponding sub-representation.

Here, common attributes/elements can be defined. The common attributes/elements can be applied to (included in) adaptation sets, representations and sub-representations. The common attributes/elements may include an essential property and/or a supplemental property.

The essential property is information including elements regarded as essential elements in processing data related to the corresponding media presentation. The supplemental property is information including elements which may be used to process data related to the corresponding media presentation. According to an embodiment, when descriptors which will be described later are delivered through the MPD, the descriptors can be defined in the essential property and/or the supplemental property and delivered.

Meanwhile, the present invention provides a method for 3DoF+ (3 Degrees of Freedom plus) contents in addition to the aforementioned method for 360 video contents in order to provide experience of immersive media to the user.

In the aforementioned 3DoF (3 Degrees of Freedom) based VR system (i.e., the aforementioned 360 video content system), the user is provided with a visual/auditory experience with respect to different viewing orientations at the fixed position of the user. But, VR system for the 3DoF+ content aim to provide extended visual/auditory experience with respect to different viewing orientations at different viewpoints and viewing positions. In other words, the VR system for the 3DoF+ content may represent a system that provides 360 degree content rendered at a plurality of viewing positions at a plurality of locations (viewpoints).

The concept of a viewing position and a viewpoint which is additionally defined in the 3DoF+ VR system can be explained as following figure. The viewing position may be called a head position.

Figure 5:
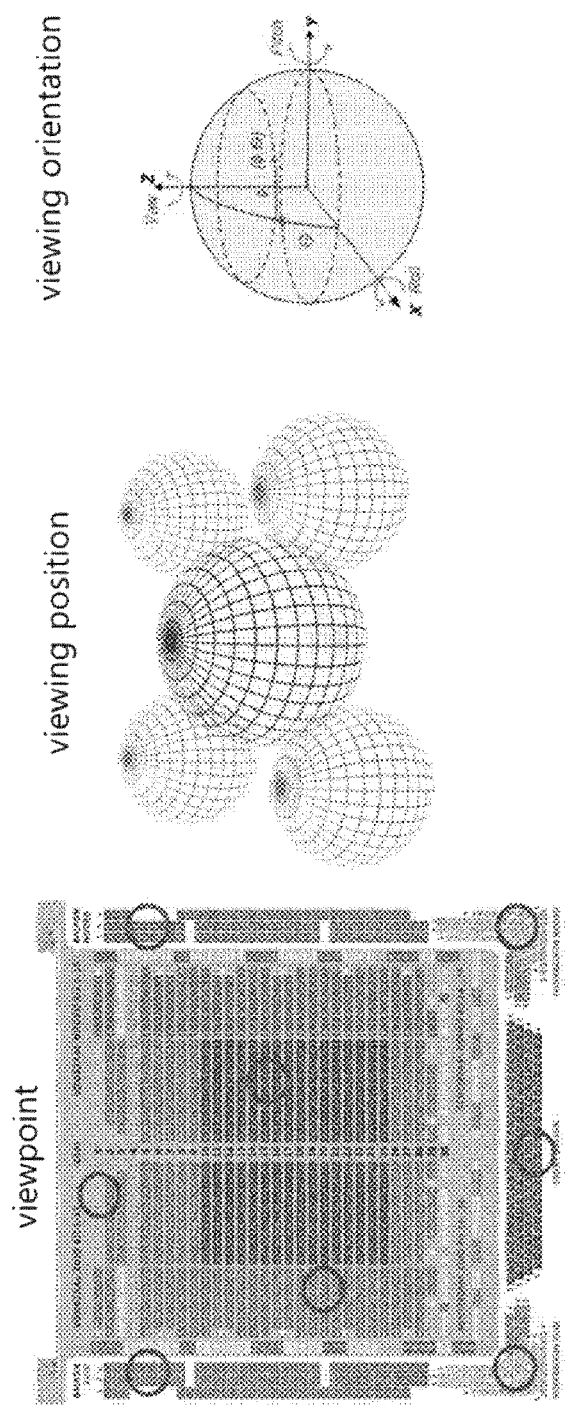
FIG. 5 illustrates a 3DoF+ VR system.

FIG. 5 illustrates a 3DoF+ VR system.

Specifically, FIG. 5(a) illustrates a plurality of viewpoints in which 360 video contents are provided in the 3DoF+ VR system. For example, as shown in FIG. 5(a), a plurality of specific positions in a specific space (e.g., a theater, a stadium, etc.) may be considered as viewpoints in which the 360 video content is provided. In this case, it can be assumed that the video/audio provided in each of the viewpoints existing in the same specific space has the same time flow.

Meanwhile, a specific viewpoint may be rendered with 360 contents for a plurality of viewing positions. Thus, different visual/auditory experiences may be provided according to the user's head motion at the particular viewpoint. Here, the 360 contents may be called 3DoF+ contents, and the 3DoF+ contents may include 3DoF+ video and 3DoF+ audio.

FIG. 5(b) illustrates 3D spaces of a plurality of viewing positions. Here, the 3D space may be a sphere. Different visual/auditory experiences can be provided according to the user's head motion at the specific view point, so that video/audio/text information reflecting the relative position of each viewing position is provided.

In addition, video/audio information for an omnidirectional media at a specific viewing position may be transmitted as in the existing method for 360 content. In other words, the 360 content for the specific viewing position may be rendered in 3D space for the specific viewing position. In this case, not only a main source including video/audio/text/etc but also various additional sources may be transmitted to integrate. In addition, as another example, information for the additional sources may be transmitted in connection with the viewing orientation of the user or independently.

FIG. 5(c) illustrates a 3D space in which a 360 degree video of a viewing position is rendered. As shown in FIG. 5(c), each point on the spherical surface can be represented using r (the radius of a sphere), θ (rotation direction and degree based on z-axis) and φ (rotation direction and degree toward z-axis of x-y plane) using the spherical coordinate system. According to an embodiment, the spherical surface may be consistent with the world coordinate system or the principal point of the front camera may be assumed to be a point (r, 0, 0) of the spherical surface.

Meanwhile, the concept of aircraft principal axes can be used to represent the position of each point on the spherical surface. That is, the content of aircraft principal axes can be used to describe a 3D space before projection or after reprojection and perform signaling therefor in the present invention. According to an embodiment, a method using the concept of X, Y and Z axes or spherical coordinates may be used.

An aircraft can freely rotate three-dimensionally. Axes constituting a three dimension are referred to as a pitch axis, a yaw axis and a roll axis. These may be referred to as a pitch, a yaw and a roll or a pitch direction, a yaw direction and a roll direction in the description.

The pitch axis can refer to an axis which is a base of a direction in which the front end of the aircraft rotates up and down. In the illustrated concept of aircraft principal axes, the pitch axis can refer to an axis which connects the wings of the aircraft.

The yaw axis can refer to an axis which is a base of a direction in which the front end of the aircraft rotates to the left and right. In the illustrated concept of aircraft principal axes, the yaw axis can refer to an axis which connects the top to the bottom of the aircraft. The roll axis can refer to an axis which connects the front end to the tail of the aircraft in the illustrated concept of aircraft principal axes, and a rotation in the roll direction can refer to a rotation based on the roll axis. As described above, a 3D space in the present invention can be described using the concept of the pitch, yaw and roll.

Figure 6:
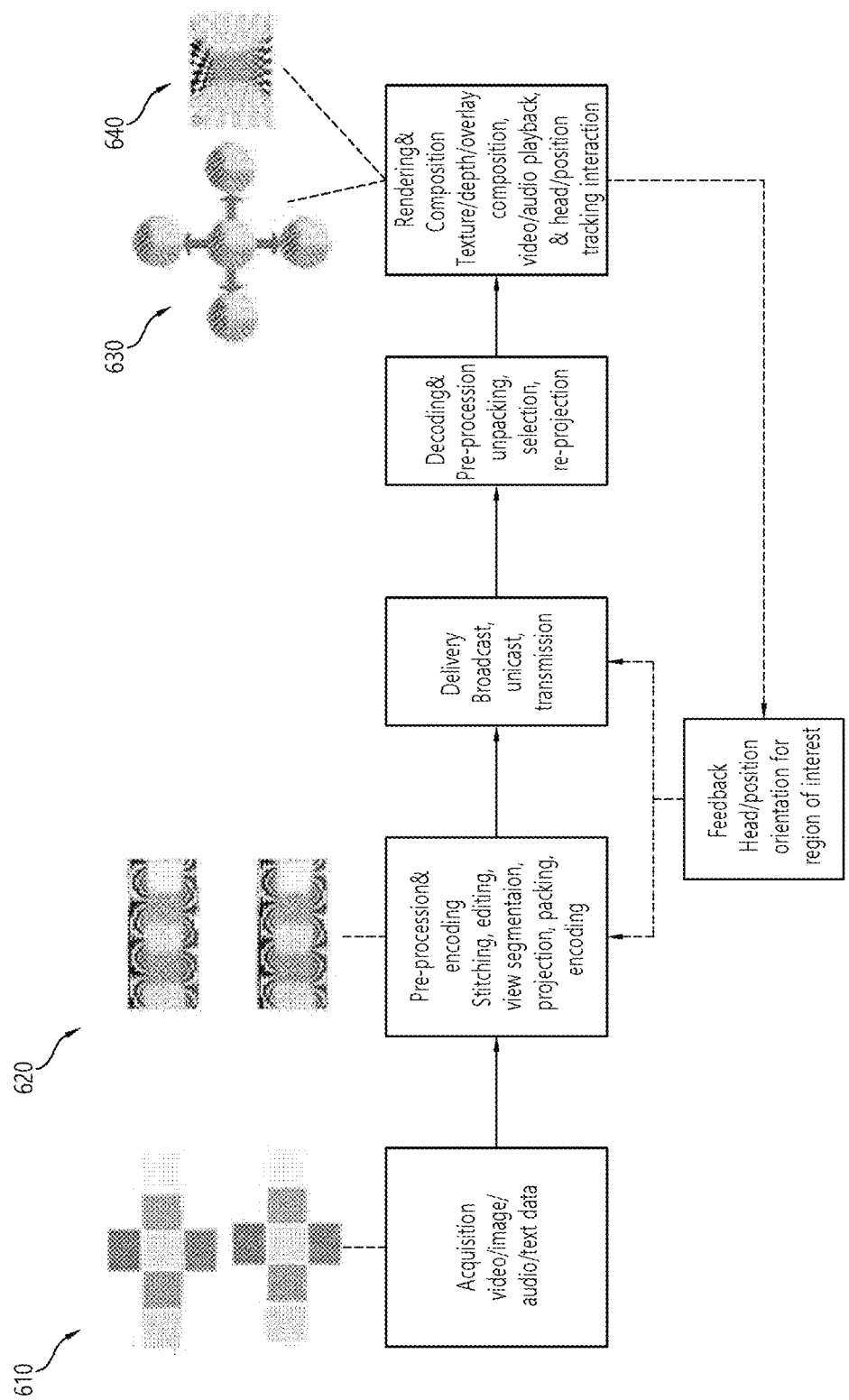
FIG. 6 is a view illustrating overall architecture for providing a 3DoF+ video according to the present invention.

FIG. 6 is a view illustrating overall architecture for providing a 3DoF+ video according to the present invention.

Referring to FIG. 6, 3DoF+ video data and/or 3DoF+ audio data may be acquired. Specifically, HDCA (High Density Camera Array), Lenslet (microlens) camera, or the like may be used for capturing the 3DoF+ contents, or the 3DoF+ contents may be acquired through a new device designed for 3DoF+ video capture. The generated image/video data set according to the position of the camera used for capture, such as the acquired image 610 shown in FIG. 6, can be generated in a plurality of numbers. That is, a plurality of video/audio information according to a head motion at a plurality of positions can be obtained. In this case, the image information may include depth information as well as texture information. A plurality of information of different viewing positions according to different capture positions, such as the acquired image 610 shown in FIG. 6, can be obtained, respectively. In addition, a metameter indicating the internal/external set values of the camera may be generated during the capture process of the 3DoF+ contents. On the other hand, in the case of an image generated by a computer other than a camera, the capturing process may be replaced by the image generation process.

If the image acquisition process is performed, a composition process may be performed. The composition process is a process of composing the acquired image 610 obtained through a video/audio input device and an image (video/image etc.) obtained through external media, voice (audio/effect sound etc.) and text (caption, etc.) to include in the user experience.

A preprocessing process of the acquired image 610 may be a process of processing the captured image/video and the metadata delivered from the capturing process. The preprocessing process includes all types of pre-processes such as a stitching process, a color correction process, a projection process, a view segmenation process, and an encoding process.

Specifically, the stitching process may be a process of connecting captured images/videos to generate one panorama image/video or spherical image/video. Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image 620 in FIG. 6.

The view segmentation process may be a process of dividing into a primary view and a secondary view to improve the coding efficiency. For example, images mapped at each camera location can be separated into the primary view and the secondary view, and different resolutions can be applied to different views to improve video coding efficiency. Also, arrangement or resolution of mapping images may be applied differently within the primary view to improve coding efficiency. Also, the secondary view may not exist based on the capture environment. The secondary view may represent an image/video that is played in the movement process when the user moves from a primary view to another primary view. The secondary view may have a lower resolution than the primary view, but the same resolution may be applied as needed. Also, for example, a 360 video reception apparatus may newly generate the secondary view based on virtual information.

The preprocessing process may further include an editing process. The editing process may represent a process of eliminating the boundaries between regions of 360 video, reducing the color/brightness difference between regions of 360 video, or adding a visual effect of an image.

Also, the preprocessing process may further include a packing process of rearranging regions of an image, and an encoding process of compressing image information. A projected picture can be generated based on a plurality of projection images of different viewing positions, such as the projected picture 620 of FIG. 6.

Further, in the preprocessing process, editing of image/video data before and after projection can be further performed, and a metadata can be generated. For example, in the preprocessing process, a metadata for an initial viewing orientation, a user's initial position, and a region of interest (ROI) may be generated.

The delivery process illustrated in FIG. 6 may represent the process of processing and transmitting image/video data and metadata obtained in the preprocessing process. Processing according to an arbitrary transmission protocol may be performed for transmission of the image/video data and the metadata. Data which has been processed for transmission may be delivered through a broadcast network and/or a broadband. Such data may be delivered to a reception side in an on-demand manner. The reception side may receive the data through various paths.

A processing process may include a decoding process for decoding received image/video data and metadata, and a re-projection process of mapping/projecting the image/video data of a decoded projected picture into a 3D (three Dimension) model, a process of generating and composing of a virtual viewpoint. Here, 3D model or projection map to which image/video data is mapped may have different forms according to 3D models. For example, 3D models may include a sphere, a cube, a cylinder and a pyramid. Alternatively, 3D model or projection map may be a modified form model of a sphere, a cube, a cylinder or a pyramid, or may be a free-form model.

The process of generating and composing of a virtual viewpoint may represent a process of generating an image/video data that is played in the movement process when the user moves from a primary view to another primary view or a secondary view. In order to generate the virtual viewpoint, it may be necessary to process metadata delivered in the capture and the preprocessing process. In some cases, only a part of 360 image/video may be generated/composed at the virtual viewpoint.

According to an embodiment, the processing process may additionally include an editing process and an up-scaling process. In the editing process, editing of image/video data before and after re-projection may be further performed. When the image/video data has been reduced, the size of the image/video data can be increased by up-scaling samples in the up-scaling process. An operation of decreasing the size through down-scaling may be performed as necessary.

The rendering process may refer to a process of rendering and displaying the image/video data re-projected on the 3D space. Re-projection and rendering may be combined and represented as rendering on a 3D model. An image/video re-projected on a 3D model (or rendered on a 3D model) may have a form 630 shown in FIG. 6. The form 630 shown in FIG. 6 corresponds to a case in which the image/video is re-projected on a 3D spherical model. A user can view a region of the rendered image/video through a VR display. Here, the region viewed by the user may have a form 640 shown in FIG. 6.

The feedback process may refer to a process of delivering various types of feedback information which can be acquired in a display process to a transmission side. Interactivity in consumption of a 360 video can be provided through the feedback process. According to an embodiment, head orientation information, viewport information representing a region currently viewed by a user, and the like can be delivered to a transmission side in the feedback process. According to an embodiment, a user may interact with an object realized in a VR environment. In this case, information about the interaction may be delivered to a transmission side or a service provider in the feedback process. According to an embodiment, the feedback process may not be performed.

Figure 7:
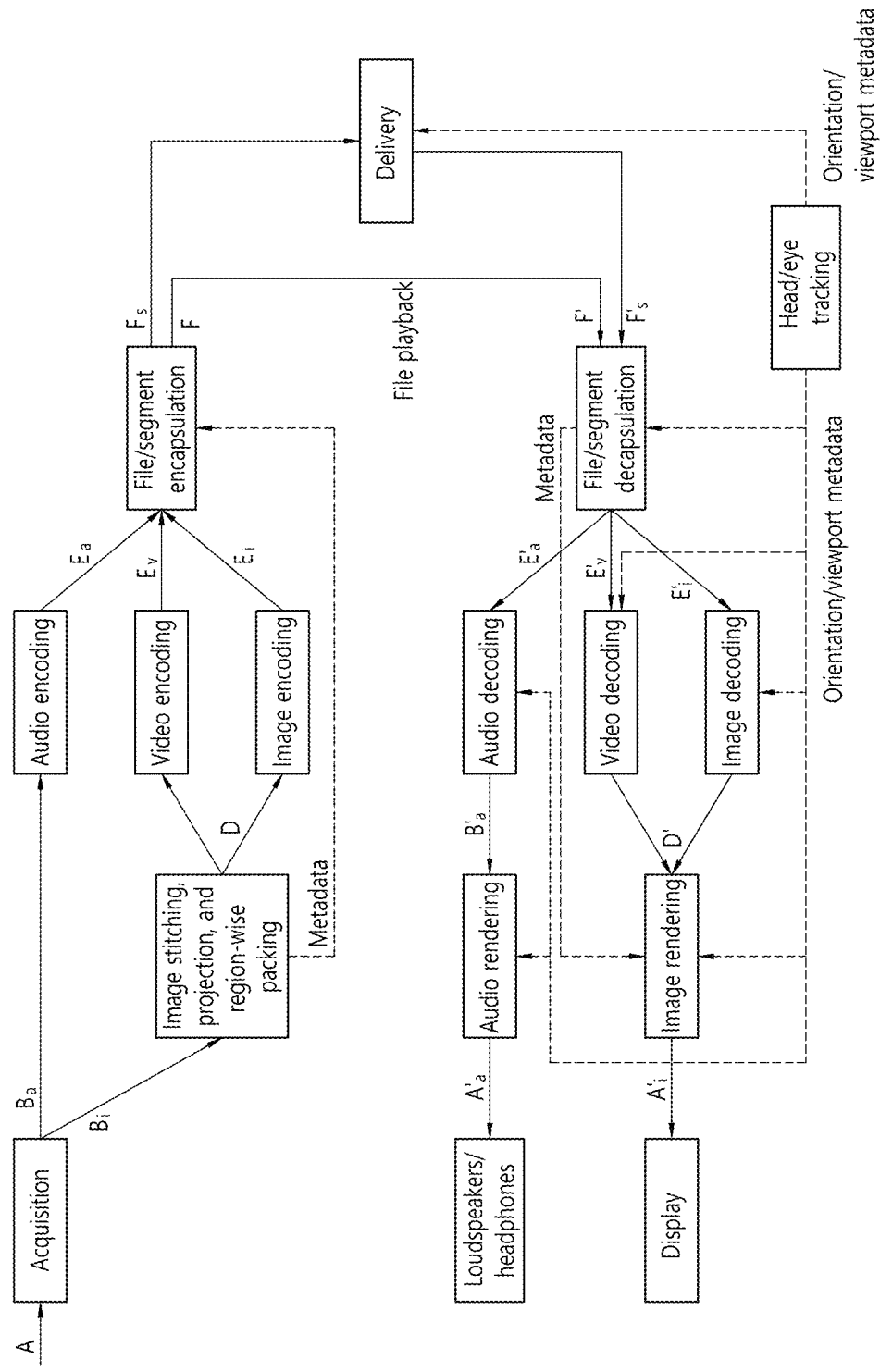
FIG. 7 illustrates overall architecture for providing a 360 degree content/3DoF+ content performed by the 360-degree video transmission apparatus/360-degree video reception apparatus.

FIG. 7 illustrates overall architecture for providing a 360 degree content/3DoF+ content performed by the 360-degree video transmission apparatus/360-degree video reception apparatus.

Referring to FIG. 7, a real-world audio-visual scene (A) may be captured by audio sensors as well as a set of cameras or a camera device with multiple lenses and sensors. The acquisition may result in a set of digital image/video (Bi) and audio (Ba) signals. The cameras/lenses typically may cover all directions around the centre point of the camera set or camera device, thus the name of 360-degree video.

The images (Bi) of the same time instance may be stitched, possibly rotated, projected, and mapped onto a packed picture (D).

The packed pictures (D) may be encoded as coded images (Ei) or a coded video bitstream (Ev). The captured audio (Ba) may be encoded as an audio bitstream (Ea). The coded images, video, and/or audio may be then composed into a media file for file playback (F) or a sequence of an initialization segment and media segments for streaming (Fs), according to a particular media container file format. In this document, the media container file format may be the ISO Base Media File Format specified in ISO/IEC 14496-12. The file encapsulator also may include metadata into the file or the segments, such as projection and region-wise packing information assisting in rendering the decoded packed pictures.

The segments Fs may be delivered using a delivery mechanism to a player.

The file that the file encapsulator outputs (F) may be identical to the file that the file decapsulator inputs (F'). A file decapsulator may process the file (F') or the received segments (F's) and extract the coded bitstreams (E'a, E'v, and/or E'i) and parse the metadata. The audio, video, and/or images may be then decoded into decoded signals (B'a for audio, and D' for images/video). The decoded packed pictures (D') may be projected onto the screen of a head-mounted display or any other display device based on the current viewing orientation or viewport and the projection, spherical coverage, rotation, and region-wise packing metadata parsed from the file. Likewise, decoded audio (B'a) may be rendered, e.g. through headphones, according to the current viewing orientation. The current viewing orientation may be determined by the head tracking and possibly also eye tracking functionality. Besides being used by the renderer to render the appropriate part of decoded video and audio signals, the current viewing orientation may also be used by the video and audio decoders for decoding optimization.

The process described above is applicable to both live and on-demand use cases.

Figure 8:
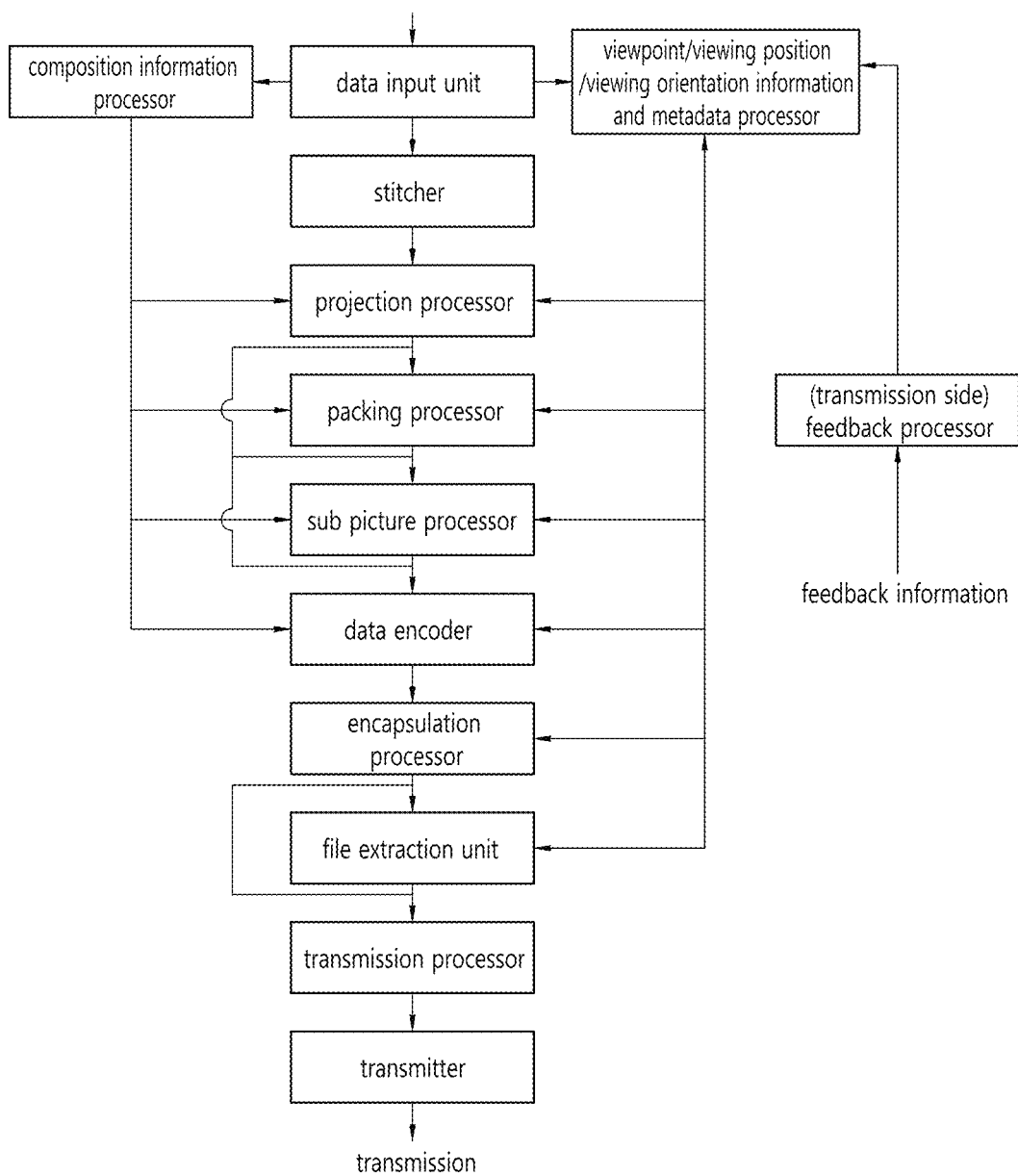
FIG. 8 is a view schematically illustrating a configuration of a 360 video transmission apparatus to which the present invention is applicable.

FIG. 8 is a view schematically illustrating a configuration of a 360 video transmission apparatus to which the present invention is applicable.

The 360 video transmission apparatus according to the present invention can perform operations related the above-described preparation process and the transmission process. The 360 video transmission apparatus may include a data input unit, a composition information processor, a stitcher, a projection processor, a (region-wise) packing processor, a sub picture processor, a data encoder, an encapsulation processor, a file extraction unit, a transmission processor, a transmitter, a viewpoint/viewing position/viewing orientation information and metadata processor and/or a (transmission side) feedback processor as internal/external elements. If an input data is a camera output image, the 360-degree video transmission apparatus can perform stitching to generate a sphere image (i.e., a 360-degree video rendered in 3D space) for each viewpoint/viewing position/viewing orientation. The viewpoint/viewing position/viewing orientation information and metadata processor may be referred to as a metadata processor.

The data input unit can receive captured images/videos for respective viewpoints. The images/videos for the respective viewpoints may be images/videos captured by one or more cameras. Further, data input unit may receive metadata generated in a capture process. The data input unit may forward the received images/videos for the viewpoints to the stitcher and forward metadata generated in the capture process to the signaling processor.

The stitcher can perform a stitching operation on the captured images/videos for the viewpoints. The stitcher may forward stitched 360 video data to the projection processor. The stitcher may receive necessary metadata from the metadata processor and use the metadata for the stitching operation as necessary. The stitcher may forward metadata generated in the stitching process to the metadata processor. The metadata in the stitching process may include information such as information representing whether stitching has been performed, and a stitching type.

The projection processor can project the stitched 360 video data on a 2D image. The projection processor may perform projection according to various schemes which will be described later. The projection processor may perform mapping in consideration of the depth of 360 video data for each viewpoint. The projection processor may receive metadata necessary for projection from the metadata processor and use the metadata for the projection operation as necessary. The projection processor may forward metadata generated in the projection process to the metadata processor. Metadata generated in the projection processor may include a projection scheme type and the like.

The (region-wise) packing processor can perform the aforementioned region-wise packing process. That is, the (region-wise) packing processor can perform the process of dividing the projected 360 video data into regions and rotating and rearranging regions or changing the resolution of each region. As described above, the (region-wise) packing processor is optional and thus t the (region-wise) packing processor may be omitted when region-wise packing is not performed. The (region-wise) packing processor may receive metadata necessary for region-wise packing from the metadata processor and use the metadata for a region-wise packing operation as necessary. The (region-wise) packing processor may forward metadata generated in the region-wise packing process to the metadata processor.

Metadata generated in the (region-wise) packing processor may include a rotation degree, size and the like of each region.

The aforementioned stitcher, projection processor and/or the region-wise packing processor may be integrated into a single hardware component according to an embodiment.

According to an application, the sub picture processor can perform packing for making a plurality of images into an integrated image, or can generate a sub picture that divides a entire video into a video of details region. Further, when the input data includes video/audio/text additional information, information on a method of additionally displaying the additional information in a center image/video can be generated, and the information can be transmitted with the additional information.

The metadata processor can process metadata which may be generated in a capture process, a stitching process, a projection process, a region-wise packing process, an encoding process, an encapsulation process and/or a process for transmission. The metadata processor can generate 360 video related metadata using such metadata. According to an embodiment, the metadata processor may generate the 360 video related metadata in the form of a signaling table. 360 video related metadata may also be called metadata or 360 video related signaling information according to signaling context. Further, the metadata processor may forward the acquired or generated metadata to internal elements of the 360 video transmission apparatus as necessary. The metadata processor may forward the 360 video related metadata to the data encoder, the encapsulation processor and/or the transmission processor such that the 360 video related metadata can be transmitted to a reception side.

The data encoder can encode the 360 video data projected on the 2D image and/or region-wise packed 360 video data. The 360 video data can be encoded in various formats.

The encapsulation processor can encapsulate the encoded 360 video data and/or 360 video related metadata in a file format. Here, the 360 video related metadata may be received from the metadata processor. The encapsulation processor can encapsulate the data in a file format such as ISOBMFF, CFF or the like or process the data into a DASH segment or the like. The encapsulation processor may include the 360 video related metadata in a file format. The 360 video related metadata may be included in a box having various levels in SOBMFF or may be included as data of a separate track in a file, for example. According to an embodiment, the encapsulation processor may encapsulate the 360 video related metadata into a file. The transmission processor may perform processing for transmission on the encapsulated 360 video data according to file format. The transmission processor may process the 360 video data according to an arbitrary transmission protocol. The processing for transmission may include processing for delivery over a broadcast network and processing for delivery over a broadband. According to an embodiment, the transmission processor may receive 360 video related metadata from the metadata processor as well as the 360 video data and perform the processing for transmission on the 360 video related metadata.

The transmitter can transmit the 360 video data and/or the 360 video related metadata processed for transmission through a broadcast network and/or a broadband. The transmitter may include an element for transmission through a broadcast network and/or an element for transmission through a broadband.

According to an embodiment of the 360 video transmission apparatus according to the present invention, the 360 video transmission apparatus may further include a data storage unit (not shown) as an internal/external element. The data storage unit may store encoded 360 video data and/or 360 video related metadata before the encoded 360 video data and/or 360 video related metadata are delivered to the transmission processor. Such data may be stored in a file format such as ISOBMFF. Although the data storage unit may not be required when 360 video is transmitted in real time, encapsulated 360 data may be stored in the data storage unit for a certain period of time and then transmitted when the encapsulated 360 data is delivered over a broadband.

According to another embodiment of the 360 video transmission apparatus according to the present invention, the 360 video transmission apparatus may further include a (transmission side) feedback processor and/or a network interface (not shown) as internal/external elements. The network interface can receive feedback information from a 360 video reception apparatus according to the present invention and forward the feedback information to the transmission side feedback processor. The transmission side feedback processor can forward the feedback information to the stitcher, the projection processor, the region-wise packing processor, the data encoder, the encapsulation processor, the metadata processor and/or the transmission processor. According to an embodiment, the feedback information may be delivered to the metadata processor and then delivered to each internal element. Internal elements which have received the feedback information can reflect the feedback information in the following 360 video data processing.

According to another embodiment of the 360 video transmission apparatus according to the present invention, the region-wise packing processor may rotate regions and map the rotated regions on a 2D image. Here, the regions may be rotated in different directions at different angles and mapped on the 2D image. Region rotation may be performed in consideration of neighboring parts and stitched parts of 360 video data on a spherical surface before projection. Information about region rotation, that is, rotation directions, angles and the like may be signaled through 360 video related metadata. According to another embodiment of the 360 video transmission apparatus according to the present invention, the data encoder may perform encoding differently for respective regions. The data encoder may encode a specific region in high quality and encode other regions in low quality. The transmission side feedback processor may forward feedback information received from the 360 video reception apparatus to the data encoder such that the data encoder can use encoding methods differentiated for respective regions. For example, the transmission side feedback processor may forward viewport information received from a reception side to the data encoder. The data encoder may encode regions including an area indicated by the viewport information in higher quality (UHD and the like) than that of other regions.

According to another embodiment of the 360 video transmission apparatus according to the present invention, the transmission processor may perform processing for transmission differently for respective regions. The transmission processor may apply different transmission parameters (modulation orders, code rates, and the like) to the respective regions such that data delivered to the respective regions have different robustnesses.

Here, the transmission side feedback processor may forward feedback information received from the 360 video reception apparatus to the transmission processor such that the transmission processor can perform transmission processes differentiated for respective regions. For example, the transmission side feedback processor may forward viewport information received from a reception side to the transmission processor. The transmission processor may perform a transmission process on regions including an area indicated by the viewport information such that the regions have higher robustness than other regions.

The above-described internal/external elements of the 360 video transmission apparatus according to the present invention may be hardware elements. According to an embodiment, the internal/external elements may be changed, omitted, replaced by other elements or integrated.

Figure 9:
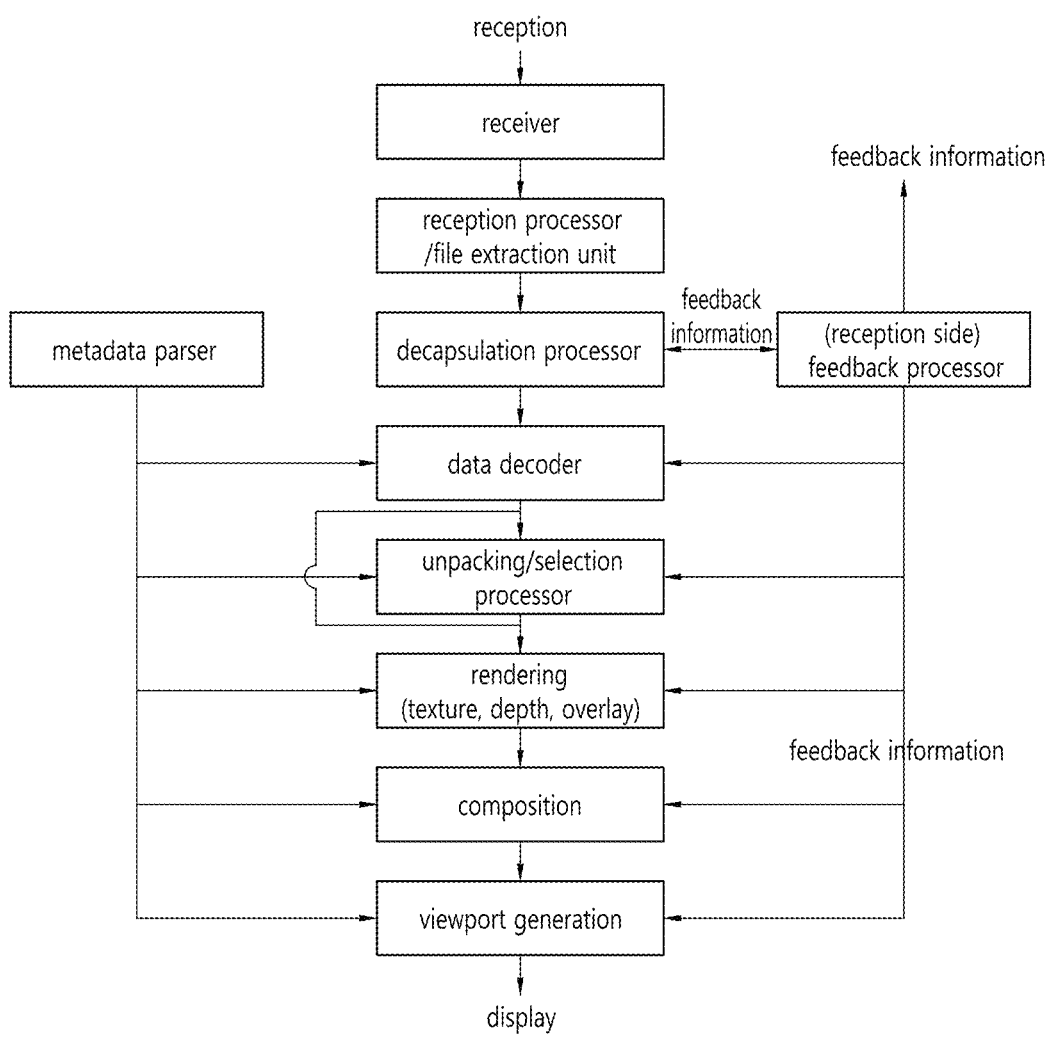
FIG. 9 is a view schematically illustrating a configuration of a 360 video reception apparatus to which the present invention is applicable.

FIG. 9 is a view schematically illustrating a configuration of a 360 video reception apparatus to which the present invention is applicable.

The 360 video reception apparatus according to the present invention can perform operations related to the above-described processing process and/or the rendering process. The 360 video reception apparatus may include a receiver, a reception processor/a file extraction unit, a decapsulation processor, a data decoder, a metadata parser, an unpacking/selection processor, a renderer, a composition processor, a (reception side) feedback processor and/or a re-projection processor as internal/external elements. A signaling parser may be called the metadata parser.

The receiver can receive 360 video data transmitted from the 360 video transmission apparatus according to the present invention. The receiver may receive the 360 video data through a broadcast network or a broadband depending on a channel through which the 360 video data is transmitted. The receiver may extract a necessary file after receiving the bitstream transmitted from the transmitter.

The reception processor can perform processing according to a transmission protocol on the received 360 video data. The reception processor may perform a reverse process of the process of the aforementioned transmission processor such that the reverse process corresponds to processing for transmission performed at the transmission side. The reception processor can forward the acquired 360 video data to the decapsulation processor and forward acquired 360 video related metadata to the metadata parser. The 360 video related metadata acquired by the reception processor may have the form of a signaling table.

The decapsulation processor can decapsulate the 360 video data in a file format received from the reception processor. The decapsulation processor can acquired 360 video data and 360 video related metadata by decapsulating files in ISOBMFF or the like. The decapsulation processor may select a video stream in the generated file format using viewpoint/viewing position/viewing orientation information and video metadata transmitted from the feedback processor, and the selected video stream may be reconstructed into video information through the decoder. The decapsulation processor can forward the acquired 360 video data to the data decoder and forward the acquired 360 video related metadata to the metadata parser. The 360 video related metadata acquired by the decapsulation processor may have the form of a box or a track in a file format. The decapsulation processor may receive metadata necessary for decapsulation from the metadata parser as necessary.

The data decoder can decode the 360 video data. The data decoder may receive metadata necessary for decoding from the metadata parser. The 360 video related metadata acquired in the data decoding process may be forwarded to the metadata parser.

In the case of a packed image, the unpacking/selection processor may perform unpacking of the packed image based on packing information transmitted through the metadata. If necessary, the unpacking/selection processor may perform a process of selecting a video and a necessary component suitable for a viewpoint/viewing position/viewing orientation transmitted from the feedback processor.

The metadata parser can parse/decode the 360 video related metadata. The metadata parser can forward acquired metadata to the data decapsulation processor, the data decoder, the re-projection processor and/or the renderer.

The re-projection processor can perform re-projection on the decoded 360 video data. The re-projection processor can re-project the 360 video data on a 3D space. The 3D space may have different forms depending on 3D models. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360 video data corresponding to a specific area of the 3D space on the 3D space using metadata necessary for re-projection.

The renderer can render the re-projected 360 video data. As described above, re-projection of 360 video data on a 3D space may be represented as rendering of 360 video data on the 3D space. When two processes simultaneously occur in this manner, the re-projection processor and the renderer may be integrated and the renderer may perform the processes. According to an embodiment, the renderer may render only a part viewed by a user according to viewpoint information of the user.

In addition, the renderer can perform a rendering process of reconstructing a texture, a depth, and overlay information of the video into a format suitable for display. A composition process for integrating information of different layers may be performed prior to generating a final video, and an image suitable for a display viewport may be generated and displayed.

The user may view a part of the rendered 360 video through a VR display or the like. The VR display is a device which reproduces 360 video and may be included in a 360 video reception apparatus (tethered) or connected to the 360 video reception apparatus as a separate device (un-tethered).

According to an embodiment of the 360 video reception apparatus according to the present invention, the 360 video reception apparatus may further include a (reception side) feedback processor and/or a network interface (not shown) as internal/external elements. The reception side feedback processor can acquire feedback information from the renderer, the re-projection processor, the data decoder, the decapsulation processor and/or the VR display and process the feedback information. The feedback information may include viewport information, head orientation information, gaze information, and the like. The network interface can receive the feedback information from the reception side feedback processor and transmit the feedback information to a 360 video transmission apparatus.

As described above, the feedback information may be consumed at the reception side as well as being transmitted to the transmission side. The reception side feedback processor may forward the acquired feedback information to internal elements of the 360 video reception apparatus such that the feedback information is reflected in processes such as rendering. The reception side feedback processor can forward the feedback information to the renderer, the re-projection processor, the data decoder and/or the decapsulation processor. For example, the renderer can preferentially render an area viewed by the user using the feedback information. In addition, the decapsulation processor and the data decoder can preferentially decapsulate and decode an area being viewed or will be viewed by the user.

The above-described internal/external elements of the 360 video reception apparatus according to the present invention may be hardware elements. According to an embodiment, the internal/external elements may be changed, omitted, replaced by other elements or integrated. According to an embodiment, additional elements may be added to the 360 video reception apparatus.

Another aspect of the present invention may pertain to a method for transmitting a 360 video and a method for receiving a 360 video. The methods for transmitting/receiving a 360 video according to the present invention may be performed by the above-described 360 video transmission/reception apparatuses or embodiments thereof.

Embodiments of the above-described 360 video transmission/reception apparatuses and transmission/reception methods and embodiments of the internal/external elements of the apparatuses may be combined. For example, embodiments of the projection processor and embodiments of the data encoder may be combined to generate as many embodiments of the 360 video transmission apparatus as the number of cases. Embodiments combined in this manner are also included in the scope of the present invention.

Meanwhile, in a typical content flow process for an omnidirectional media application with projected video of 3DoF, the captured images compose a sphere, which provides viewport from a static viewpoint. Since the viewing position is assumed to be unchanged so it is not easy to provide interactivity between viewer and the VR environment. To provide different viewing experience with viewer's action in the VR environment, changing viewing position with a limitation of viewing boundary should be considered. The different view due to the different viewing position is called head motion parallax.

As described above, the head motion parallax could provide viewers certain degree of freedom of head motion with realistic viewing experience. To support the feature, the ideal content is consist of multiple spheres adjacent to the anchor (or center) sphere while the current content for 3DoF only considers a single sphere. As additional spherical information may be considered for subsidiary viewing positions, conventional content work flow of 3DoF service which is based on the single sphere content should be changed, such as image capture, projection, packing format, file encapsulation, delivery, file decapsulation, rendering process might be changed.

Accordingly, the present invention proposes multiple embodiments to support multiple spherical videos/images which represent different viewing position of a viewpoint. An embodiment includes additional SEI messages that inform viewing position of the decoded picture and related viewing positions and viewing position boundary. In addition, viewing position information of a current image/video and all of the related viewing positions and head motion information for the viewing position boundary of the current image/video may be defined as ISOBMFF and/or OMAF In the definition on the file format, track grouping is proposed as an embodiment of the present invention. In addition, the proposed syntaxes and semantics could be defined in the parameter sets in the video level, such as VPS (Video Parameter Set), SPS (Sequence Parameter Set), and PPS (Picture Parameter Set), to describe the overall distribution of or relationship between viewing positions of the group of video sequences. In the other words, the proposed syntaxes and semantics may be transmitted in the parameter sets of a video codec standards such as HEVC (High efficiency video coding) or VVC (Versatile Video Coding). Also, the proposed syntaxes and semantics may be transmitted through a digital wired/wireless interface, a file format in a system level, etc.

For example, the viewing position information of a current image/video and all of the related viewing positions may be defined in SEI message as shown in the following table.

TABLE 1

|  | Descriptor |
|---|---|
| viewing position info ( payloadSize ) { |  |
|   viewing_position_info_id | u(13) |
|   viewing_position_info_cancel_flag | u(1) |
|   if( ! viewing position info cancel flag ) { |  |
|     viewing_position_info_persistence_flag | u(1) |
|     anchor_viewing_position_flag | u(1) |
|     viewing_position_x | i(32) |
|     viewing_position_y | i(32) |
|     viewing_position_z | i(32) |
|     viewing_orientation_yaw | i(32) |
|     viewing_orientation_pitch | i(32) |
|     viewing_orientation_roll | i(32) |
|     coverage_horizontal | u(32) |
|     coverage_vertical | u(32) |
|     if ( ! anchor viewing position flag ) { |  |
|       anchor_viewing_position_x | i(32) |
|       anchor_viewing_position_y | i(32) |
|       anchor_viewing_position_z | i(32) |
|       anchor_viewing_orientation_yaw | i(32) |
|       anchor_viewing_orientation_pitch | i(32) |
|       anchor_viewing_orientation_roll | i(32) |
|       anchor_coverage_horizontal | u(32) |
|       anchor_coverage_vertical | u(32) |
|     } |  |
|     num_viewing_positions | u(8) |
|     for( i = 0; i < = num viewing positions; i++ ) { |  |
|       set_viewing_position_x[ i ] | i(32) |
|       set_viewing_position_y[ i ] | i(32) |
|       set viewing position z[ i ] | i(32) |
|       set viewing orientation yaw[ i ] | i(32) |
|       set viewing orientation pitch[ i ] | i(32) |
|       set viewing orientation roll[ i ] | i(32) |
|       set coverage horizontal[ i ] | u(32) |
|       set coverage vertical[ i ] | u(32) |
|     } |  |
|   } |  |
| } |  |

Referring to Table 1, viewing position info may represent viewing position information SEI message. The viewing position information SEI message provides information of a viewing position of a current image/video corresponding to a viewpoint and/or information of adjacent viewing positions a viewing position of the current image/video.

Referring to Table 1, the viewing position information may include a viewing_position_info_id field and/or a viewing_position info_cancel_flag field.

The viewing_position_info_id field may indicate an identifying number that may be used to identify the purpose of the viewing position information. For example, the value of the viewing_position_info_id field may be used to indicate the different use cases of this SEI message, to support different receiver capabilities, or to indicate different level of information contained in the SEI message, or different viewpoint, etc.

Specifically, when more than one viewing position information SEI message is present with the same value of the viewing_posidion_info_id field, the content of these viewing position information SEI messages may be the same. When viewing position information SEI messages are present that have more than one value of the viewing_position_info_id field, this may indicate that the information indicated by the different values of the viewing_posidion_info_id field are alternatives that are provided for different purposes or that a cascading of correction to be applied in a sequential order (an order might be specified depending on the application). The value of the viewing_posidion_info_id field shall be in the range of 0 to $2^{12}-1$, inclusive.

The viewing_position_info_cancel_flag field may indicate whether the viewing position information SEI message cancels the persistence of previous viewing position information SEI message in output order that applies to the current layer. For example, the viewing_position_info_cancel_flag field equal to 1 indicates that the viewing position information SEI message cancels the persistence of previous viewing position information SEI message in output order that applies to the current layer. The viewing_position_info_cancel_flag field equal to 0 indicates that viewing position information follows.

Referring to Table 1, the viewing position information may include a viewing_position_info_persistence_flag field, an anchor_viewing_position_flag field, a viewing_position_x field, a viewing_position_y field, a viewing_position_z field, a viewing_orientation_yaw field, a viewing_orientation_pitch field, a viewing_orientation_roll field, a coverage_horizontal field and/or a coverage_vertical field.

The viewing_position_info_persistence_flag field may specify the persistence of the viewing position information SEI message for the current layer. For example, the viewing_position_info_persistence_flag field equal to 0 specifies that the viewing position information applies to the current decoded picture only. Here, the current decoded picture may also be called the current picture or the corresponding decoded picture.

Let picA be the current picture. The viewing_position_info_persistence_flag field to 1 specifies that the viewing position information SEI message persists for the current layer in output order until any of the following conditions are true:

A new CLVS of the current layer begins.
The bitstream ends.
A picture picB in the current layer in an access unit containing a viewing position information SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for the picture order count of picB.

The anchor_viewing_position_flag field may indicate whether the current decoded picture is an anchor (or center or representative) viewing position which could be assumed (0,0,0) in XYZ coordinate or explicitly given by the anchor_viewing_position_x field, the anchor_viewing_position_y field and the anchor_viewing_position_z field. In the other words, the anchor_viewing_position_flag field whether a current viewing position for the current decoded picture may indicate whether the current decoded picture is an anchor (or center or representative) viewing position.

For example, the viewing_position_info_persistence_flag field equal to 1 indicates that the current decoded picture is the anchor (or center or representative) viewing position which could be assumed (0,0,0) in XYZ coordinate or explicitely given by the anchor_viewing_position_x field, the anchor_viewing_position_y field and the anchor_viewing_position_z field. The anchor_viewing_position_flag field equal to 0 indicates that the current decoded picture is periperal or side or non-anchor viewing position and the location, orientation, and coverage information of the anchor viewing position is given by the anchor_viewing_position_x field, the anchor_viewing_position_y field and the anchor_viewing_position_z field.

The viewing_position_x field, the viewing_position_y field, and the viewing_position_z field may indicate the (x,y,z) location of a viewing position corresponding to the current decoded picture in the units of $2^{-16}$ millimeters, respectively. Here, the viewing position corresponding to the current decoded picture may also be called the current viewing position. The range of the viewing_position_x field, the viewing_position_y field and the viewing_position_z field may be in the range of $-32768*2^{16}-1$ (i.e., $-2147483647$) to $32768*2^{16}$ (i.e., 2147483648), inclusive.

The value of the viewing_position_x field, the viewing_position_y field and the viewing_position_z field could be represented by absolute position in the XYZ coordinate or relative position corresponding to a location of the anchor viewing position.

The viewing_orientation_yaw field, the viewing_orientation_pitch field, and the viewing_orientation_roll field may indicate the yaw, pitch, and roll orientation angles in units of $2^{-16}$ degrees, respectively. In the other words, the viewing_orientation_yaw field, the viewing_orientation_pitch field, and the viewing_orientation_roll field may indicate the yaw, pitch, and roll angles of a viewing orientation for the viewing position corresponding to the current decoded picture, respectively. The value of the viewing_orientation_yaw field may be in the range of $-180*2^{16}$ (i.e., $-11796480$) to $180*2^{16}-1$ (i.e., 11796479), inclusive, the value of the viewing_orientation_pitch field may be in the range of $-90*2^{16}$ (i.e., $-5898240$) to $90*2^{16}$ (i.e., 5898240), inclusive, and the value of the viewing_orientation_roll field may be in the range of $-180*2^{16}$ (i.e., $-11796480$) to $180*2^{16}-1$ (i.e., 11796479), inclusive.

Also, depending on the applications, the viewing_orientation_yaw field, the viewing_orientation_pitch field, and the viewing_orientation_roll field could be used to indicate azimuth angle, elevation angle, and tilt angle, respectively. Also, the viewing_orientation_yaw field, the viewing_orientation_pitch field, and the viewing_orientation_roll field could represent the rotation that is applied to the unit sphere of head position corresponding to the current decoded picture to convert the local coordinate axes to the global coordinate axes, respectively.

The coverage_horizontal field and the coverage_vertical field may specify the horizontal and vertical ranges of the coverage of the viewing position corresponding to the current decoded picture, in units of $2^{-16}$ degrees, respectively.

Referring to Table 1, the viewing position information may include an anchor_viewing_position_x field, an anchor_viewing_position_y field, an anchor_viewing_position_z field, an anchor_viewing_orientation_yaw field, an anchor_viewing_orientation_pitch field, an anchor_viewing_orientation_roll field, an anchor_coverage_horizontal field and/or an anchor_coverage_vertical field.

The anchor_viewing_position_x field, the anchor_viewing_position_y field and the anchor_viewing_position_z field may indicate the (x,y,z) location of anchor viewing position of a viewing position set corresponding to the current decoded picture, in the units of $2^{-16}$ millimeters, respectively. The range of the anchor_viewing_position_x field, the anchor_viewing_position_y field and the anchor_viewing_position_z field may be in the range of $-32768*2^{16}-1$ (i.e., $-2147483647$) to $32768*2^{16}$ (i.e., 2147483648), inclusive.

Also, for example, the anchor_viewing_position_x field, the anchor_viewing_position_y field and the anchor_viewing_position_z field could be assumed to be (0, 0, 0), so that the location of other viewing positions in the viewing position set corresponding to the current decoded picture could be represented as the position relative to the anchor viewing position. Here, the other viewing positions are viewing positions other than the anchor viewing position in the viewing position set corresponding to the current decoded picture.

Also, for example, in some applications, the anchor_viewing_position_x field, the anchor_viewing_position_y field and the anchor_viewing_position_z field could be used to indicate the viewpoint.

The anchor_viewing_orientation_yaw field, the anchor_viewing_orientation_pitch field, and the anchor_viewing_orientation_roll field may indicate the yaw, pitch, and roll orientation angles of the sphere representing anchor viewing position in units of $2^{-16}$ degrees, respectively. The value of the anchor_viewing_orientation_yaw field may be in the range of $-180*2^{16}$ (i.e., $-11796480$) to $180*2^{16}-1$ (i.e., 11796479), inclusive, the value of the anchor_viewing_orientation_pitch field may be in the range of $-90*2^{16}$ (i.e., $-5898240$) to $90*2^{16}$ (i.e., 5898240), inclusive, and the value of the anchor_viewing_orientation_roll field may be in the range of $-180*2^{16}$ (i.e., $-11796480$) to $180*2^{16}-1$ (i.e., 11796479), inclusive.

Also, depending on the applications, the anchor_viewing_orientation_yaw field, the anchor_viewing_orientation_pitch field, and the anchor_viewing_orientation_roll field could be used to indicate azimuth angle, elevation angle, and tilt angle, respectively. Also, the anchor_viewing_orientation_yaw field, the anchor_viewing_orientation_pitch field, and the anchor_viewing_orientation_roll field could represent the rotation that is applied to the unit sphere of the anchor viewing position to convert the local coordinate axes to the global coordinate axes, respectively.

The anchor_coverage_horizontal field and the anchor_coverage_vertical field may specify the horizontal and vertical ranges of the coverage of the anchor viewing position, in units of $2^{-16}$ degrees, respectively.

Referring to Table 1, the viewing position information may include a num_viewing_positions field, a set_viewing_position_x[i] field, a set_viewing_position_y[i] field, a set_viewing_position_z[i] field, a set_viewing_orientation_yaw[i] field, a set_viewing_orientation_pitch[i] field, a set_viewing_orientation_roll[i] field, a set_coverage_horizontal[i] field and/or a set_coverage_vertical[i] field.

The num_viewing_positions field may specify the number of viewing positions related to the current viewing position. In the other words, the num_viewing_positions field may specify the number of viewing positions in the viewing position set corresponding to the current decoded picture.

The set_viewing_position_x[i] field, the set_viewing_position_y[i] field and the set_viewing_position_z[i] field may indicate the (x,y,z) location of an i-th viewing position in the viewing position set corresponding to the current decoded picture, in the units of $2^{-16}$ millimeters, respectively. The range of the set_viewing_position_x[i] field, the set_viewing_position_y[i] field and the set_viewing_position_z[i] field may be in the range of $-32768*2^{16}-1$ (i.e., $-2147483647$) to $32768*2^{16}$ (i.e., 2147483648), inclusive.

The value of the set_viewing_position_x[i] field, the set_viewing_position_y[i] field and the set_viewing_position_z[i] field could be represented by absolute position in the XYZ coordinate or relative position corresponding to a location of the anchor location, which shall be aligned with the representation of the viewing_position_x field, the viewing_position_y field and the viewing_position_z field.

The set_viewing_orientation_yaw[i] field, the set_viewing_orientation_pitch[i] field, and the set_viewing_orientation_roll[i] field may indicate the yaw, pitch, and roll orientation angles, respectively, of the i-th viewing position in the viewing position set corresponding to the current decoded picture, in units of $2^{-16}$ degrees. The value of the set_viewing_orientation_yaw[i] field may be in the range of $-180*2^{16}$ (i.e., −11796480) to $180*2^{16}-1$ (i.e., 11796479), inclusive, the value of the set_viewing_orientation_pitch[i] field may be in the range of $-90*2^{16}$ (i.e., −5898240) to $90*2^{16}$ (i.e., 5898240), inclusive, and the value of the set_viewing_orientation_roll[i] field may be in the range of $-180*2^{16}$ (i.e., −11796480) to $180*2^{16}-1$ (i.e., 11796479), inclusive.

Also, depending on the applications, the set_viewing_orientation_yaw[i] field, the set_viewing_orientation_pitch[i] field, and the set_viewing_orientation_roll[i] field could be used to indicate azimuth angle, elevation angle, and tilt angle, respectively, of the i-th viewing position in the viewing position set corresponding to the current decoded picture. Also, the set_viewing_orientation_yaw[i] field, the set_viewing_orientation_pitch[i] field, and the set_viewing_orientation_roll[i] field could represent the rotation that is applied to the unit sphere of the i-th viewing position in the viewing position set corresponding to the current decoded picture to convert the local coordinate axes to the global coordinate axes, respectively.

The set_coverage_horizontal[i] field and the set_coverage_vertical[i] field may specify the horizontal and vertical ranges of the coverage of the i-th viewing position in the viewing position set corresponding to the current decoded picture, in units of $2^{-16}$ degrees, respectively.

For example, the head motion information of a current image/video corresponding to a viewpoint may be defined in SEI message as shown in the following table.

TABLE 2

|  | Descriptor |
|---|---|
| head motion information( payloadSize ) { |  |
| head motion info id | u(15) |
| head_motion_info_cancel_flag | u(1) |
| if(! head motion info cancel flag ) { |  |
| head_motion_info_persistence_flag | u(1) |
| head motion boundary radius min | u(32) |
| head motion boundary radius max | u(32) |
| num nested boundaries minus1 | u(8) |
| for( i = 0; i < num nested boundaries minus1; i++ ) { |  |
|     head_motion_boundary_center_present_flag[ i ] | u(1) |
|     head_motion_boundary_rotation_flag[ i ] | u(1) |
|     head motion boundary asymmetric flag[ i ] | u(1) |
|     head motion boundary type[ i ] | u(4) |
|     if( head motion boundary center present flag[ i ] ) { |  |
|         head_motion_boundary_center_x[ i ] | i(32) |
|         head motion boundary center y[ i ] | i(32) |
|         head motion boundary center z[ i ] | i(32) |
|     } |  |
|     if( head motion boundary rotation flag[ i ] ) { |  |
|         head_motion_boundary_rotation_yaw[ i ] | i(32) |
|         head_motion_boundary_rotation_pitch[ i ] | i(32) |
|         head motion boundary rotation roll[ i ] | i(32) |
|     } |  |
|     if( head motion boundary type[ i ] == 1 ) |  |
|         head motion boundary radius[ i ] | u(32) |
|     else if( head motion boundary type[ i ] == 2) { |  |
|         head_motion_boundary_param_a[ i ] | u(32) |
|         head motion boundary param b[ i ] | u(32) |
|         head motion boundary z max[ i ] | u(32) |
|     } |  |
|     else if( head_motion_boundary_type[ i ] = = 3 \|\| head_motion_ boundary_type[ i ] = = 4 ) { |  |
|         head_motion_boundary_positive_x_axis[ i ] | u(32) |
|         head_motion_boundary_positive_y_axis[ i ] | u(32) |
|         head_motion_boundary_positive_z_axis[ i ] | u(32) |
|         if( head_motion_boundary_type[ i ] = = 4 && head_motion_boundary_asymmetric_flag[ i ] = = 1 ) { |  |
|             head_motion_boundary_negative_x_axis[ i ] | u(32) |
|             head_motion_boundary_negative_y_axis[ i ] | u(32) |
|             head_motion_boundary_negative_z_axis[ i ] | u(32) |
|         } |  |
|     } |  |
|     else if( head_motion_boundary_type[ i ] = = 5 ) { |  |
|         head_motion_boundary_param_a[ i ] | u(32) |
|         head_motion_boundary_param_b[ i ] | u(32) |
|         head_motion_boundary_symmetry_axis[ i ] | u(8) |
|     } |  |
|     else if(head_motion_boundary_type[ i ] = = 6 ) { |  |
|         head_motion_boundary_param_a[ i ] | u(32) |
|         head_motion_boundary_param_b[ i ] | u(32) |
|         head_motion_boundary_param_c[ i ] | u(32) |

TABLE 2-continued

| | Descriptor |
|---|---|
| ```
    }
    else if( head_motion_boundary_type[ i ] = = 15 ) {
        num_boundary_vertex_minus4[ i ]
        for( j=0; j<num_boundary_vertex_minus4[ i ]+4; j++ ) {
            boundary_vertex_x[ i ][ j ]
            boundary_vertex_y[ i ][ j ]
            boundary_vertex_z[ i ][ j ]
        }
    }
  }
 }
}
``` | u(8)<br><br><br>i(32)<br>i(32)<br>i(32) |

Referring to Table 2, head motion information may represent head motion information SEI message. The head motion information SEI message provides information of the head motion boundary of the current image/video corresponding to a viewpoint. Here, head motion boundary or viewing space represent the 3D space of viewing positions within which rendering of image and video is enabled and VR experience is valid. Also, in the receiver, a viewport could be generated by a decoded picture of a viewing position or a synthesized/reconstructed picture for an intermediate viewing position.

Referring to Table 2, the head motion information may include a head_motion info id field and/or a head_motion_info_cancel_flag field.

The head_motion_info_id field may indicate an identifying number that may be used to identify the purpose of the head motion information. The value of the head_motion_info_id field may be used to indicate the different use cases of this SEI message, to support different receiver capabilities, or to indicate different level of information contained in the SEI message, or different viewpoint, etc.

Specifically, when more than one head motion information SEI message is present with the same value of the head_motion_info_id field, the content of these head motion information SEI messages may be the same. When head position information SEI messages are present that have more than one value of the head_motion_info_id field, this may indicate that the information indicated by the different values of the head_motion_info_id field are alternatives that are provided for different purposes or that a cascading of correction to be applied in a sequential order (an order might be specified depending on the application). The value of the head_position_info_id field shall be in the range of 0 to 212-1, inclusive.

The head_motion_info_cancel_flag field may indicate whether the head motion information SEI message cancels the persistence of previous head position information SEI message in output order that applies to the current layer. For example, the head_motion_info_cancel_flag field equal to 1 indicates that the head motion information SEI message cancels the persistence of previous head position information SEI message in output order that applies to the current layer. The head_motion_info_cancel_flag field equal to 0 indicates that head motion information follows.

Referring to Table 2, the head motion information may include a head_motion_info_persistence_flag field, a num_nested_boundaries_minus1 field, a head_motion_boundary_center_present_flag[i] field, a head_motion_boundary_rotation_flag[i] field, a head_motion_boundary_asymmetric_flag[i] field, head_motion_boundary_type[i] field, a head_motion_boundary_radius_min field and/or a head_motion_boundary_radius_max field.

The head_motion_info_persistence_flag field may specify the persistence of the head motion information SEI message for the current layer. For example, the head_motion_info_persistence_flag field equal to 0 specifies that the head motion information applies to the current decoded picture only.

Let picA be the current picture. The head_motion_info_persistence_flag field to 1 specifies that the head motion information SEI message persists for the current layer in output order until any of the following conditions are true:

A new CLVS of the current layer begins.

The bitstream ends.

A picture picB in the current layer in an access unit containing a head motion information SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for the picture order count of picB.

The num_nested_boundaries_minus1 field may specify a number of nesting shapes of a head motion boundary. Here, the head motion boundary may be called viewing position boundary or viewing space. When the num_nested_boundaries_minus1 field is greater than 1, the head motion boundaries may be informed in the descending order of the ranges, i.e., from the outermost boundary to the innermost boundary.

The head_motion_boundary_center_present_flag[i] field may indicate whether information on the center location of an i-th head motion boundary is present in the head motion information SEI message. Here, the i-th head motion boundary may be called i-th viewing position boundary or i-th viewing space. The head_motion_boundary_center_present_flag[i] field equal to 1 indicates that the information on the center location of the i-th head motion boundary is present in the head motion information SEI message. The head_motion_boundary_center_present_flag[i] field equal to 0 indicates that the information on the center location of the i-th head motion boundary is not present in the head motion information SEI message. Also, depending on the applications, the head_motion_boundary_center_present_flag[i] field equal to 0 could indicate that the center of the i-th head motion boundary is identical to the center of the anchor viewing position or (0,0,0) in XYZ coordinate.

Also, when the num_nested_boundaries_minus1 field is greater than 1, the head_motion_boundary_center_present_flag[i] field equal to 0 could indicate that the center of the i-th head motion boundary is identical to the center of the outermost boundary, i.e., the center of the 0-th head motion boundary.

The head_motion_boundary_rotation_flag[i] field may indicate whether information on yaw, pitch, and roll rotation of the i-th head motion boundary is present in the head motion information SEI message. The head_motion_boundary_rotation_flag[i] field equal to 1 indicates that the information on the yaw, pitch, and roll rotation of the i-th head motion boundary is present in the head motion information SEI message. The head_motion_boundary_rotation_flag[i] field equal to 0 indicates that the information on the yaw, pitch, and roll rotation of the i-th head motion boundary is not present in the head motion information SEI message. Also, depending on the applications, the head_motion_boundary_rotation_flag[i] field equal to 0 could indicate that the yaw, pitch, and roll rotation of the i-th head motion boundary is (0, 0, 0) or identical to the rotation of anchor viewing position.

Also, when the num_nested_boundaries_minus1 field is greater than 1, the head_motion_boundary_rotation_flag[i] field equal to 0 could indicate that the yaw, pitch, and roll rotation of the i-th head motion boundary is identical to the yaw, pitch, and roll of the outermost boundary, i.e., the yaw, pitch, and roll of the 0-th head motion boundary, respectively.

The head_motion_boundary_asymmetric_flag[i] field may indicate whether shape of the i-th head motion boundary is not symmetric in terms of the center. The head_motion_boundary_asymmetric_flag[i] field equal to 1 indicates that the shape of the i-th head motion boundary is not symmetric in terms of the center. The head_motion_boundary_asymmetric_flag[i] field equal to 0 indicates that the shape of the i-th head motion boundary is symmetric in terms of the center.

The head_motion_boundary_type[i] field may specify shape type of the head motion boundary. For example, the head_motion_boundary_type[i] field equal to 0 indicates undefined. The head_motion_boundary_type[i] field equal to 1 indicates a sphere. The head_motion_boundary_type[i] field equal to 2 indicates a paraboloid shape. The head_motion_boundary_type[i] field equal to 3 indicates a cube. The head_motion_boundary_type[i] field equal to 4 indicates a rectangular prism. The head_motion_boundary_type[i] field equal to 5 indicates a spheroid. The head_motion_boundary_type[i] field equal to 6 indicates a tri-axial ellipsoid. The head_motion_boundary_type[i] field equal to 15 indicates a shape defined by vertexes. Also, other values of the head_motion_boundary_type[i] field is preserved for future use.

Figure 10:
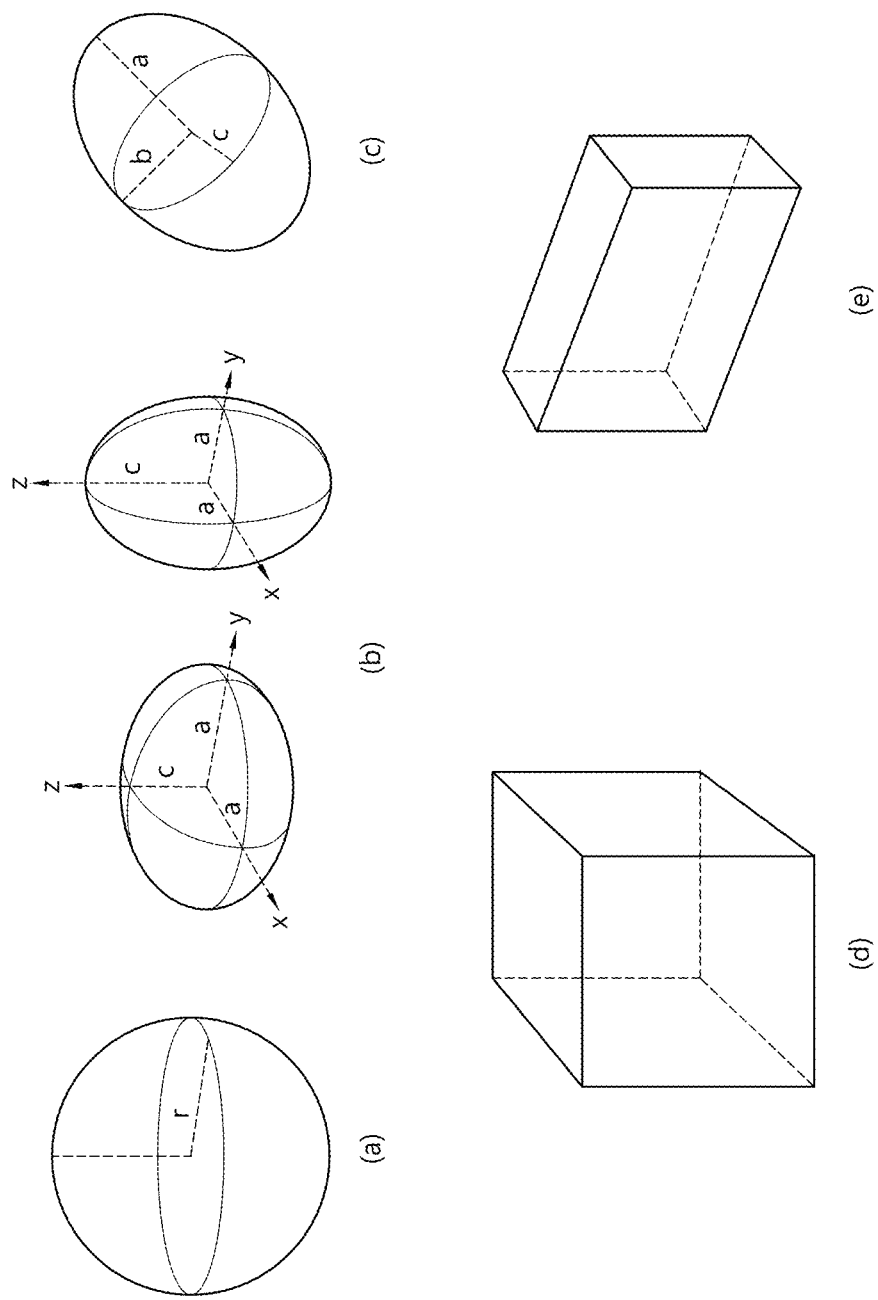
FIG. 10 illustrates multiple shape types of the head_motion_boundary.

FIG. 10 illustrates multiple shape types of the head_motion_boundary. Referring to FIG. 10, shape types of the head motion boundary may include the sphere, the spheroid, the tri-axial ellipsoid, the cube and the rectangular prism. For example, FIG. 10(a) illustrates the sphere, FIG. 10(b) illustrates the spheroid, FIG. 10(c) illustrates the tri-axial ellipsoid, FIG. 10(d) illustrates the cube, FIG. 10(e) illustrates the rectangular prism.

The head_motion_boundary_radius_min field and the head_motion_boundary_radius_max field may indicate minimum and maximum radius of the head motion boundary from the center of the head motion boundary. When the head_motion_boundary_type[i] field equal to 1, the head_motion_boundary_radius_min field and the head_motion_boundary_radius_max field may be identical. When the head_motion_boudnary_type field not equal to 1, the head_motion_boundary_radius_min field and the head_motion_boundary_radius_max field could provide approximated boundary.

Referring to Table 2, the head motion information may include a head_motion_boundary_center_x[i] field, a head_motion_boundary_center_y[i] field and/or a head_motion_boundary_center_z[i] field.

The head_motion_boundary_center_x[i] field, the head_motion_boundary_center_y[i] field and the head_motion_boundary_center_z[i] field may indicate the (x,y,z) location of the center of the i-th head motion boundary of the viewing position corresponding to the current decoded picture in the units of $2^{-16}$ millimeters, respectively. Here, the viewing position corresponding to the current decoded picture may be called the current viewing position. The head_motion_boundary_x[i] field, the head_motion_boundary_y[i] field and the head_motion_boundary_z[i] field may be in the range of $-32768*2^{16}-1$ (i.e., −2147483647) to $32768*2^{16}$ (i.e., 2147483648), inclusive.

Referring to Table 2, the head motion information may include a head_motion_boundary_rotation_yaw[i] field, a head_motion_boundary_rotation_pitch[i] field and/or a head_motion_boundary_rotation_roll[i] field.

The head_motion_boundary_rotation_yaw[i] field, the head_motion_boundary_rotation_pitch[i] field, and the head_motion_boundary_rotation_roll[i] field may indicate the yaw, pitch, and roll rotation angles of a shape of the i-th head motion boundary in units of $2^{-16}$ degrees, respectively. The value of the head_motion_boundary_rotation_yaw[i] field may be in the range of $-180*2^{16}$ (i.e., −11796480) to $180*2^{16}-1$ (i.e., 11796479), inclusive, the value of the head_motion_boundary_rotation_pitch[i] field may be in the range of $-90*2^{16}$ (i.e., −5898240) to $90*2^{16}$ (i.e., 5898240), inclusive, and the value of the head_motion_boundary_rotation_roll[i] field may be in the range of $-180*2^{16}$ (i.e., −11796480) to $180*2^{16}-1$ (i.e., 11796479), inclusive.

Also, depending on the applications, the head_motion_boundary_rotation_yaw[i] field, the head_motion_boundary_rotation_pitch[i] field, and the head_motion_boundary_rotation_roll[i] field could be used to indicate azimuth angle, elevation angle, and tilt angle, respectively. Also, the head_motion_boundary_rotation_yaw[i] field, the head_motion_boundary_rotation_pitch[i] field, and the head_motion_boundary_rotation_roll[i] field could represent the orientation of the i-th head motion boundary.

Referring to Table 2, the head motion information may include a head_motion_boundary_radius[i] field, a head_motion_boundary_param_alpha[i] field, a head_motion_boundary_param_beta[i] field and/or a head_motion_boundary_z_max[i] field.

The head_motion_boundary_radius[i] field may indicate the radius of the i-th head motion boundary. Here, the radius of the i-th head motion boundary may indicates the distance from the center to the outermost boundary. The range of the head_motion_boundary_radius [i] field may be in the range of 0 to $65536*2^{16}-1$ (i.e., 4294967295), inclusive.

The head_motion_boundary_param_alpha[i] field, the head_motion_boundary_param_beta[i] field, and the head_motion_boundary_z_max[i] field may specify the parameter values of paraboloid shape of the i-th head motion boundary. Here, the head_motion_boundary_param_alpha[i] field may be called the head_motion_boundary_param_a[i] field, and the head_motion_boundary_param_beta[i] field may be called the head_motion_boundary_param_b[i] field. The ranges of the head_motion_boundary_param_alpha[i] field, the head_motion_boundary_param_beta[i] field, and the head_motion_boundary_z_max[i] field may be in the range of 0 to $65536*2^{16}-1$ (i.e., 4294967295), inclusive.

Referring to Table 2, the head motion information may include a head_motion_boundary_positive_x_axis[i] field, a head_motion_boundary_negative_x_axis[i] field, a head_motion_boundary_positive_y_axis[i] field, a head_motion_boundary_negative_y_axis[i] field, a head_motion_boundary_positive_z_axis[i] field and/or a head_motion_boundary_negative_z_axis[i] field.

The head_motion_boundary_positive_x_axis[i] field, the head_motion_boundary_negative_x_axis[i] field, the head_motion_boundary_positive_y_axis[i] field, the head_motion_boundary_negative_y_axis[i] field, the head_motion_boundary_positive_z_axis[i] field and the head_motion_boundary_negative_z_axis[i] field may indicate the range of the i-th head motion boundary in the directions of x, y, and z axis of positive and negative directions in the units of $2^{-16}$ millimeters, respectively, where the XYZ axises are local coordinated rotated in the amount of the head_motion_boundary_rotation_yaw[i] field, the head_motion_boundary_rotation_pitch[i] field, and the head_motion_boundary_rotation_roll[i] field for yaw, pitch, and roll, respectively. The value of the head_motion_boundary_positive_x_axis[i] field, the head_motion_boundary_negative_x_axis[i] field, the head_motion_boundary_positive_y_axis[i] field, the head_motion_boundary_negative_y_axis[i] field, the head_motion_boundary_positive_z_axis[i] field, and the head_motion_boundary_negative_z_axis[i] field may be in the range of 0 to $65536*2^{16}-1$ (i.e., 4294967295), inclusive. Meanwhile, for example, when the head_motion_boundary_type[i] field is equal to 4, and the head_motion_boundary_asymmetric_flag[i] field is equal to 1, the head motion information may include the head_motion_boundary_negative_x_axis[i] field, the head_motion_boundary_negative_y_axis[i] field, the head_motion_boundary_negative_z_axis[i] field. Also, for example, when the head_motion_boundary_type[i] field is not equal to 4 or the head_motion_boundary_asymmetric_flag[i] field is equal to 0, the head motion information may not include the head_motion_boundary_negative_x_axis[i] field, the head_motion_boundary_negative_y_axis[i] field, the head_motion_boundary_negative_z_axis[i] field.

Referring to Table 2, the head motion information may include a head_motion_boundary_param_a[i] field, a head_motion_boundary_param_b[i] field, a head_motion_boundary_param c[i] field and/or a head_motion_boundary_symmetry_axis[i] field.

The head_motion_boundary_param_a[i] field, the head_motion_boundary_param_b[i] field, and the head_motion_boundary_param_c[i] field may specify the parameter values of the i-th head motion boundary of spheroid or tri-axis ellipsoid shape. In the other words, the head_motion_boundary_param_a[i] field, the head_motion_boundary_param_b[i] field, and the head_motion_boundary_param_c[i] field may specify the parameter values of the i-th head motion boundary that the shape type is the spheroid or the tri-axis ellipsoid shape. The ranges of the head_motion_boundary_param_a[i] field, the head_motion_boundary_param_b[i] field, and the head_motion_boundary_param_c[i] field may be in the range of 0 to $65536*2^{16}-1$ (i.e., 4294967295), inclusive.

The head_motion_boundary_symmetry_axis[i] field may specify the axis that the spheroid is symmetric when the center is (0,0,0). For example, when the head_motion_boundary_symmetry_axis[i] field equal to 0, the symmetry axis is indicated as x axis when the center is (0,0,0). When the head_motion_boundary_symmetry_axis[i] field equal to 1, the symmetry axis is indicated as y axis when the center is (0,0,0). When the head_motion_boundary_symmetry_axis[i] field equal to 2, the symmetry axis is indicated as z axis when the center is (0,0,0). The other values of the head_motion_boundary_symmetry_axis[i] field are reserved.

Referring to Table 2, the head motion information may include a num_boundary_vertex_minus4[i] field, a boundary_vertex_x[i][j] field, a boundary_vertex_y[i][j] field, and/or a boundary_vertex_z[i][j] field.

The num_boundary_vertex_minus4[i] field may specify the number of vertexes that describes the head motion boundary. Specifically, the num_boundary_vertex_minus4 field plus 4 may specify the number of vertexes that describes the i-th head motion boundary.

The boundary_vertex_x[i][j] field, the boundary_vertex_y[i][j] field, and the boundary_vertex_z[i][j] field may specify a location of an j-th vertex that describes the i-th head motion boundary in XYZ coordinate in the units of $2^{-16}$ millimeters, respectively. The boundary_vertex_x[i][j] field, the boundary_vertex_y[i][j] field, and the boundary_vertex_z[i][j] field may be in the range of $-32768*2^{16}-1$ (i.e., −2147483647) to $32768*2^{16}$ (i.e., 2147483648), inclusive. Also, in some applications, vertexes of the head motion boundary could be a subset of the viewing positions belongs to the viewpoint for the current picture.

Also, the shape of the i-th head motion boundary is given as follows.

For example, inputs to this process are:

the viewing position (x, y) in units of meters, the center point of the head motion boundary $(x_c, y_c, z_c)$, given by the head_motion_boundary_center_x[i] field, the head_motion_boundary_center_y[i] field, and the head_motion_boundary_center_z[i] field, respectively, all in units of $2^{-16}$ luma samples, the rotation parameters $(\alpha_c, \beta_c, \gamma_c)$, given by the head_motion_boundary_rotation_yaw[i] field, the head_motion_boundary_rotation_pitch[i] field, and the head_motion_boundary_rotation_roll[i] field, respectively, all in units of 2-16 degrees, and inputs depending on the head_motion_boundary_type[i] field:

when the head_motion_boundary_type[i] field==1, the radius (r) of a sphere given by the head_motion_boundary_radius [i] field in units of $2^{-16}$ luma samples when the head_motion_boundary_type[i] field==2, the parameters (a, b) of the paraboloid given by the head_motion_boundary_param_a[i] field and the head_motion_boundary_param_b[i] field, respectively, in the units of $2^{-16}$ when the head_motion_boundary_type[i] field==3, the XYZ range $(x_p, y_p, z_p)$ given by the head_motion_boundary_positive_x_axis[i] field, the head_motion_boundary_positive_y_axis[i] field, and the head_motion_boundary_positive_z_axis[i] field, respectively, in the units of $2^{-16}$ meters, when the head_motion_boundary_type[i] field==4, the XYZ ranges $(x_p, y_p, z_p, x_n, y_n, z_n)$ given by the head_motion_boundary_positive_x_axis[i] field, the head_motion_boundary_positive_y_axis[i] field, the head_motion_boundary_positive_z_axis[i] field, the head_motion_boundary_negative_x_axis[i] field, the head_motion_boundary_negative_y_axis[i] field, and the head_motion_boundary_negative_z_axis[i] field, respectively, in the units of $2^{-16}$ meters, when the head_motion_boundary_type[i] field==5, the parameter values (a, b) for the spheroid given by the head_motion_boundary_param_a[i] field and the head_motion_boundary_param_b[i] field, respectively, in the units of $2^{-16}$, when the head_motion_boundary_type[i] field==6, the parameter values (a, b, c) for the tri-axis ellipsoid given by the head_motion_boundary_param_a[i] field, the head_motion_boundary_param_b[i] field, and the head_motion_boundary_param_c[i] field, respectively, in the units of $2^{-16}$, Outputs of this process are the boundary shape of the head motion:

if(the head_motion_boundary_type[i] field==1)

$$r^2 = x_1^2 + y_1^2 + z_1^2$$

else if(the head_motion_boundary_type[i] field==2)

$$z_1 = x_1^2 \geq a^2 + y_1^2 + b^2$$

for $z_1$<the head_motion_boundary_z_max[i] field else if(the head_motion_boundary_type[i] field==3)

$$|x_1| <= x_p, |y_1| <= y_p, |z_1| <= z_p$$

else if(the head_motion_boundary_type[i] field==4)

$$-x_n <= x_1 <= x_p, -y_n <= y_1 <= y_p, -z_n <= z_1 <= z_p$$

else if(the head_motion_boundary_type[i] field==5 && the head_motion_boundary_symmetry_axis[i] field==0)

$$1 = (x_1^2 + y_1^2) \div a^2 + z_1^2 \div b^2$$

else if(the head_motion_boundary_type[i] field==5 && the head_motion_boundary_symmetry_axis[i] field==1)

$$1 = (x_1^2 + z_1^2) \div a^2 + y_1^2 \div b^2$$

else if(the head_motion_boundary_type[i] field==5 && the head_motion_boundary_symmetry_axis[i] field==2)

$$1 = (y_1^2 + z_1^2) \div a^2 + x_1^2 \div b^2$$

else if(the head_motion_boundary_type[i] field==6)

$$1 = x_1^2 \div a^2 + y_1^2 \div b^2 + z_1^2 \div c^2$$

Here, $$x_2 = \cos(\beta_c)\ast\cos(\gamma_c)\ast x_1 - \cos(\beta_c)\ast\sin(\gamma_c)\ast y_1 + \sin((\beta_c)\ast z_1$$

$$y_2 = (\cos(\alpha_c)\ast\sin(\gamma_c) + \sin(\alpha_c)\ast\sin(\beta_c)\ast\cos(\gamma_c))\ast x_1 + (\cos(\alpha_c)\ast\cos(\gamma_c) - \sin(\alpha_c)\ast\sin(\beta_c)\ast\sin(\gamma_c))\ast y_1 - \sin(\alpha_c)\ast\cos(\beta_c)\ast z_1$$

$$z_2 = (\sin(\alpha_c)\ast\sin(\gamma_c) - \cos(\alpha_c)\ast\sin(\beta_c)\ast\cos(\gamma_c))\ast x_1 + (\sin(\alpha_c)\ast\cos(\gamma_c) + \cos(\alpha_c)\ast\sin(\beta_c)\ast\sin(\gamma_c))\ast y_1 + \cos(\alpha_c)\ast\cos(\beta_c)\ast z_1$$

$$x = x_2 + x_c$$

$$y = y_2 + y_c$$

$$z = z_2 + z_c$$

Figure 11:
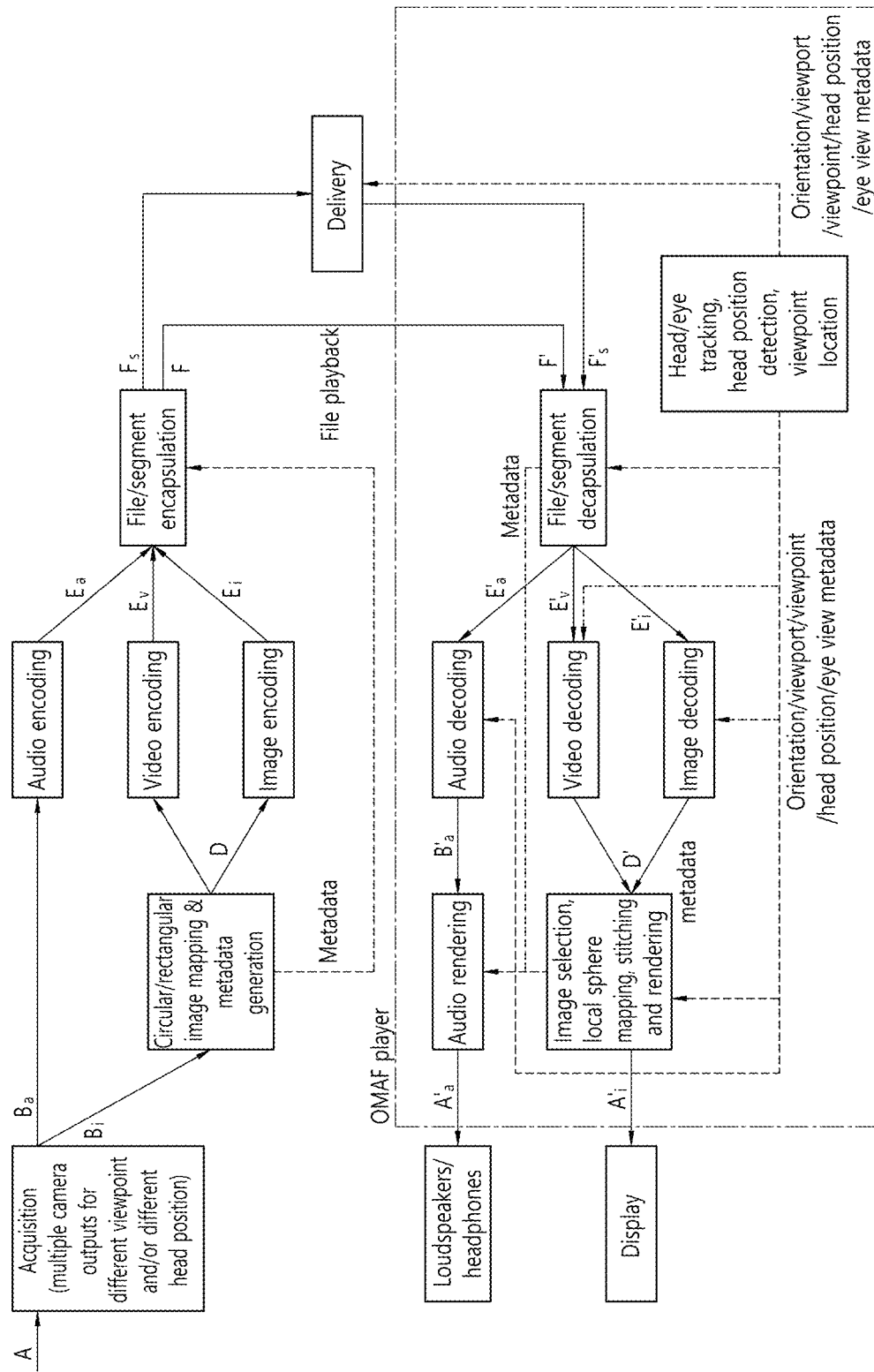
FIG. 11 illustrates overall architecture for providing a 3DoF content/3DoF+ content in which the viewing position information and the head motion information are used.

FIG. 11 illustrates overall architecture for providing a 3DoF content/3DoF+ content in which the viewing position information and the head motion information are used.

Referring to FIG. 11, end-to-end flow chart of multi-view 3DoF+ video is described which is composed by projection process, packing process and encoding process per viewing position and viewpoint, and then decoding process, unpacking process, and rendering process of a selected viewing position of a viewpoint.

Specifically, a real-world audio-visual scene (A) may be captured by audio sensors as well as a set of cameras or a camera device with multiple lenses and sensors. The acquisition may result in a set of digital image/video (Bi) and audio (Ba) signals. The cameras/lenses typically may cover all directions around the centre point of the camera set or camera device, thus the name of 360-degree video.

The images (Bi) captured by texture/depth camera lenses at the same time instance and/or different head position and/or different viewpoint may be stitched, possibly rotated, projected per view and/or viewpoint, and then mapped onto a packed picture (D).

The packed pictures (D) may be encoded as coded images (Ei) or a coded video bitstream (Ev). The captured audio (Ba) may be encoded as an audio bitstream (Ea). The coded images, video, and/or audio may be then composed into a media file for file playback (F) or a sequence of an initialization segment and media segments for streaming (Fs), according to a particular media container file format. The media container file format might be the ISO Base Media File Format. The file encapsulator also may include metadata into the file or the segments, such as viewing position information and head motion boundary information assisting in rendering the decoded packed pictures.

For example. the metadata in the file includes:
metadata on viewing position of each decoded picture and overall viewing position distribution including anchor viewing position,
metadata on head motion boundary information of a viewpoint, location and rotation of a local sphere coordinate per viewing position per viewpoint,
metadata on the projection format of the projected picture per viewing position per viewpoint,
metadata on the coverage of the projected picture per viewing position per viewpoint,
metadata on optional region-wise packing information, and
metadata on region-wise quality ranking.

The segments Fs may be delivered using a delivery mechanism to a player.

The file that the file encapsulator outputs (F) maybe or maybe not identical to the file that the file decapsulator inputs (F'). A file decapsulator may process the file (F') or the received segments (F's) and extract the coded bitstreams (E'a, E'v, and/or E'i) selected by the view port, viewing position, and viewpoint of the viewer and parse the related metadata. The audio, video, and/or image may be then decoded into decoded signals (B'a for audio, and D' for images/video). The decoded packed pictures (D') may be projected onto the screen of a head-mounted display or any other display device based on the current viewing orientation or viewport and/or view (head position) and/or viewpoint and the projection, spherical coverage, rotation, region-wise packing, viewing position, and head motion boundary metadata parsed from the file. Likewise, decoded audio (B'a) may be rendered, e.g. through headphones, according to the current viewing orientation. The current viewing orientation may be determined by the head tracking and possibly also eye tracking functionality. Besides being used by the renderer to render the appropriate part of decoded video and audio signals, the current viewing orientation may also be used by the video and audio decoders for decoding optimization.

Meanwhile, for example, the syntax of the viewing position information and the head motion boundary information may be defined in the file format domain, such as ISOBMFF, OMAF. In other words, the viewing position information and/or the head motion boundary information may be included in a form of a box in the file format domain, such as ISOBMFF, OMAF.

According to an embodiment, ViewingPositionInfoBox may be defined as shown in the following table.

TABLE 3

| | |
|---|---|
| Box Type: | 'vpst' |
| Container: | ProjectedOmniVideoBox and/or TrackGroupTypeBox |
| Mandatory: | Yes |
| Quantity: | Zero or one |

The ViewingPositionInfoBox may specify the information of the viewing position of the current image/video corresponding to a viewpoint and/or corresponding adjacent viewing positions of the viewing position of the current image/video.

For example, The ViewingPositionInfoBox may include the viewing position information of the current image/video and all of the related viewing positions as shown in the following table.

TABLE 4

```
aligned(8) class ViewingPositionInfoBox extends FullBox('vpst', 0, 0) {
    ViewingPositionInfoStruct( );
}
aligned(8) class ViewingPositionInfoStruct ( ) {
    unsigned int(1) anchor_viewing_position_flag;
    signed int(32) viewing_position_x;
    signed int(32) viewing_position_y;
    signed int(32) viewing_position_z;
    signed int(32) viewing_orientation_yaw;
    signed int(32) viewing_orientation_pitch;
    signed int(32) viewing_orientation_roll  ;
    unsigned int(32) coverage_horizontal;
    unsigned int(32) coverage_vertical;
    if( !anchor_viewing_position_flag ) {
        signed int(32) anchor_viewing_position_x;
        signed int(32) anchor_viewing_position_y;
        signed int(32) anchor_viewing_position_z;
```

TABLE 4-continued

```
        signed int(32) anchor_viewing_orientation_yaw;
        signed int(32) anchor_viewing_orientation_pitch;
        signed int(32) anchor_viewing_orientation_roll;
        unsigned int(32) anchor_coverage_horizontal;
        unsigned int(32) anchor_coverage_vertical;
    }
    unsigned int(8) num_viewing_positions;
    for( i = 0; i < = num_viewing_positions; i++ ) {
        signed int(32) set_viewing_position_x[ i ];
        signed int(32) set_viewing_position_y[ i ];
        signed int(32) set_viewing_position_z[ i ];
        signed int(32) set_viewing_orientation_yaw[ i ];
        signed int(32) set_viewing_orientation_pitch[ i ];
        signed int(32) set_viewing_orientation_roll[ i ];
        unsigned int(32) set_coverage_horizontal[ i ];
        unsigned int(32) set_coverage_vertical[ i ];
    }
}
```

The meanings of syntaxs in the HeadMotionBoundaryInfoBox is identical to meanings of the syntax in the head motion information SEI message described above.

According to an embodiment, HeadMotionBoundaryInfoBox may be defined as shown in the following table.

TABLE 5

| | |
|---|---|
| Box Type: | 'hmbd' |
| Container: | ProjectedOmniVideoBox and/or TrackGroupTypeBox |
| Mandatory: | Yes |
| Quantity: | Zero or one |

The HeadMotionBoundaryInfoBox may specify the information of the head motion boundary of the current image/video corresponding to a viewpoint.

For example, The HeadMotionBoundaryInfoBox may include the head motion information of the current image/video as shown in the following table.

TABLE 6

```
aligned(8) class HeadMotionBoundaryInfoStruct ( ) {
    unsigned int(32) head_motion_boundary_radius_min;
    unsigned int(32) head_motion_boundary_radius_max;
    unsigned int(8) num_nested_boundaries_minus1;
    for( i = 0; i < num_nested_boundaries_minus1; i++ ) {
        unsigned int(1) head_motion_boundary_center_present_flag;
        unsigned int(1) head_motion_boundary_rotation_flag;
        unsigned int(1) head_motion_boundary_asymmetric_flag;
        unsigned int(4) head_motion_boundary_type;
        if( head_motion_boundary_center_present_flag ) {
            signed int(32) head_motion_boundary_center_x;
            signed int(32) head_motion_boundary_center_y;
            signed int(32) head_motion_boundary_center_z;
        }
        if( head_motion_boundary_rotation_flag ) {
            signed int(32) head_motion_boundary_rotation_yaw;
            signed int(32) head_motion_boundary_rotation_pitch;
            signed int(32) head_motion_boundary_rotation_roll;
        }
        if( head_motion_boundary_type = = 1 )
            unsigned int (32) head_motion_boundary_radius;
        else if( head_motion_boundary_type = = 2 ) {
            unsigned int (32) head_motion_boundary_param_a;
            unsigned int (32) head_motion_boundary_param_b;
            unsigned int (32) head_motion_boundary_z_max;
        }
        else if( head_motion_boundary_type = = 3 || head_motion_boundary_type = = 4 ) {
            unsigned int(32) head_motion_boundary_positive_x_axis;
            unsigned int(32) head_motion_boundary_positive_y_axis;
            unsigned int(32) head_motion_boundary_positive_z_axis;
            if (( head_motion_boundary_type[ i ] = = 4 && head_motion_boundary_asymmetric_flag[ i ] = = 1 ) {
                unsigned int(32) head_motion_boundary_negative_x_axis;
                unsigned int(32) head_motion_boundary_negative_y_axis;
                unsigned int(32) head_motion_boundary_negative_z_axis;
```

TABLE 6-continued

```
        }
    }
    else if( head_motion_boundary_type == 5 ) {
        unsigned int (32) head_motion_boundary_param_a;
        unsigned int (32) head_motion_boundary_param_b;
        unsigned int (32) head_motion_boundary_symmetry_axis;
    }
    else if( head_motion_boundary_type == 6 ) {
        unsigned int (32) head_motion_boundary_param_a;
        unsigned int (32) head_motion_boundary_param_b;
        unsigned int (32) head_motion_boundary_param_c;
    }
    else if( head_motion_boundary_type == 15 ) {
        unsigned int(8) num_boundary_vertex_minus4;
        for( j=0; j< num_boundary_vertex_minus4+4; j++ ) {
            signed int(32) boundary_vertex_x[ j ];
            signed int(32) boundary_vertex_y[ j ];
            signed int(32) boundary_vertex_z[ j ];
        }
    }
}
}
```

The meanings of syntaxs in the HeadMotionBoundaryInfoBox is identical to meanings of the syntax in the head motion information SEI message described above.

Meanwhile, TrackGroupTypeBox with track_group_type equal to 'vpgr' may indicate that this track belongs to a group of tracks representing each viewing position that provides different views, e.g., head motion parallax, at a viewpoint. So, the visual tracks mapped to this grouping (i.e. the visual tracks that have the same value of track_group_id within TrackGroupTypeBox with track_group_type equal to 'vpgr') collectively represent visual content that can be presented. Each individual visual track mapped to this grouping may or may not be intended to be presented alone without other visual tracks, while composition pictures are suitable to be presented.

According to an embodiment, the TrackGroupTypeBox with track_group_type equal to 'vpgr' may be defined as shown in the following table.

TABLE 7

```
aligned(8) class ViewingPosionGroupBox extends
TrackGroupTypeBox('vpgr') {
    ViewingPositionInfoBox( );
    HeadMotionBoundaryInfoBox( );
    // optional boxes
}
```

Meanwhile, the dynamic viewing position timed metadata track may include the head motion boundary (viewing space) parameters, the viewing position information of the current image/video and all of the related viewing positions. The dynamic viewing position timed metadata track may indicate the viewing position and/or head motion boundary (viewing space) parameters that are dynamically changing over time. An OMAF player may use the signalled information as follows when starting playing back of one viewing point after switching from another viewpoint.

For example, the track sample entry type 'vpvs' could be used. The sample entry of this sample entry type may be specified as shown in the following table.

TABLE 8

```
class DynamicViewingPositionViewingSpaceSampleEntry extends
MetaDataSampleEntry('vpvs') {
```

TABLE 8-continued

```
    ViewingPositionInfoStruct( );
    HeadMotionBoundaryInfoStruct( );
}
```

When the shape and characteristics of the viewing space is not changed, ViewingPositionInfoStruct( ) and HeadMotionBoundaryInfoStruct( ), or subset of syntax elements of them could be defined in sample entry. The semantics of ViewingPositionInfoStruct( ) and HeadMotionBoundaryInfoStruct( ) may follow the definitions in the above. In other words, the semantics of ViewingPositionInfoStruct( ) and HeadMotionBoundaryInfoStruct( ) are identical to meanings of the syntax in the head motion information SEI message described above.

Meanwhile, for example, the track sample entry type 'vpvs' could be used. The sample syntax of this sample entry type may be specified as shown in the following table.

TABLE 9

```
aligned(8) DynamicViewingPositionViewingSpaceSample( ) {
    ViewingPositionInfoStruct( );
    HeadMotionBoundaryInfoStruct( );
}
```

The semantics of ViewingPositionInfoStruct( ) and HeadMotionBoundaryInfoStruct( ) may follow the definitions in the above. In other words, the semantics of ViewingPositionInfoStruct( ) and HeadMotionBoundaryInfoStruct( ) are identical to meanings of the syntax in the head motion information SEI message described above.

Meanwhile, when a broadcast service for 3DoF+ contents is provided through the DASH based adaptive streaming model or a video of the 3DoF+ contents is streamed through the DASH based adaptive streaming model, the above-described fields related metadata (i.e. the viewing position information and the head motion boundary information) can be signaled in a DASH based descriptor format included in a DASH MPD. That is, the above-described embodiments can be modified in the DASH based descriptor format. The DASH based descriptor format can include an EssentialProperty descriptor and a SupplementalProperty descriptor. A descriptor representing the aforementioned fields of 360 video related metadata can be included in AdaptationSet, Representation or SubRepresentation of the MPD.

For example, a DASH based descriptor can include an @schemeIdUri field, an @ value field and/or an @id field.

The @schemeIdUri field can provide a URI for identifying the scheme or the corresponding descriptor. The @value field can have values defined by the scheme indicated by the @schemeIdUri field. That is, the @value field can have values of descriptor elements according to the corresponding scheme, which can be called parameters. These can be discriminated by ','. The @id field can indicate the ID of the corresponding descriptor. When descriptors have the same ID, the descriptors can include the same scheme ID, values and parameters.

Figure 12:
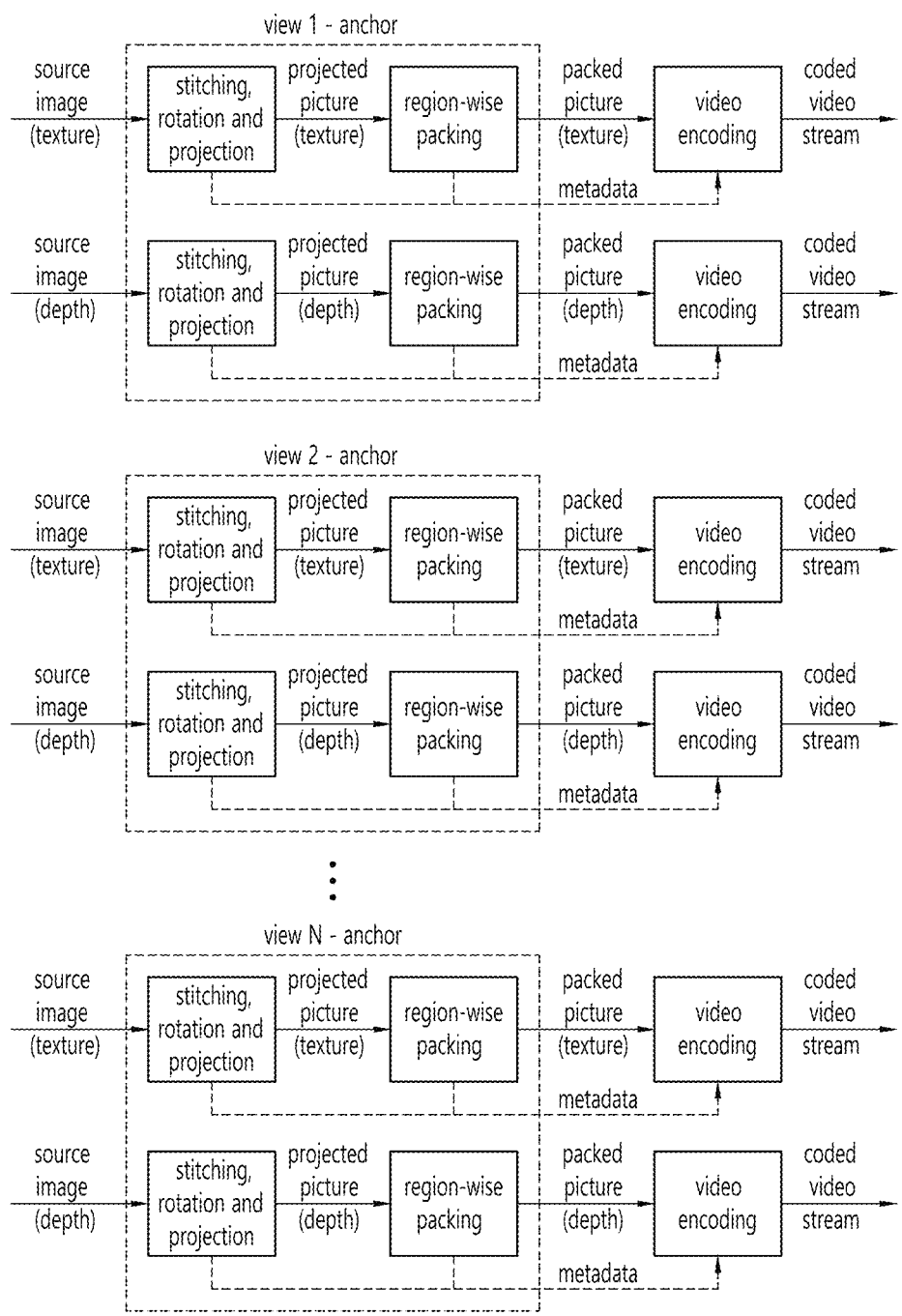
FIG. 12 illustrates an example of a pre-encoding process for a video including a viewing position set of a viewpoint.

FIG. 12 illustrates an example of a pre-encoding process for a video including a viewing position set of a viewpoint. The viewing position set may include at least one viewing position of the viewpoint.

In FIG. 12, the viewpoint may be assumed to be unchanged so the multiple inputs originate from different views and different components. As shown in FIG. 12, each view could be composed by different components, e.g., texture and depth map, which are produced into a projected picture of each component of each view by stitching, rotation, projection, and region-wise packing process. In addition, using redundancy between views, for example between anchor view and the right head motion view, the residual of texture, also depth or other components if possible, could be generated for subsidiary views. This could increase bit efficiency by eliminating redundant information between views. The projected pictures of each view including texture and depth may be generated, each picture may be packed and then encoded by each single layer video encoder, such as HEVC or VVC.

Figure 13:
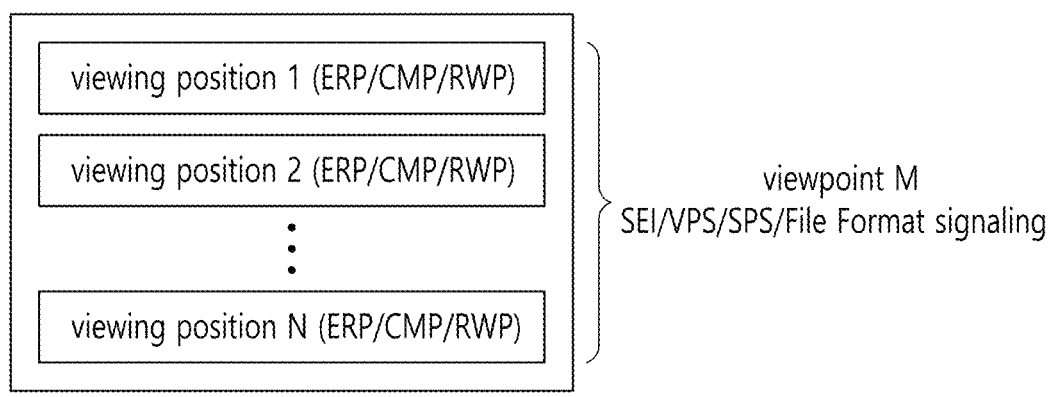
FIG. 13 illustrates an example of a delivery process for a video stream including a plurality of viewing positions of a viewpoint.

FIG. 13 illustrates an example of a delivery process for a video stream including a plurality of viewing positions of a viewpoint. Referring to FIG. 13, multiple video streams of different viewing positions of a viewpoint may be a delivered to a reception side. A video of each viewing position of a viewpoint may be encoded separately and indicated by SEI message, parameter sets, or file format signaling mechanisms.

Figure 14:
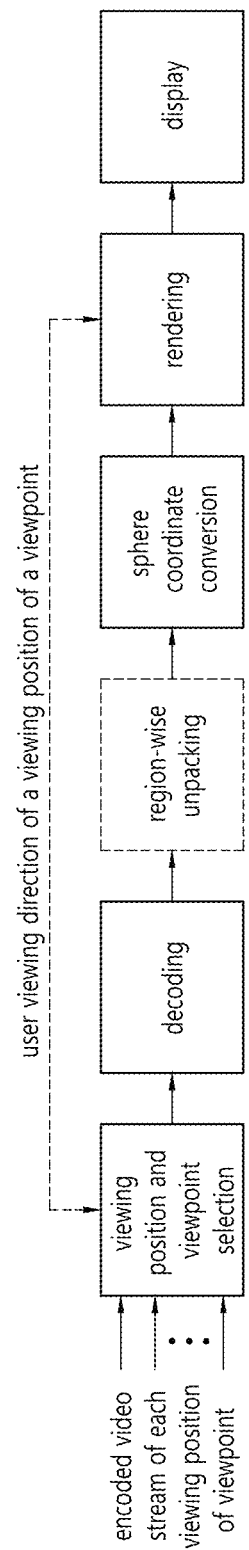
FIG. 14 illustrates an example of decoding process of multi-view region-wise packing with texture, residual, and depth map for a view of a viewpoint.

FIG. 14 illustrates an example of decoding process of multi-view region-wise packing with texture, residual, and depth map for a view of a viewpoint.

Referring to FIG. 14, the input of the receiver may be encoded video streams of each viewing position of a viewpoint, or encoded video streams of multiple viewpoints. The first step is the selection of the stream based on the user's viewing position and viewpoint and then the selected stream is decoded. Other implication of the receiver could be decode all of the streams and then select based on the user's viewing position and viewpoint. The following steps are same with the normal omnidirectional video applications, which means region-wise unpacking if the decoded picture is packed picture, and then map the projected picture onto the sphere coordinate, and then rendering and generate the viewport based on the user's viewing direction of the viewing position of the viewpoint.

Specifically, for example, in each step, the above-described syntax elements can be used as follows.

Viewing Position and Viewpoint Selection

A video stream whose viewing position matches with the user viewing position at a viewpoint may be selected from multiple video streams. Each of multiple video streams represents different viewing position of a view point. Also, the viewing position of the video stream is indicated by the viewing_position_x field, the viewing_position_y field and the viewing_position_z field for the video stream.

Also, the selection is processed by comparing with the anchor viewing position (indicated by the anchor_viewing_position_x field, the anchor_viewing_position_y field, and the anchor_viewing_position_z field), all of the viewing positions of each video stream (indicated by the viewing_position_x field, the viewing_position_y field, and the viewing_position_z field), or viewing positions in the viewing position set (indicated by the set_viewing_position_x field, the set_viewing_position_y field, and the set_viewing_position_z field). The above-described syntax elements are signaled in ViewingPositionInfoBox, ViewingPosionGroupBox, and/or Viewing position information SEI message.

If the user's viewing position does not match with the candidates of viewing positions within the boundary derived based on the ViewingPosionGroupBox, the HeadMotionBoundaryInfoBox, and/or the Head motion boundary SEI message, receivers could select the most adjacent viewing position of the user's viewing position. Also, as another example, receivers could generate a video of the user's viewing position by interpolation or view synthesis using given videos of the adjacent viewing positions of the user's viewing position.

In addition, the head motion information may be used to determine whether the user's head position is inside or outside of the boundary. For the decision, the head motion boundary is depicted using the head_motion_boundary_type field, the head_motion_boundary_radius_min field and the head_motion_boundary_radius_max field. When the user's viewing position is outside of the boundary derived based on the ViewingPosionGroupBox, the HeadMotionBoundaryInfoBox, and/or the Head motion boundary SEI message, the most adjacent viewing position of the user's viewing position could be selected instead of the exactly matched viewing position.

Decoding

In the decoding process, the selected video bit-stream is decoded and a projected picture or packed picture of the viewing position of the viewpoint is produced as an output of the decoding process. Also, metadata which indicate the viewing position of the output decoded picture and the boundary description are delivered to the renderer: Viewing position information SEI message and Head motion boundary information SEI message.

Region-Wise Packing

If the output decoded picture is a packed picture and region-wise packing SEI message is present, the projected picture is generated from the packed picture with the region mapping information between packed region and the projected region.

Sphere Coordinate Conversion

If Equirectangular projection SEI message is present, a sample location on the equirectangular projected picture to a sphere coordinate mapping is processed.

Else if Cubemap projection SEI message is present, a sample location on the equirectangular projected picture to a cubic coordinate mapping or a sphere coordinate mapping is processed.

If Sphere rotation SEI message is present, the sphere or cubic video is rotated.

Rendering

In this step, an output image projected on a rectilinear plane is generated based on the information of user's viewport.

Meanwhile, file format level or system level viewing position selection may be considered in the transmitter and receiver side, respectively.

Figure 15A:
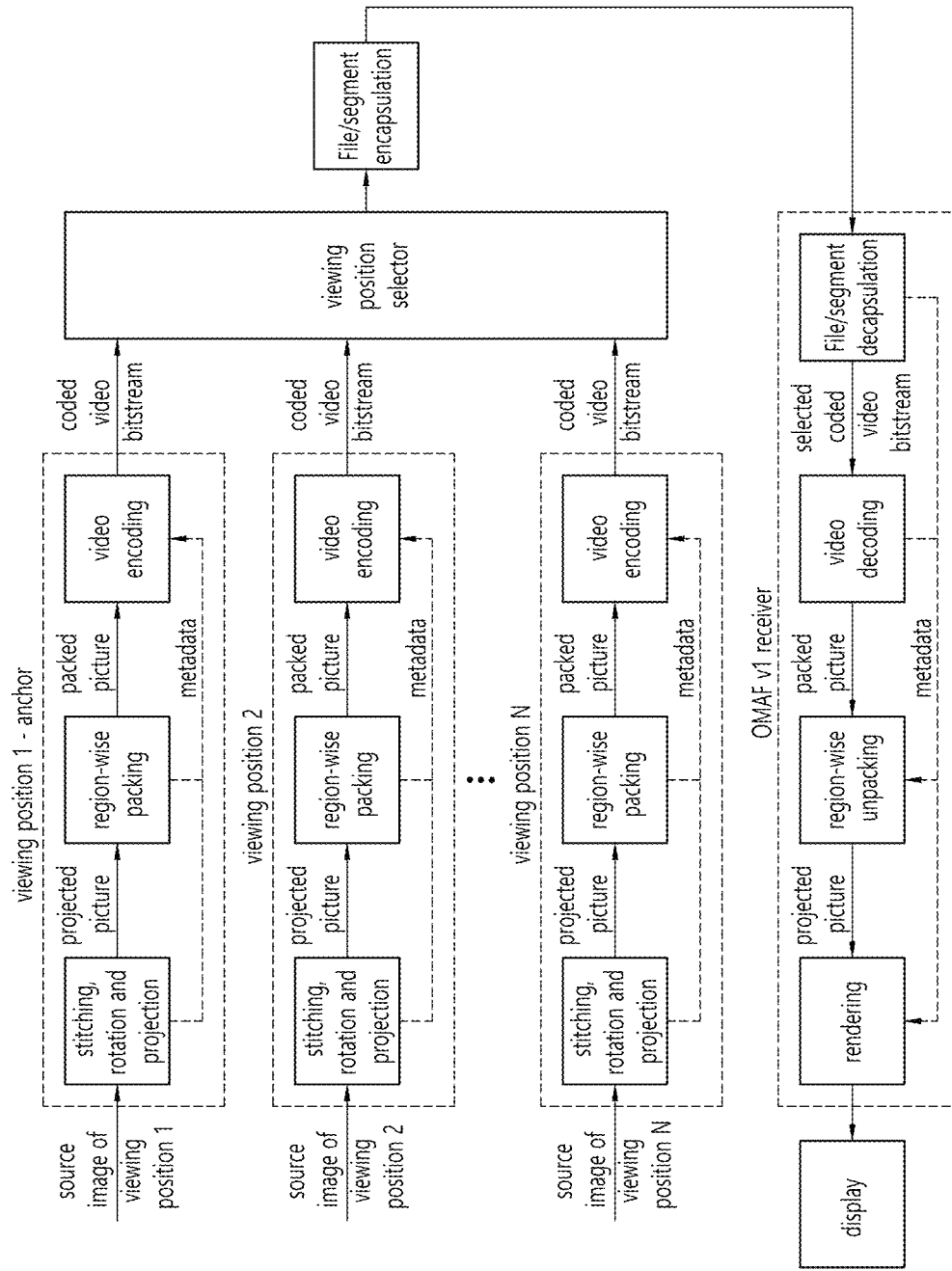
FIGS. 15a and 15b illustrate examples of coding process for a video including multiple viewing positions.
Figure 15B:
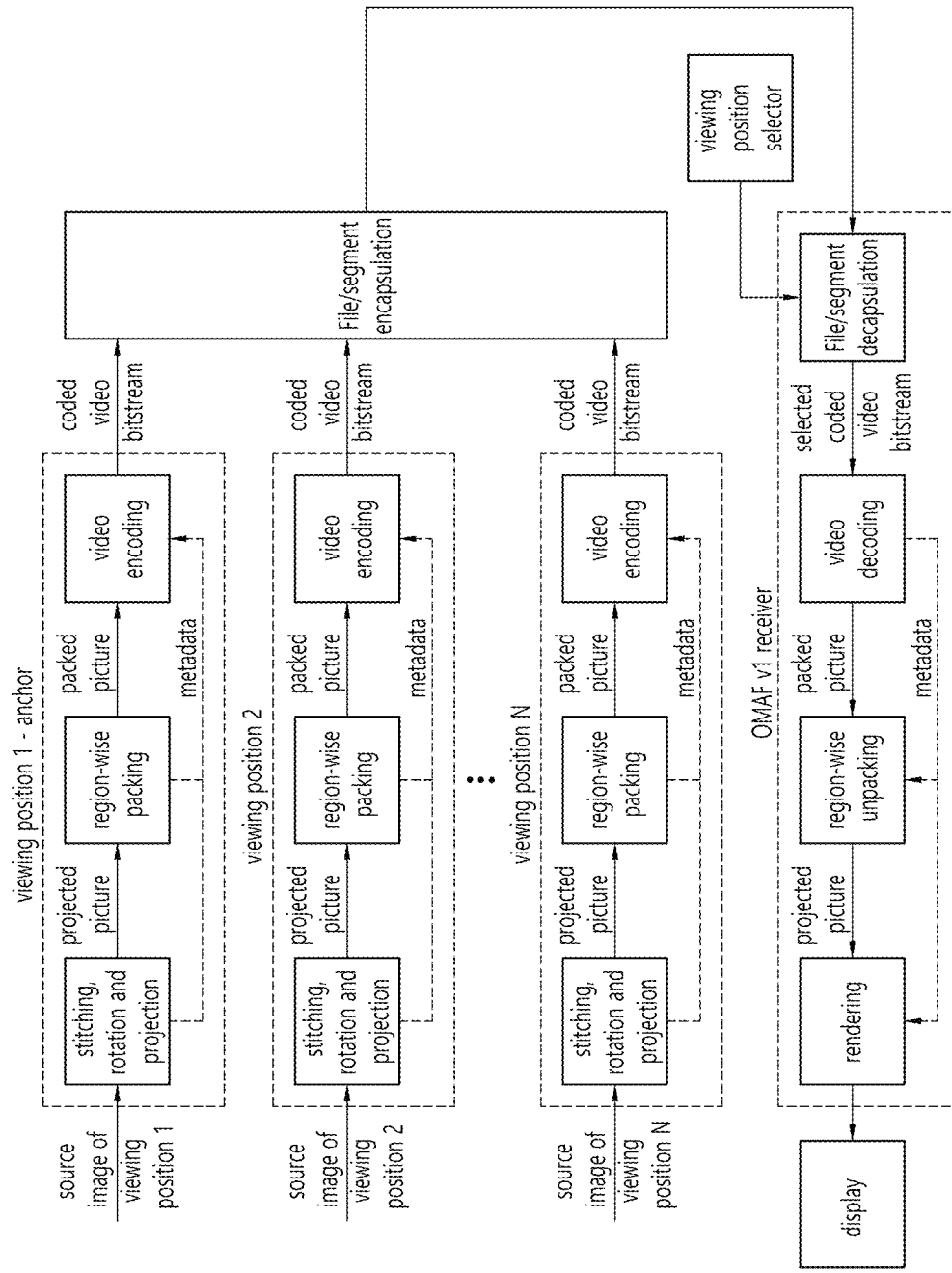

FIGS. 15a and 15b illustrate examples of coding process for a video including multiple viewing positions. FIG. 15a illustrates an example in which the viewing position selection is performed in the transmitter side. FIG. 15b illustrates an example in which the viewing position selection is performed in the receiver side.

Referring to FIGS. 15a and 15b, after coded video bitstreams are generated for all viewing positions, they are encapsulated into the file format or segment format. In this step, the file/segment encapsulator could generate the viewing position and viewing boundary information ViewingPositionInfoBox and/or HeadMotionBoundaryInfoBox which could be defined in ProjectedOmniVideoBox and/or TrackGroupTypeBox.

When the viewing position selector is in the transmission side as shown in FIG. 15a, those information defined in ProjectedOmniVideoBox and/or TrackGroupTypeBox could be used in the selection of the file or the track that match with the user's viewing position information sensed and delivered from the receivers. After selection process, a single coded video stream that matches with the user's viewing position is delivered. When the coded video bitstream is compatible with the OMAF v1, the receivers which conform to the OMAF v1 specification could provide head motion parallax effect without change the implementation, i.e., the solution is backward compatible to the legacy receivers.

When the selector is in the receiver side as shown in FIG. 15b, those information defined in ProjectedOmniVideoBox and/or TrackGroupTypeBox could be used in the selection of the file or the track that match with the user's viewing position information sensed from the receivers. As the transmitted bitstream contains all of the coded video bitstream of multiple viewing positions, the viewing position selector could find a track that contains coded video stream with the viewing position information contained in the TrackGroupTypeBox and/or ProjectedOmniVideoBox. After the selection, the selected track could be decoded and rendered by receivers that conform to the OMAF v1 as well as the higher versions.

According to the embodiments of the present invention, head motion parallax may be provided to support 3DoF+ receivers. Also, it is possible to support legacy 3DoF receivers. For example, if head motion sensor of a 3DoF receiver is not available, the 3DoF receiver only shows a video for anchor viewing position. If head motion sensor of the 3DoF receiver is available, the 3DoF receiver could provide head motion parallax effect in aid of head position selector module before decoding process.

Also, it is possible to support bounded head motion indication for 3DoF+ applications. For example, the 3DoF+ receiver determines whether the user's viewing position is in or out of the head motion boundary of the video. If the user's viewing position is out of the head motion boundary, the 3DoF+ receiver could determine most relevant viewing position based on the boundary information.

Figure 16B:
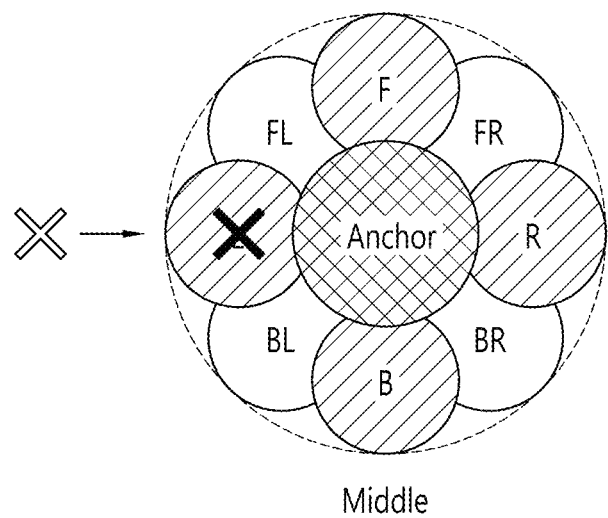

FIGS. 16a and 16b illustrate multiple viewing positions and the boundary of the viewing positions. Here, the boundary of the viewing positions may be called the viewing position boundary or head motion boundary. Referring to FIGS. 16a and 16b, the multiple viewing positions are consist of spheres with three levels of down, middle, top. The boundary of the viewing positions could be given with the sphere (dotted boundary). As another example, the boundary of the viewing positions could be given with the vertexes (F, FL, L, BL, B, BR, R, FR for middle level) or all of the vertexes in the multiple viewing positions.

FIG. 16b illustrates a viewing position selection process when the user's viewing position is out of the head motion boundary.

If the user's viewing position is out of the boundary, the 3DoF+ receiver could provide most adjacent viewing position but the actual distance from the anchor viewing position could be memorized so the 3DoF+ receiver could provide pictures of the relevant viewing position that is synchronized with the user's actual viewing position.

Figure 17A:
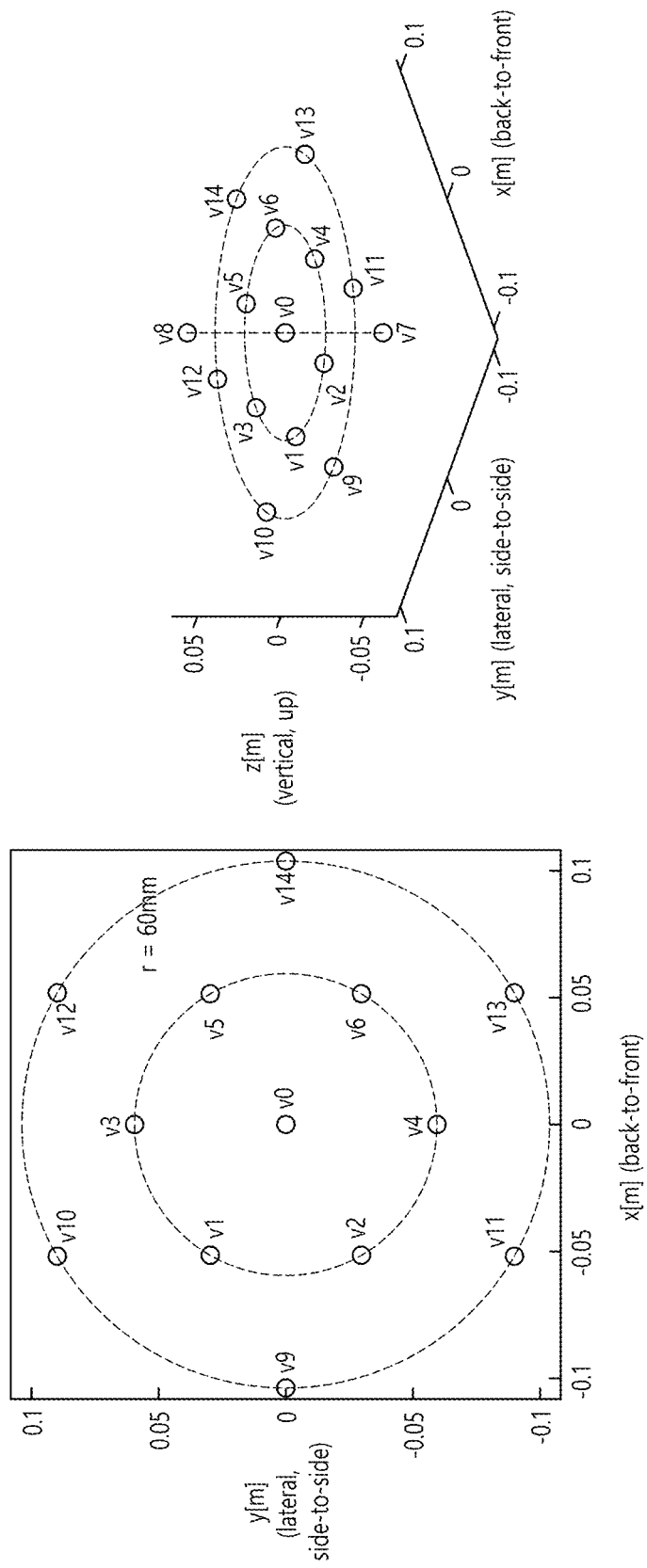
FIGS. 17a to 17c illustrate examples of viewing positions.
Figure 17B:
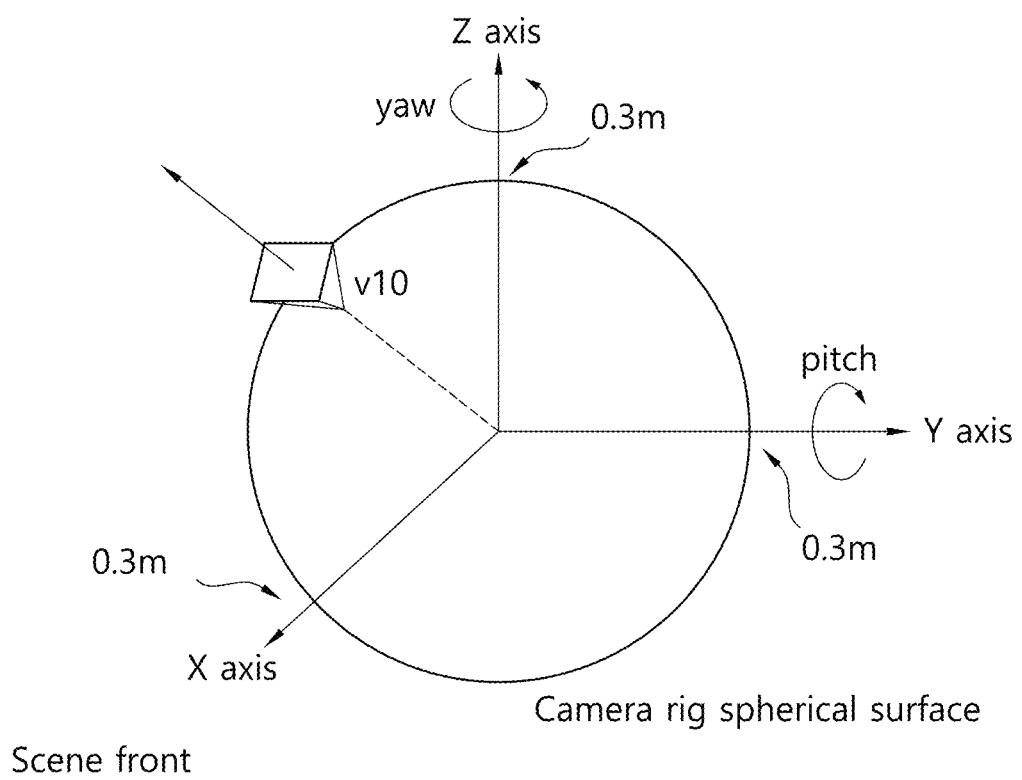
Figure 17C:
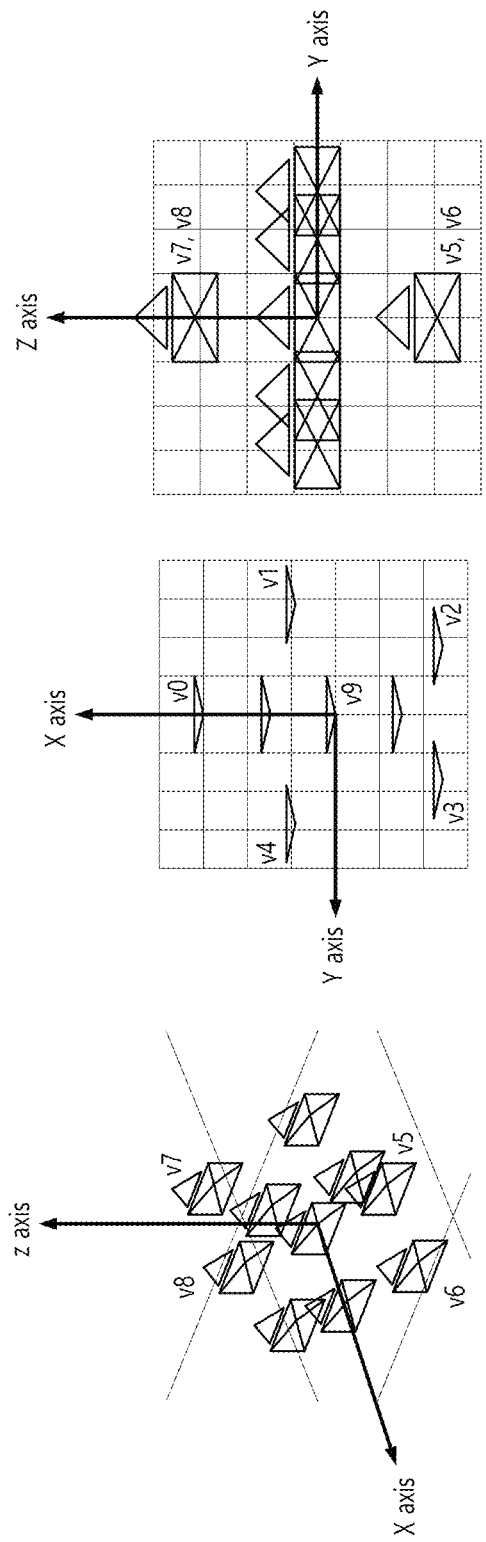

FIGS. 17a to 17c illustrate examples of viewing positions. Referring to FIGS. 17a to 17c, the viewing space or the head motion boundary may describe the distributional boundary of the viewing positions.

FIG. 17a illustrates viewing positions in the head motion boundary that the shape type is the spheroid. For example, referring to FIG. 17a, the spheroid centered at source view v0 position, with equatorial radius 104 mm and polar distance 60 mm. Further, a location of a viewing position in the head motion boundary may be derived based on the following equation.

$$\frac{x^2 + y^2}{(104 \text{ mm})^2} + \frac{z^2}{(60 \text{ mm})^2} = 1 \qquad \text{[Equation 1]}$$

FIGS. 17b and 17c illustrate viewing positions in the head motion boundary that the shape type is the Sphere. For example, referring to FIGS. 17b and 17c, the sphere centered at the position [0, 0, 1.65] meter with a 30 cm radius. Further, a location of a viewing position in the head motion boundary may be derived based on the following equation.

$$\frac{x^2 + y^2 + (z - 1.65 \text{ m})^2}{(30 \text{ cm})^2} = 1 \qquad \text{[Equation 2]}$$

Figure 18:
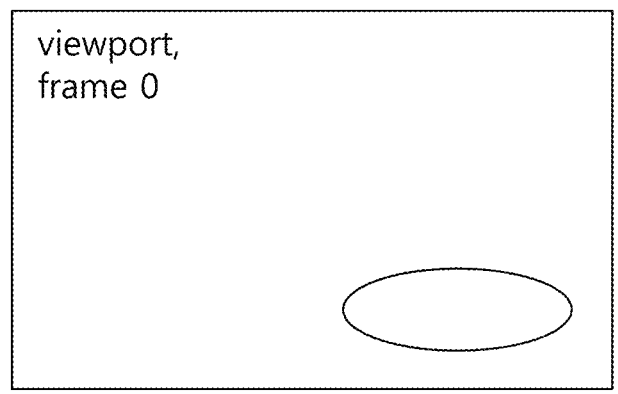
FIG. 18 illustrates an example of time varying viewing space and use of the viewing space information in the receiver.
Figure 18:
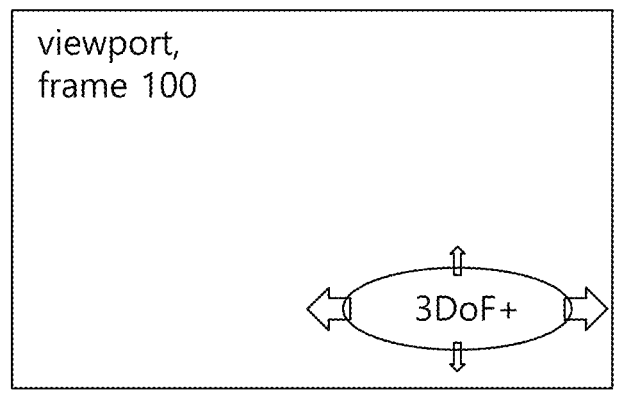
Figure 18:
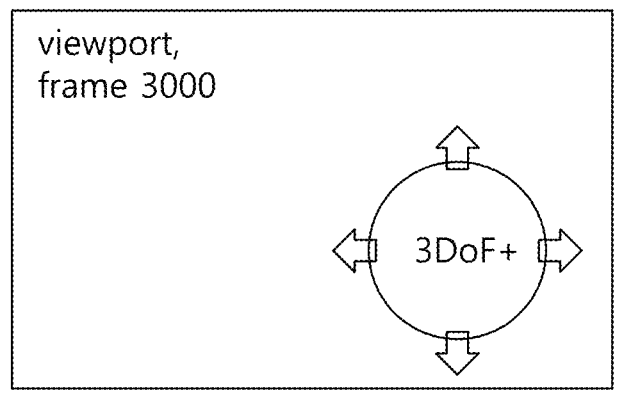

FIG. 18 illustrates an example of time varying viewing space and use of the viewing space information in the receiver.

Referring to FIG. 18, the 3DoF video from frame 0 to 99 may not support head motion parallax.

Referring to FIG. 18, the 3DoF video from frame 100 to 299 may support head motion parallax with head_motion_boundary_type[i]=5. Here, the head_motion_boundary_type [i] field equal to 5 indicates a spheroid. In this case, a receiver, i.e. a 360 video reception apparatus, could use the head motion boundary information to indicate the available range of head motion according to the shape of the viewing space to a viewer. Also, the receiver could preset the effective range of the motion sensor with regard to the available range of the head motion given by the detailed parameters. The detailed parameters may be derived based on the head_motion_boundary_param_a[i] field, the head_motion_boundary_param_b[i] field, the head_motion_boundary_param_axis[i] field.

Referring to FIG. 18, the 3DoF video from frame 300 may support head motion parallax with head_motion_boundary_type[i]=1. Here, the head_motion_boundary_type[i] field equal to 1 indicates a sphere. In this case, using the head motion boundary information, a receiver, i.e. a 360 video reception apparatus, could provide available ranges changed with regard to the viewing space shape.

Also, the receiver could change the effective range of the motion sensor with regard to the available range of the head motion given by the radius. The head_motion_boundary_radius[i] field may indicate the radius.

Figure 19:
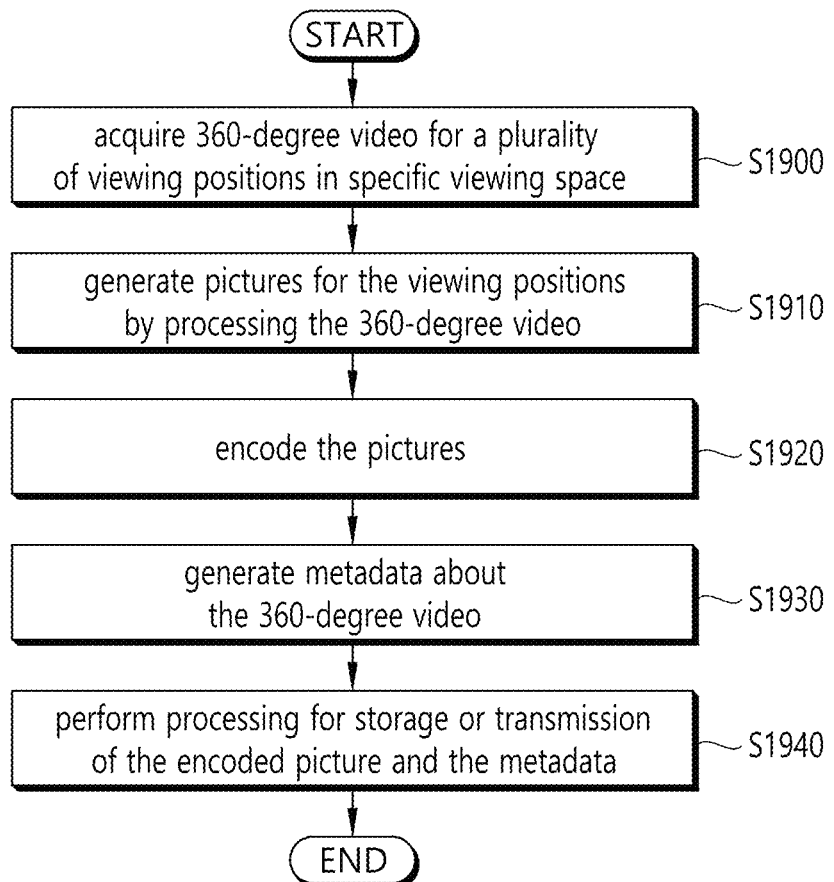
FIG. 19 schematically illustrates a 360 video data processing method performed by a 360 video transmission apparatus according to the present invention.

FIG. 19 schematically illustrates a 360 video data processing method performed by a 360 video transmission apparatus according to the present invention. The method illustrated in FIG. 19 may be performed by the 360 video transmission apparatus illustrated in FIG. 8. Specifically, S1900 in FIG. 19 can be performed by the data input unit of the 360 video transmission apparatus, S1910 can be performed by the projection processor of the 360 video transmission apparatus, S1920 can be performed by the data encoder of the 360 video transmission apparatus, S1930 can be performed by the metadata encoder of the 360 video transmission apparatus, and S1940 can be performed by the transmission processor of the 360 video transmission apparatus.

The 360 video transmission apparatus acquires 360-degree video for a plurality of viewing positions in specific viewing space (S1900). The 360 video transmission apparatus may acquire 360 video of the viewing positions captured by at least one camera. In other words, The 360 video transmission apparatus may acquire 360 video of the viewing positions in at least one viewing space. Here, the viewing space may be 3D space of the viewing positions within which rendering of image and video is enabled and VR experience is valid.

The 360 video transmission apparatus generates pictures for the viewing positions by processing the 360-degree video (S1910). The 360 video transmission apparatus may perform projection according to a projection scheme for 360 video data of each viewing position among various projection schemes. Also, the 360 video transmission apparatus may determine whether the 360 video data of the each viewing position is stitched. For example, the 360 video transmission apparatus may determine that the 360 video data of the each viewing position is not stitched when the projection scheme corresponds to a specific scheme, that is, projection scheme information about the 360 video data indicates the specific scheme. Further, the various projection schemes may include the equirectangular projection scheme, the cubic projection scheme, the cylindrical projection scheme, the tile-based projection scheme, the pyramid projection scheme, the panoramic projection scheme and the specific scheme of directly projecting video data on a 2D image without stitching.

Further, when the 360 video data of the each viewing position is stitched, the 360 video transmission apparatus may stitch the 360 video data of the each viewing position and project the stitched 360 video data on the 2D based picture of the each viewing position. When the 360 video data of the each viewing position is not stitched, the 360 video transmission apparatus may project the 360 video data on the 2D based picture of the each viewing position without stitching. Here, the 2D based picture may be called a 2D image or a projected picture of the each viewing position. Also, the 360 video transmission apparatus may perform a region-wise packing process for the projected picture of the each viewing position.

The 360 video transmission apparatus encodes the pictures (S1920). The 360 video transmission apparatus can encode the picture.

The 360 video transmission apparatus generates metadata about the 360-degree video (S1930). The 360 video transmission apparatus may generate metadata about the viewing positions and the viewing space. For example, the metadata may include viewing position information for each of the viewing positions and viewing space information. Here, the metadata may be referred to as signaling information.

For example, the metadata includes viewing position information for a specific viewing position and viewing space information.

The viewing position information may include a viewing_position_info_id field, a viewing_position_info_cancel_ flag field, a viewing_position_info_persistence_flag field, an anchor_viewing_position_flag field, a viewing_position_x field, a viewing_position_y field, a viewing_position_z field, a viewing_orientation_yaw field, a viewing_orientation_pitch field, a viewing_orientation_roll field, a coverage_horizontal field, a coverage_vertical field, an anchor_viewing_position_x field, an anchor_viewing_position_y field, an anchor_viewing_position_z field, an anchor_ viewing_orientation_yaw field, an anchor_ viewing_orientation_pitch field, an anchor_viewing_orientation_roll field, an anchor_coverage_horizontal field, an anchor_coverage_vertical field, a num_viewing_positions field, a set_viewing_position_x[i] field, a set_viewing_position_y[i] field, a set_viewing_position_z[i] field, a set_ viewing_orientation_yaw[i] field, a set_viewing_orientation_pitch[i] field, a set_viewing_orientation_roll[i] field, a set_coverage_horizontal[i] field and/or a set_coverage_vertical[i] field.

Specifically, the viewing position information for the specific viewing position may include information indicating an x component, a y component and a z component of the specific viewing position. Also, the viewing position information may include information indicating a yaw angle, a pitch angle and a roll angle of a viewing orientation for the specific viewing position. Also, the viewing position information may include information indicating a horizontal range and a vertical range of coverage of the specific viewing position. The information indicating the x component, the y component and the z component of the specific viewing position may represent the viewing_position_x field, the viewing_position_y field and the viewing_position_z field, respectively. The information indicating the yaw angle, the pitch angle and the roll angle of the viewing orientation for the specific viewing position may represent the viewing_orientation_yaw field, the viewing_orientation_ pitch field and the viewing_orientation_roll field, respectively. The information indicating the horizontal range and the vertical range of the coverage of the specific viewing position may represent the coverage_horizontal field and the coverage_vertical field, respectively.

Further, the viewing position information for the specific viewing position may include an anchor viewing position flag indicating whether the specific viewing position is an anchor viewing position of a viewing position set. Here, the viewing position set may be a viewing position set that includes the specific viewing position, and the viewing position set may represent the viewing positions included in the specific viewing space. The anchor viewing position flag may represent the anchor_viewing_position_flag field.

Further, when the anchor viewing position flag indicates the specific viewing position is not the anchor viewing position of the viewing position set, the viewing position information for the specific viewing position may include information indicating an x component, a y component and a z component of the anchor viewing position. Also, when the anchor viewing position flag indicates the specific viewing position is not the anchor viewing position of the viewing position set, the viewing position information for the specific viewing position may include information indicating a yaw angle, a pitch angle and a roll angle of a viewing orientation for the anchor viewing position. Also, when the anchor viewing position flag indicates the specific viewing position is not the anchor viewing position of the viewing position set, the viewing position information may include information indicating a horizontal range and a vertical range of coverage of the anchor viewing position. The information indicating the x component, the y component and the z component of the anchor viewing position may represent the anchor_viewing_position_x field, the anchor_viewing_position_y field and the anchor_viewing_position_z field, respectively. The information indicating the yaw angle, the pitch angle and the roll angle of the viewing orientation for the anchor viewing position may represent the anchor_viewing_orientation_yaw field, the anchor_viewing_orientation_pitch field and the anchor_viewing_orientation_roll field, respectively. The information indicating the horizontal range and the vertical range of the coverage of the anchor viewing position may represent the anchor_coverage_horizontal field and the anchor_coverage_vertical field, respectively.

Further, the viewing position information for the specific viewing position may include information indicating the number of viewing positions related to the specific viewing position. The viewing positions related to the specific viewing position set may be viewing positions of the viewing position set.

The viewing position information for the specific viewing position may include information indicating an x component, a y component and a z component of a viewing position related to the specific viewing position. Also, the viewing position information may include information indicating a yaw angle, a pitch angle and a roll angle of a viewing orientation for the viewing position related to the specific viewing position. Also, the viewing position information may include information indicating a horizontal range and a vertical range of coverage of the viewing position related to the specific viewing position. The information indicating the x component, the y component and the z component of the viewing position related to the specific viewing position may represent the set_viewing_position_x field, the set_viewing_position_y field and the set_viewing_position_z field, respectively. The information indicating the yaw angle, the pitch angle and the roll angle of the viewing orientation for the viewing position related to the specific viewing position may represent the set_viewing_orientation_yaw field, the set_viewing_orientation_pitch field and the set_viewing_orientation_roll field, respectively. The information indicating the horizontal range and the vertical range of the coverage of the viewing position related to the specific viewing position may represent the set_coverage_horizontal field and the set_coverage_vertical field, respectively.

Further, for example, the viewing space information may include a head_motion_info_id field, a head_motion_info_cancel_flag field, a head_motion_info_persistence_flag field, a head_motion_boundary_radius_min field, a head_motion_boundary_radius_max field, a num_nested_boundaries_minus1 field, a head_motion_boundary_center_present_flag[i] field, a head_motion_boundary_rotation_flag[i] field, a head_motion_boundary_asymmetric_flag[i] field, head_motion_boundary_type[i] field, a head_motion_boundary_center_x[i] field, a head_motion_boundary_center_y[i] field, a head_motion_boundary_center_z[i] field, a head_motion_boundary_rotation_yaw[i] field, a head_motion_boundary_rotation_pitch[i] field, a head_motion_boundary_rotation_roll[i] field, a head_motion_boundary_radius[i] field, a head_motion_boundary_param_a[i] field, a head_motion_boundary_param_b[i] field, a head_motion_boundary_z_max[i] field, a head_motion_boundary_positive_x_axis[i] field, a head_motion_boundary_negative_x_axis[i] field, a head_motion_boundary_positive_y_axis[i] field, a head_motion_boundary_negative_y_axis[i] field, a head_motion_boundary_positive_z_axis[i] field, a head_motion_boundary_negative_z_axis[i] field, a head_motion_boundary_symmetry_axis[i] field, a head_motion_boundary_param_c[i] field, a num_boundary_vertex_minus4[i] field, a boundary_vertex_x[i] field, a boundary_vertex_y[i] field, and/or a boundary_vertex_z[i] field. Here, the specific viewing space may represent the i-th viewing space.

Specifically, the viewing space information may include information indicating a shape type of the specific viewing space. The shape type of the specific viewing space may be one of a sphere, a paraboloid shape, a cube, a rectangular prism, a spheroid, a tri-axial ellipsoid, a shape defined by vertexes.

When the shape type of the specific viewing space is the sphere, the viewing space information may include information indicating a radius of the specific viewing space. The information indicating the radius of the specific viewing space may represent the head_motion_boundary_radius[i] field.

Also, when the shape type of the specific viewing space is the paraboloid shape, the viewing space information may include information indicating parameter values of the specific viewing space. For example, when the shape type of the specific viewing space is the paraboloid shape, the viewing space information may include information indicating a semi-axis length of the x axis, information indicating a semi-axis length of the y axis, information indicating a maximum value of the z axis of the specific viewing space. The information indicating the semi-axis length of the x axis may represent the head_motion_boundary_param_a[i] field, the information indicating the semi-axis length of the y axis may represent the head_motion_boundary_param_b[i] field, the information indicating the maximum value of the z axis may represent the head_motion_boundary_z_max[i] field.

Also, when the shape type of the specific viewing space is the cube or the rectangular prism, the viewing space information may include information indicating a minimum value of an x component, a y component and a z component of the specific viewing space. Further, when the shape type of the specific viewing space is the cube, the viewing space information may include information indicating a maximum value of the x component, the y component and the z component of the specific viewing space. The information indicating the minimum value of the x component, the y component and the z component of the specific viewing space may represent the head_motion_boundary_negative_x_axis[i] field, the head_motion_boundary_negative_y_axis[i] field and the head_motion_boundary_negative_z_axis[i] field, respectively. The information indicating the maximum value of the x component, the y component and the z component of the specific viewing space may represent the head_motion_boundary_positive_x_axis[i] field, the head_motion_boundary_positive_y_axis[i] field and the head_motion_boundary_positive_z_axis[i] field, respectively. Meanwhile, for example, when the shape type of the specific viewing space is the rectangular prism, and the head_motion_boundary_asymmetric_flag[i] field is equal to 1, the viewing space information may include information indicating the minimum value of the x component, the y component and the z component of the specific viewing space. Also, for example, when the shape type of the specific viewing space is not the rectangular prism or the head_motion_boundary_asymmetric_flag[i] field is equal to 0, the viewing space information may not include information indicating the minimum value of the x component, the y component and the z component of the specific viewing space, and the minimum value of the x component, the y component and the z component of the specific viewing space is derived based on the maximum value of the x component, the y component and the z component of the specific viewing space.

Also, when the shape type of the specific viewing space is the spheroid, the viewing space information may include information indicating parameter values of the specific viewing space. For example, when the shape type of the specific viewing space is the spheroid, the viewing space information may include information indicating a semi-axis length of the x axis, information indicating a semi-axis length of the y axis of the specific viewing space, symmetric axis indication information indicating an axis that the specific viewing space is symmetric. Here, the axis that the specific viewing space is symmetric may be one of the x axis, y axis and z axis. For example, the symmetric axis indication information equal to 0 indicates the x axis, the symmetric axis indication information equal to 1 indicates the y axis, and the symmetric axis indication information equal to 2 indicates the z axis. The information indicating the semi-axis length of the x axis may represent the head_motion_boundary_param_a[i] field, the information indicating the semi-axis length of the y axis may represent the head_motion_boundary_param_b[i] field, the symmetric axis indication information may represent the head_motion_boundary_symmetry_axis[i] field.

Also, when the shape type of the specific viewing space is the tri-axial ellipsoid, the viewing space information may include information indicating parameter values of the specific viewing space. For example, when the shape type of the specific viewing space is the tri-axial ellipsoid, the viewing space information may include information indicating a semi-axis length of the x axis, information indicating a semi-axis length of the y axis, information indicating a semi-axis length of the z axis of the specific viewing space. The information indicating the semi-axis length of the x axis may represent the head_motion_boundary_param_a[i] field, the information indicating the semi-axis length of the y axis may represent the head_motion_boundary_param_b[i] field, the information indicating the semi-axis length of the z axis may represent the head_motion_boundary_param_c[i] field.

Also, when the shape type of the specific viewing space is the shape defined by the vertexes, the viewing space information for the specific viewing position may include information indicating a number of the vertexes of the viewing space. Further, the viewing space information for the specific viewing position may include information indicating an x component, a y component and a z component of a vertex of the viewing space. The information indicating the number of the vertexes of the viewing space may represent the num_boundary_vertex_minus4[i] field. The information indicating the x component, the y component and the z component of the vertex of the viewing space may represent the boundary_vertex_x[i][j] field, the boundary_vertex_y[i][j] field, and the boundary_vertex_z[i][j] field, respectively.

Further, the viewing space information may include a flag indicating whether information on a center location of the specific viewing space is present. For example, when a value of the flag is 1, the viewing space information may include information indicating an x component, a y component and a z component of the center location of the specific viewing space. The flag may represent the head_motion_boundary_center_present_flag[i] field. The information indicating the x component, the y component and the z component of the center location of the specific viewing space may represent the head_motion_boundary_center_x[i] field, the head_motion_boundary_center_y[i] field and the head_motion_boundary_center_z[i] field, respectively.

Further, the viewing space information may include a flag indicating whether information on a rotation of the specific viewing space is present. For example, when a value of the flag is 1, the viewing space information may include information indicating a yaw angle, a pitch angle and a roll angle of the rotation of the specific viewing space. The flag may represent the head_motion_boundary_rotation_flag[i] field. The information indicating the yaw angle, the pitch angle and the roll angle of the rotation of the specific viewing space may represent the head_motion_boundary_rotation_yaw[i] field, the head_motion_boundary_rotation_pitch[i] field and the head_motion_boundary_rotation_roll[i] field, respectively.

Further, the viewing space information may include a flag indicating whether a shape of the specific viewing space is not symmetric. For example, when a value of the flag is 1, the shape of the specific viewing space is not symmetric. When the value of the flag is 0, the shape of the specific viewing space is symmetric. The flag may represent the head_motion_boundary_asymmetric_flag[i] field.

Further, the viewing space information may include information indicating a number of nesting shapes of viewing space. In other words, the viewing space information may include information indicating a number of viewing space for the 360-degree video data. The information indicating the number of the viewing space for the 360-degree video data may represent the num_nested_boundaries_minus1 field.

The 360 video transmission apparatus performs processing for storage or transmission of the encoded picture and the metadata (S1940). The 360 video transmission apparatus may encapsulate the encoded picture for the 360-degree video and/or the metadata into a file. The 360 video transmission apparatus can encapsulate the encoded picture for the 360-degree video and/or the metadata in a file format such as ISOBMFF and CFF or process the encoded picture for the 360-degree video and/or the metadata into a form such as DASH segments in order to store or transmit the encoded 360 video data and/or the metadata. For example, the metadata may be included in boxes at various levels in ISOBMFF or included as data in a separate track in a file. Further, the 360 video transmission apparatus may encapsulate the metadata in a file. The 360 video transmission apparatus may perform processing for transmission on the encapsulated 360 video data according to file format. The 360 video transmission apparatus may process the 360 video data according to an arbitrary transmission protocol. The processing for transmission may include processing for delivery through a broadcast network or processing for delivery through a communication network such as a broad band. In addition, the 360 video transmission apparatus may perform processing for transmission on the metadata. The 360 video transmission apparatus may transmit the processed 360 video data and metadata through a broadcast network and/or a broad band.

Also, according to an embodiment, the 360 video transmission apparatus may select a specific viewing position by comparing the viewing positions with a user's viewing position using the metadata, and may store or transmit only information on the encoded picture and the metadata for the selected specific viewing position. Here, information on the user's viewing position may be included in the feedback information and delivered to the 360 video transmission apparatus.

For example, a viewing position matched with a user's viewing position among the viewing positions is selected as the specific viewing position. Also, for example, the specific viewing position is selected by comparing with the anchor viewing position. Also, for example, the specific viewing position is selected by comparing with viewing positions in the viewing position set. Also, for example, when the user's viewing position does not match with the viewing positions in the specific viewing space, the most adjacent viewing position of the user's viewing position is selected as the specific viewing position. Also, for example, when the user's viewing position is out of the specific viewing space, the most adjacent viewing position of the user's viewing position is selected as the specific viewing position. Also, for example, when the user's viewing position does not match with the viewing positions in the specific viewing space, a picture of the user's viewing position is derived by interpolation or view synthesis using pictures for the adjacent viewing positions of the user's viewing position. That is, the user's viewing position is derived to the specific viewing position.

Figure 20:
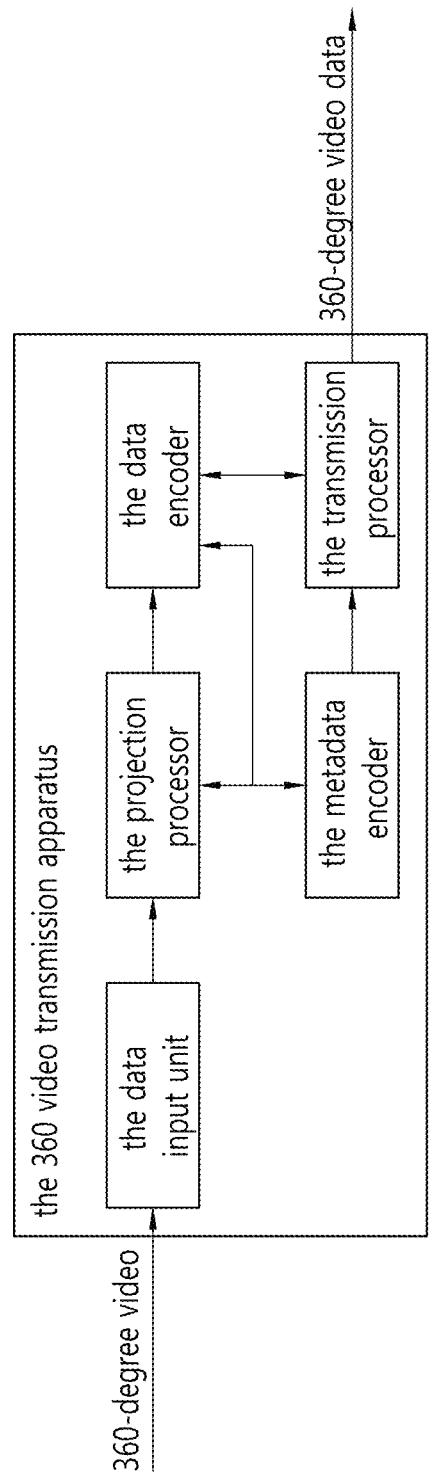
FIG. 20 schematically illustrates a 360 video transmission apparatus for performing a 360 video data processing method according to the present invention.

FIG. 20 schematically illustrates a 360 video transmission apparatus for performing a 360 video data processing method according to the present invention. The method illustrated in FIG. 19 may be performed by the 360 video transmission apparatus illustrated in FIG. 20. Specifically, the data input unit of the 360 video transmission apparatus in FIG. 20 can perform S1900 in FIG. 19, the projection processor of the 360 video transmission apparatus in FIG. 20 can perform S1910 in FIG. 19, the data encoder of the 360 video transmission apparatus in FIG. 20 can perform S1920 in FIG. 19, the metadata encoder of the 360 video transmission apparatus in FIG. 20 can perform S1930 in FIG. 19, and the transmission processor of the 360 video transmission apparatus in FIG. 20 can perform S1940 in FIG. 19.

According to the present invention, it is possible to propose a method for providing interactive experience in 3DoF+ content consumption of users by supporting head motion parallax.

Also, according to the present invention, it is possible to support bounded head motion indication for 3DoF+ applications. Accordingly, it is possible to propose a method for providing interactive experience in 3DoF+ content consumption of users.

Figure 21:
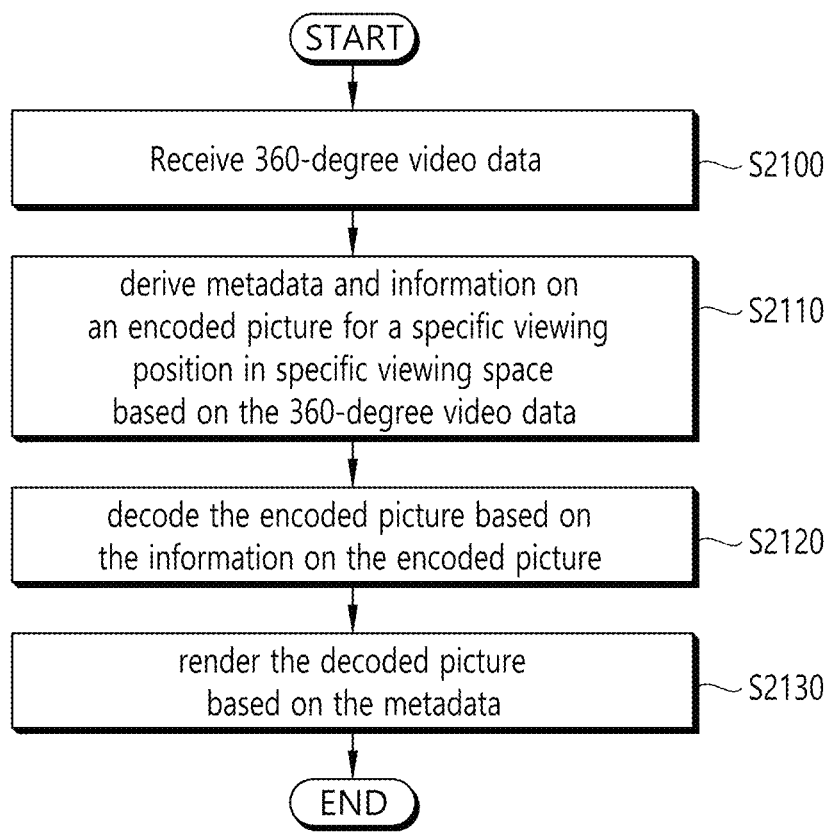
FIG. 21 schematically illustrates a 360 video data processing method performed by a 360 video reception apparatus according to the present invention.

FIG. 21 schematically illustrates a 360 video data processing method performed by a 360 video reception apparatus according to the present invention. The method illustrated in FIG. 21 may be performed by the 360 video reception apparatus illustrated in FIG. 9. Specifically, S2100 in FIG. 21 can be performed by the data input unit of the 360 video reception apparatus, S2110 can be performed by the reception processor/the file extraction unit of the 360 video reception apparatus, S2120 can be performed by the data decoder of the 360 video reception apparatus, and S2130 can be performed by the renderer of the 360 video reception apparatus.

The 360 video reception apparatus receives 360-degree video data (S2100). The 360 video reception apparatus can receive the 360-degree video data for the viewing positions of at least one viewpoint in at least one viewing space. Here, the viewing space may be 3D space of the viewing positions within which rendering of image and video is enabled and VR experience is valid. The 360-degree video data may include a video stream for each viewing position. A video stream for a viewing position in viewing space may include metadata and information on an encoded picture for the viewing position in the viewing space. The viewing positions may include at least one viewing position set, and viewing position set may include an anchor viewing position.

The 360 video reception apparatus can receive the 360-degree video data signaled from a 360 video transmission apparatus through a broadcast network. In addition, the 360 video reception apparatus may receive the 360-degree video data through a communication network such as a broad band or a storage medium.

The 360 video reception apparatus derives metadata and information on an encoded picture for a specific viewing position in a specific viewing space (S2110). The 360 video reception apparatus may select the specific viewing position in the specific viewing space by comparing the viewing positions with a user's viewing position using the metadata. For example, the specific viewing space includes a plurality of viewing positions, and a viewing position matched with a user's viewing position among the viewing positions is selected as the specific viewing position. Also, for example, the specific viewing position is selected by comparing with the anchor viewing position. Also, for example, the specific viewing position is selected by comparing with viewing positions in the viewing position set. Also, for example, when the user's viewing position does not match with the viewing positions in the specific viewing space, the most adjacent viewing position of the user's viewing position is selected as the specific viewing position. Also, for example, when the user's viewing position is out of the specific viewing space, the most adjacent viewing position of the user's viewing position is selected as the specific viewing position. Also, for example, when the user's viewing position does not match with the viewing positions in the specific viewing space, a picture of the user's viewing position is derived by interpolation or view synthesis using pictures for the adjacent viewing positions of the user's viewing position. That is, the user's viewing position is derived to the specific viewing position.

The specific viewing space may include a plurality of viewing positions, and the metadata may include viewing position information for each of the viewing positions and viewing space information. Here, the metadata may be referred to as signaling information. Meanwhile, the metadata can be transmitted through an SEI message. Further, the metadata may be included in AdaptationSet, Representation or SubRepresentation of an MPD (Media Presentation Description).

For example, the metadata includes viewing position information and viewing space information.

The viewing position information may include a viewing_position_info_id field, a viewing_position_info_cancel_ flag field, a viewing_position_info_persistence_flag field, an anchor_viewing_position_flag field, a viewing_position_x field, a viewing_position_y field, a viewing_position_z field, a viewing_orientation_yaw field, a viewing_orientation_pitch field, a viewing_orientation_roll field, a coverage_horizontal field, a coverage_vertical field, an anchor_viewing_position_x field, an anchor_viewing_position_y field, an anchor_viewing_position_z field, an anchor_ viewing_orientation_yaw field, an anchor_ viewing_orientation_pitch field, an anchor_viewing_orientation_roll field, an anchor_coverage_horizontal field, an anchor_coverage_vertical field, a num_viewing_positions field, a set_viewing_position_x[i] field, a set_viewing_position_y[i] field, a set_viewing_position_z[i] field, a set_viewing_orientation_yaw[i] field, a set_viewing_orientation_pitch[i] field, a set_viewing_orientation_roll[i] field, a set_coverage_horizontal[i] field and/or a set_coverage_vertical[i] field.

Specifically, the viewing position information for the specific viewing position may include information indicating an x component, a y component and a z component of the specific viewing position. Also, the viewing position information may include information indicating a yaw angle, a pitch angle and a roll angle of a viewing orientation for the specific viewing position. Also, the viewing position information may include information indicating a horizontal range and a vertical range of coverage of the specific viewing position. The information indicating the x component, the y component and the z component of the specific viewing position may represent the viewing_position_x field, the viewing_position_y field and the viewing_position_z field, respectively. The information indicating the yaw angle, the pitch angle and the roll angle of the viewing orientation for the specific viewing position may represent the viewing_orientation_yaw field, the viewing_orientation_ pitch field and the viewing_orientation_roll field, respectively. The information indicating the horizontal range and the vertical range of the coverage of the specific viewing position may represent the coverage_horizontal field and the coverage_vertical field, respectively.

Further, the viewing position information for the specific viewing position may include an anchor viewing position flag indicating whether the specific viewing position is an anchor viewing position of a viewing position set. Here, the viewing position set may be a viewing position set that includes the specific viewing position. The anchor viewing position flag may represent the anchor_viewing_position_flag field.

Further, when the anchor viewing position flag indicates the specific viewing position is not the anchor viewing position of the viewing position set, the viewing position information for the specific viewing position may include information indicating an x component, a y component and a z component of the anchor viewing position. Also, when the anchor viewing position flag indicates the specific viewing position is not the anchor viewing position of the viewing position set, the viewing position information for the specific viewing position may include information indicating a yaw angle, a pitch angle and a roll angle of a viewing orientation for the anchor viewing position. Also, when the anchor viewing position flag indicates the specific viewing position is not the anchor viewing position of the viewing position set, the viewing position information may include information indicating a horizontal range and a vertical range of coverage of the anchor viewing position. The information indicating the x component, the y component and the z component of the anchor viewing position may represent the anchor_viewing_position_x field, the anchor_viewing_position_y field and the anchor_viewing_position_z field, respectively. The information indicating the yaw angle, the pitch angle and the roll angle of the viewing orientation for the anchor viewing position may represent the anchor_viewing_orientation_yaw field, the anchor_viewing_orientation_pitch field and the anchor_viewing_orientation_roll field, respectively. The information indicating the horizontal range and the vertical range of the coverage of the anchor viewing position may represent the anchor_coverage_horizontal field and the anchor_coverage_vertical field, respectively.

Further, the viewing position information for the specific viewing position may include information indicating the number of viewing positions related to the specific viewing position. The viewing positions related to the specific viewing position may be viewing positions of the viewing position set.

The viewing position information for the specific viewing position may include information indicating an x component, a y component and a z component of a viewing position related to the specific viewing position. Also, the viewing position information may include information indicating a yaw angle, a pitch angle and a roll angle of a viewing orientation for the viewing position related to the specific viewing position. Also, the viewing position information may include information indicating a horizontal range and a vertical range of coverage of the viewing position related to the specific viewing position. The information indicating the x component, the y component and the z component of the viewing position related to the specific viewing position may represent the set_viewing_position_x field, the set_viewing_position_y field and the set_viewing_position_z field, respectively. The information indicating the yaw angle, the pitch angle and the roll angle of the viewing orientation for the viewing position related to the specific viewing position may represent the set_viewing_orientation_yaw field, the set_viewing_orientation_pitch field and the set_viewing_orientation_roll field, respectively. The information indicating the horizontal range and the vertical range of the coverage of the viewing position related to the specific viewing position may represent the set_coverage_horizontal field and the set_coverage_vertical field, respectively.

Further, for example, the viewing space information may include a head_motion_info_id field, a head_motion_info_cancel_flag field, a head_motion_info_persistence_flag field, a head_motion_boundary_radius_min field, a head_motion_boundary_radius_max field, a num_nested_boundaries_minus1 field, a head_motion_boundary_center_present_flag[i] field, a head_motion_boundary_rotation_flag[i] field, a head_motion_boundary_asymmetric_flag[i] field, head_motion_boundary_type[i] field, a head_motion_boundary_center_x[i] field, a head_motion_boundary_center_y[i] field, a head_motion_boundary_center_z[i] field, a head_motion_boundary_rotation_yaw[i] field, a head_motion_boundary_rotation_pitch[i] field, a head_motion_boundary_rotation_roll[i] field, a head_motion_boundary_radius[i] field, a head_motion_boundary_param_a[i] field, a head_motion_boundary_param_b[i] field, a head_motion_boundary_z_max[i] field, a head_motion_boundary_positive_x_axis[i] field, a head_motion_boundary_negative_x_axis[i] field, a head_motion_boundary_positive_y_axis[i] field, a head_motion_boundary_negative_y_axis[i] field, a head_motion_boundary_positive_z_axis[i] field, a head_motion_boundary_negative_z_axis[i] field, a head_motion_boundary_symmetry_axis[i] field, a head_motion_boundary_param_c[i] field, a num_boundary_vertex_minus4[i] field, a boundary_vertex_x[i] field, a boundary_vertex_y[i] field, and/or a boundary_vertex_z[i] field. Here, the specific viewing space may represent the i-th viewing space.

Specifically, the viewing space information may include information indicating a shape type of the specific viewing space. The shape type of the specific viewing space may be one of a sphere, a paraboloid shape, a cube, a rectangular prism, a spheroid, a tri-axial ellipsoid, a shape defined by vertexes.

When the shape type of the specific viewing space is the sphere, the viewing space information may include information indicating a radius of the specific viewing space. The information indicating the radius of the specific viewing space may represent the head_motion_boundary_radius[i] field.

Also, when the shape type of the specific viewing space is the paraboloid shape, the viewing space information may include information indicating parameter values of the specific viewing space. For example, when the shape type of the specific viewing space is the paraboloid shape, the viewing space information may include information indicating a semi-axis length of the x axis, information indicating a semi-axis length of the y axis, information indicating a maximum value of the z axis of the specific viewing space. The information indicating the semi-axis length of the x axis may represent the head_motion_boundary_param_a[i] field, the information indicating the semi-axis length of the y axis may represent the head_motion_boundary_param_b[i] field, the information indicating the maximum value of the z axis may represent the head_motion_boundary_z_max[i] field.

Also, when the shape type of the specific viewing space is the cube or the rectangular prism, the viewing space information may include information indicating a minimum value of an x component, a y component and a z component of the specific viewing space. Further, when the shape type of the specific viewing space is the cube, the viewing space information may include information indicating a maximum value of the x component, the y component and the z component of the specific viewing space. The information indicating the minimum value of the x component, the y component and the z component of the specific viewing space may represent the head_motion_boundary_negative_x_axis[i] field, the head_motion_boundary_negative_y_axis[i] field and the head_motion_boundary_negative_z_axis[i] field, respectively. The information indicating the maximum value of the x component, the y component and the z component of the specific viewing space may represent the head_motion_boundary_positive_x_axis[i] field, the head_motion_boundary_positive_y_axis[i] field and the head_motion_boundary_positive_z_axis[i] field, respectively. Meanwhile, for example, when the shape type of the specific viewing space is the rectangular prism, and the head_motion_boundary_asymmetric_flag[i] field is equal to 1, the viewing space information may include information indicating the minimum value of the x component, the y component and the z component of the specific viewing space. Also, for example, when the shape type of the specific viewing space is not the rectangular prism or the head_motion_boundary_asymmetric_flag[i] field is equal to 0, the viewing space information may not include information indicating the minimum value of the x component, the y component and the z component of the specific viewing space, and the minimum value of the x component, the y component and the z component of the specific viewing space is derived based on the maximum value of the x component, the y component and the z component of the specific viewing space.

Also, when the shape type of the specific viewing space is the spheroid, the viewing space information may include information indicating parameter values of the specific viewing space. For example, when the shape type of the specific viewing space is the spheroid, the viewing space information may include information indicating a semi-axis length of the x axis, information indicating a semi-axis length of the y axis of the specific viewing space, symmetric axis indication information indicating an axis that the specific viewing space is symmetric. Here, the axis that the specific viewing space is symmetric may be one of the x axis, y axis and z axis. For example, the symmetric axis indication information equal to 0 indicates the x axis, the symmetric axis indication information equal to 1 indicates the y axis, and the symmetric axis indication information equal to 2 indicates the z axis. The information indicating the semi-axis length of the x axis may represent the head_motion_boundary_param_a[i] field, the information indicating the semi-axis length of the y axis may represent the head_motion_boundary_param_b[i] field, the symmetric axis indication information may represent the head_motion_boundary_symmetry_axis[i] field.

Also, when the shape type of the specific viewing space is the tri-axial ellipsoid, the viewing space information may include information indicating parameter values of the specific viewing space. For example, when the shape type of the specific viewing space is the tri-axial ellipsoid, the viewing space information may include information indicating a semi-axis length of the x axis, information indicating a semi-axis length of the y axis, information indicating a semi-axis length of the z axis of the specific viewing space. The information indicating the semi-axis length of the x axis may represent the head_motion_boundary_param_a[i] field, the information indicating the semi-axis length of the y axis may represent the head_motion_boundary_param_b[i] field, the information indicating the semi-axis length of the z axis may represent the head_motion_boundary_param_c[i] field.

Also, when the shape type of the specific viewing space is the shape defined by the vertexes, the viewing space information for the specific viewing position may include information indicating a number of the vertexes of the viewing space. Further, the viewing space information for the specific viewing position may include information indicating an x component, a y component and a z component of a vertex of the viewing space. The information indicating the number of the vertexes of the viewing space may represent the num_boundary_vertex_minus4[i] field. The information indicating the x component, the y component and the z component of the vertex of the viewing space may represent the boundary_vertex_x[i][j] field, the boundary_vertex_y[i][j] field, and the boundary_vertex_z[i][j] field, respectively.

Further, the viewing space information may include a flag indicating whether information on a center location of the specific viewing space is present. For example, when a value of the flag is 1, the viewing space information may include information indicating an x component, a y component and a z component of the center location of the specific viewing space. The flag may represent the head_motion_boundary_center_present_flag[i] field. The information indicating the x component, the y component and the z component of the center location of the specific viewing space may represent the head_motion_boundary_center_x[i] field, the head_motion_boundary_center_y[i] field and the head_motion_boundary_center_z[i] field, respectively.

Further, the viewing space information may include a flag indicating whether information on a rotation of the specific viewing space is present. For example, when a value of the flag is 1, the viewing space information may include information indicating a yaw angle, a pitch angle and a roll angle of the rotation of the specific viewing space. The flag may represent the head_motion_boundary_rotation_flag[i] field. The information indicating the yaw angle, the pitch angle and the roll angle of the rotation of the specific viewing space may represent the head_motion_boundary_rotation_yaw[i] field, the head_motion_boundary_rotation_pitch[i] field and the head_motion_boundary_rotation_roll[i] field, respectively.

Further, the viewing space information may include a flag indicating whether a shape of the specific viewing space is not symmetric. For example, when a value of the flag is 1, the shape of the specific viewing space is not symmetric. When the value of the flag is 0, the shape of the specific viewing space is symmetric. The flag may represent the head_motion_boundary_asymmetric_flag[i] field.

Further, the viewing space information may include information indicating a number of nesting shapes of viewing space. In other words, the viewing space information may include information indicating a number of viewing space for the 360-degree video data. The information indicating the number of the viewing space for the 360-degree video data may represent the num_nested_boundaries_minus1 field.

The 360 video reception apparatus decodes the encoded picture based on the information on the encoded picture (S2120). The 360 video reception apparatus can decode the encoded picture for the specific viewing position in the specific viewing space based on the information on the encoded picture.

The 360 video reception apparatus renders the decoded picture based on the metadata (S2130). For example, the 360 video reception apparatus may perform re-projection on the decoded picture. The 360 video reception apparatus may re-project the decoded picture on a 3D space based on the metadata. The 3D space may have different forms depending on 3D models. For example, the metadata may include information about a type of a 3D model and detailed information of the 3D model. According to an embodiment, the 360 video reception apparatus may re-project a region of the decoded picture corresponding to a specific area of the 3D space on the 3D space using the metadata. The 360 video reception apparatus may render the re-projected picture. According to an embodiment, the renderer may render only a part viewed by a user according to viewport information of the user.

Figure 22:
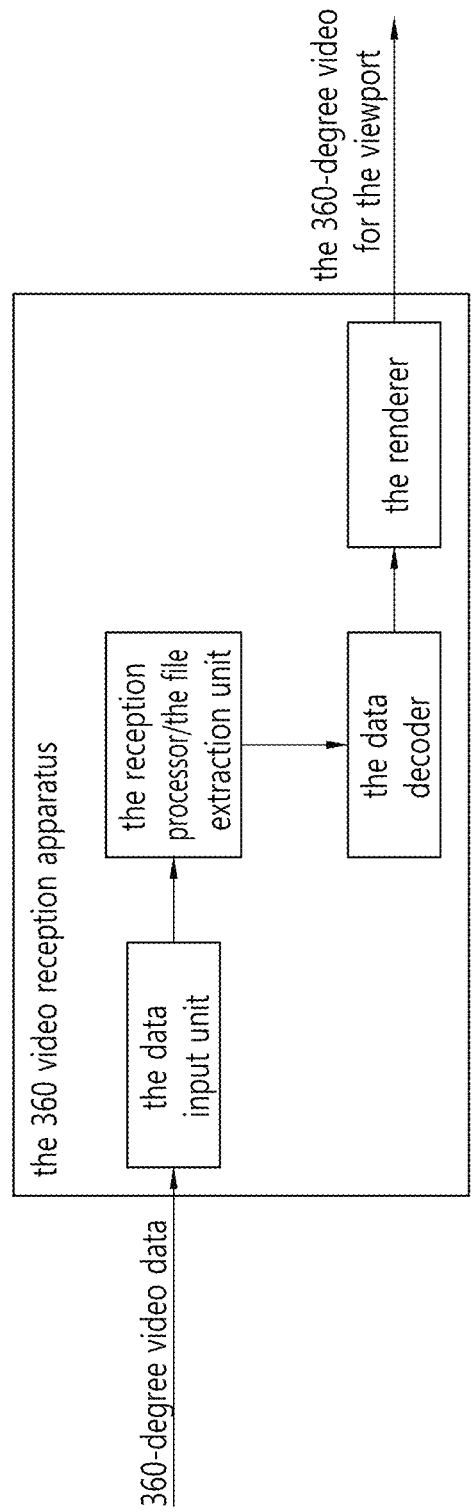
FIG. 22 schematically illustrates a 360 video reception apparatus for performing a 360 video data processing method according to the present invention.

FIG. 22 schematically illustrates a 360 video reception apparatus for performing a 360 video data processing method according to the present invention. The method illustrated in FIG. 22 may be performed by the 360 video reception apparatus illustrated in FIG. 21. Specifically, the data input unit of the 360 video reception apparatus in FIG. 22 can perform S2100 in FIG. 22, the reception processor/the file extraction unit of the 360 video reception apparatus in FIG. 22 can perform S2110 in FIG. 21, the data decoder of the 360 video reception apparatus in FIG. 22 can perform S2120 in FIG. 21, and the renderer of the 360 video reception apparatus in FIG. 22 can perform S2130 in FIG. 21.

According to the present invention, it is possible to propose a method for providing interactive experience in 3DoF+ content consumption of users by supporting head motion parallax.

Also, according to the present invention, it is possible to support bounded head motion indication for 3DoF+ applications. Accordingly, it is possible to propose a method for providing interactive experience in 3DoF+ content consumption of users.

The above-described steps may be omitted according to an embodiment or replaced by other steps of performing similar/identical operations.

The 360 video transmission apparatus according to an embodiment of the present invention may include the above-described data input unit, stitcher, signaling processor, projection processor, data encoder, transmission processor and/or transmitter. The internal components have been described above. The 360 video transmission apparatus and internal components thereof according to an embodiment of the present invention may perform the above-described embodiments with respect to the method of transmitting a 360 video of the present invention.

The 360 video reception apparatus according to an embodiment of the present invention may include the above-described receiver, reception processor, data decoder, signaling parser, reprojection processor and/or renderer. The internal components have been described above. The 360 video reception apparatus and internal components thereof according to an embodiment of the present invention may perform the above-described embodiments with respect to the method of receiving a 360 video of the present invention.

The internal components of the above-described apparatuses may be processors which execute consecutive processes stored in a memory or hardware components. These components may be located inside/outside the apparatuses.

The above-described modules may be omitted or replaced by other modules which perform similar/identical operations according to embodiments.

The above-described parts, modules or units may be processors or hardware parts executing consecutive processes stored in a memory (or a storage unit). The steps described in the aforementioned embodiments can be performed by processors or hardware parts. Modules/blocks/units described in the above embodiments can operate as hardware/processors. The methods proposed by the present invention can be executed as code. Such code can be written on a processor-readable storage medium and thus can be read by a processor provided by an apparatus.

In the above exemplary systems, although the methods have been described based on the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means. The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices.

The technical features according to the present invention can be applied to various services such as VR/AR. In addition, the technical features according to the present invention described above can be performed through the 5G or next generation communication, etc. For example, data (ex. video/image bit stream, metadata, etc.) output from a transmission apparatus (ex. 360 video transmission apparatus) is transmitted to the reception apparatus through the 5G. In addition, a (VR/AR) video/image acquisition device is separately provided outside and can transmit video/image obtained through the 5G communication to the transmission device. Also, the transmission apparatus and/or the reception apparatus according to the present invention can support various service scenarios through 5G communication.

Three main requirements domains of 5G includes (1) enhanced mobile broadband (eMBB) domain, (2) massive machine type communication (mMTC) domain, and (3) ultra-reliable and low latency communications (URLLC) domain. Some use cases may require multiple domains for optimization and other use cases may only focus on only one key performance indicator (KPI). The 5G is to support these various use cases in a flexible and reliable method.

The eMBB focuses on the overall improvement of data rate, latency, user density, capacity and coverage of mobile broadband connection. The eMBB is targeted at a throughput of about 10 Gbps. The eMBB far exceeds basic mobile Internet access and covers media and entertainment applications in rich interactive work, cloud or augmented reality. Data is one of the key drivers of 5G and may not be able to see dedicated voice services for the first time in the 5G era.

The mMTC is designed to enable communication between a large amount of low-cost devices powered by batteries and is intended to support applications such as smart metering, logistics, field and body sensors. The mMTC is targeted at a battery for about 10 years and/or a million devices per square kilometer.

The URLLC is ideal for automotive communications, industrial control, factory automation, remote surgery, smart grid and public safety applications by allowing devices and machines to communicate with very reliable and very low latency and high availability. URLLC is targeted at a delay of about 1 ms.

Also, the embodiments according to the present invention can be performed to support the eXtended Reality (XR). XR is collectively referred to as Virtual Reality (VR), Augmented Reality (AR), and Mixed Reality (MR). VR technology provides real-world objects and backgrounds only as CG images, AR technology provides virtually created CG images on actual object images, and MR technology is a computer graphics technology that mixes and combines virtual objects into the real world. The MR technology is similar to the AR technology in that it shows real and virtual objects together. However, in the AR technology, the virtual object is used as a complement to the real object, whereas in the MR technology, the virtual object and the real object are used in an equal manner. The XR technology can be applied to a head-mounted display (HMD), a head-up display (HUD), a mobile phone, a tablet PC, a laptop, a desktop, a TV, a digital signage, a device to which the XR technology is applied may be referred to as an XR device. The XR device can be connected to various services through a communication network based on the 5G communication.

The XR device may be connected to at least one of the AI server, the robot, the autonomous vehicle, the smartphone, or the household appliance through a network. Here, the robot, the autonomous vehicle, the XR device, the smartphone, or the household appliance to which the AI technology is applied may be referred to as an AI device. The XR device may be implemented as a head-mount display (HMD), a head-up display (HUD) provided in a vehicle, a television, a mobile phone, a smart phone, a computer, a wearable device, a home appliance, a digital signage, or a mobile robot.

The autonomous vehicle may include a mobile robot, a vehicle, a train, a manned/unmanned aerial vehicle, a ship, etc. The autonomous vehicle may include an autonomous drive control module for controlling the autonomous drive function, and the autonomous drive control module may represent a software module or a chip implementing the software module. The autonomous control module may be included in the autonomous vehicle as a configuration of the autonomous vehicle, or may be connected to the outside of the autonomous vehicle as a separate hardware.

The autonomous vehicle can acquire the state information of the autonomous vehicle using the sensor information acquired from various kinds of sensors, detect (recognize) the surrounding environment and objects, generate map data, determine a travel route and a travel plan, or determine an operation.

Here, the autonomous vehicle can use the sensor information acquired by at least one of the sensors, such as the radar and the camera, to determine the travel route and the travel plan. In particular, the autonomous vehicle can recognize the environment or the object for the area obscured in the visual field or the area over a certain distance by receiving the sensor information from the external devices. Or the autonomous vehicle may receive the recognized information directly from the external devices.

The autonomous vehicle to which the XR technology is applied may mean an autonomous vehicle having means for providing an XR video/image or an autonomous vehicle that is subject to control/interact in an XR video/image. Particularly, the autonomous vehicle that is subject to control/interact in the XR video/image can be distinguished from the XR device and interlocked with each other.

The autonomous vehicle having the means for providing the XR video/image can acquire the sensor information from the sensors including the camera and output the generated an XR video/image based on the acquired sensor information. For example, the autonomous vehicle may include an HUD to output an XR video/image, thereby providing an occupant with a real object or an XR object corresponding to an object in the screen.

The XR device may be used for various services such as entertainment, exercise, education, traffic, medical care, electronic commerce, manufacturing, and defense, etc. For example, a movie, a theme park, a sport, and the like can be experienced and/or viewed through the XR device. Further, the XR device can support training in a hazardous environment such as a medical practice, a fire scene, and the like. In addition, it is possible to provide a route search service such as the AR Ways utilizing the location recognition and map generation (SLAM) technology through the XR device. And, it is possible to connect to a virtual shopping mall through the XR device to shop and purchase goods.

What is claimed is:

1. A 360-degree video data processing method performed by a 360-degree video reception apparatus, the method comprising:
   receiving 360-degree video data including encoded pictures for a specific viewing position;
   deriving metadata;
   decoding the encoded pictures; and
   rendering the decoded pictures based on the metadata, wherein:
   the metadata includes viewing space information, and
   the viewing space information includes information indicating a shape type of the specific viewing space, when the shape type of a specific viewing space is an ellipsoid, the viewing space information includes information indicating a semi-axis length of a x axis of the specific viewing space, information indicating a semi-axis length of a y axis of the specific viewing space, and information indicating a semi-axis length of a z axis of the specific viewing space.

2. The 360-degree video data processing method of claim 1, wherein the shape type of the specific viewing space is one of a sphere, a paraboloid shape, a cube, a rectangular prism, a spheroid, a tri-axial ellipsoid, a shape defined by vertexes.

3. The 360-degree video data processing method of claim 2, when the shape type of the specific viewing space is the sphere, the viewing space information includes information indicating a radius of the specific viewing space.

4. The 360-degree video data processing method of claim 2, when the shape type of the specific viewing space is the spheroid, the viewing space information includes information indicating a semi-axis length of a x axis of the specific viewing space, information indicating a semi-axis length of a y axis of the specific viewing space, symmetric axis indication information indicating an axis that the specific viewing space is symmetric.

5. The 360-degree video data processing method of claim 3, wherein:
the specific viewing space includes a plurality of viewing positions,
the metadata includes viewing position information for each of the viewing positions, and
when a user's viewing position is out of the viewing space, the most adjacent viewing position of the user's viewing position is selected as the specific viewing position.

6. The 360-degree video data processing method of claim 1, wherein the viewing space information includes a flag indicating whether information on a center location of the specific viewing space is present.

7. The 360-degree video data processing method of claim 6, wherein when a value of the flag is 1, the viewing space information includes information indicating an x component, a y component and a z component of the center location of the specific viewing space.

8. The 360-degree video data processing method of claim 1, wherein:
the metadata includes viewing position information for the specific viewing position, and
the viewing position information includes information indicating an x component, a y component and a z component of the specific viewing position.

9. The 360-degree video data processing method of claim 8, wherein the viewing position information includes information indicating a yaw angle, a pitch angle and a roll angle of a viewing orientation for the specific viewing position.

10. The 360-degree video data processing method of claim 8, wherein:
the specific viewing space includes a plurality of viewing positions,
the metadata includes viewing position information for each of the viewing positions, and
a viewing position matched with a user's viewing position among the viewing positions is selected as the specific viewing position.

11. The 360-degree video data processing method of claim 8, wherein the viewing position information for the specific viewing position includes an anchor viewing position flag indicating whether the specific viewing position is an anchor viewing position of a viewing position set.

12. The 360-degree video data processing method of claim 11, wherein when the anchor viewing position flag indicates the specific viewing position is not the anchor viewing position of the viewing position set, the viewing position information includes information indicating an x component, a y component and a z component of the anchor viewing position.

13. The 360-degree video data processing method of claim 12, wherein when the anchor viewing position flag indicates the specific viewing position is not the anchor viewing position of the viewing position set, the viewing position information includes information indicating a yaw angle, a pitch angle and a roll angle of a viewing orientation for the anchor viewing position.

14. A 360-degree video data processing method performed by a 360-degree video transmission apparatus, the method comprising:
acquiring 360-degree video;
generating pictures for the viewing positions;
encoding the pictures;
generating metadata; and
performing processing for storage or transmission of the encoded pictures and the metadata,
wherein:
the metadata includes viewing space information, and
the viewing space information includes information indicating a shape type of the specific viewing space, when the shape type of the specific viewing space is an ellipsoid, the viewing space information includes information indicating a semi-axis length of a x axis of the specific viewing space, information indicating a semi-axis length of a y axis of the specific viewing space, and information indicating a semi-axis length of a z axis of the specific viewing space.

15. A 360-degree video reception apparatus, the apparatus comprising:
a receiver configured to receive 360-degree video data including encoded pictures for a specific viewing position;
a data decoder configured to decode the encoded pictures; and
a renderer configured to render the decoded pictures based on metadata derived, and
wherein:
the metadata includes viewing space information, and
the viewing space information includes information indicating a shape type of the specific viewing space, when the shape type of a specific viewing space is an ellipsoid, the viewing space information includes information indicating a semi-axis length of a x axis of the specific viewing space, information indicating a semi-axis length of a y axis of the specific viewing space, and information indicating a semi-axis length of a z axis of the specific viewing space.

16. A 360-degree video transmission apparatus, the apparatus comprising:
a projection processor configured to generate pictures of 360-degree video;
an encoder configured to encode the pictures;
a metadata processor configured to generate metadata; and
a transmission processor configured to perform processing for storage or transmission of the encoded pictures and the metadata, wherein:

the metadata includes viewing space information, and the viewing space information includes information indicating a shape type of the specific viewing space, when the shape type of the specific viewing space is an ellipsoid, the viewing space information includes information indicating a semi-axis length of a x axis of the specific viewing space, information indicating a semi-axis length of a y axis of the specific viewing space, and information indicating a semi-axis length of a z axis of the specific viewing space.

* * * * *